United States Patent Office 3,506,093
Patented Apr. 14, 1970

3,506,093
ELEVATOR ZONING CONTROL SYSTEM INCLUDING MEANS TO REDIVIDE THE ZONES UNDER PREDETERMINED TRAFFIC CONDITIONS
John Suozzo, Paramus, and Henry C. Savino, Hackensack, N.J., assignors to Westinghouse Electric Corporation, East Pittsburgh, Pa., a corporation of Pennsylvania
Continuation-in-part of applications Ser. No. 94,723, Mar. 10, 1961, Ser. No. 110,464, May 16, 1961, and Ser. No. 220,522, Aug. 30, 1962. This application Sept. 24, 1963, Ser. No. 310,991
Int. Cl. B66b 1/20
U.S. Cl. 187—29                          19 Claims

ABSTRACT OF THE DISCLOSURE

A plural elevator "available car" system which is subject to peak traffic conditions is disclosed. A conventional zoning approach toward solving the peak traffic problem is included which divides the building into a first plurality of zones and assigns each car to serve a zone. However, a situation may arise where a zone is overloaded beyond various predetermined conditions and thus the assigned cars are unable to handle overtime calls within the zone. Further, an adjacent zone which is lightly loaded and has an available car exists. When this situation occurs, the conventional zoning control is modified by redividing the floors into a second plurality of zones whereby the overloaded zone now includes floors served by an available car in the previously adjacent lightly loaded zone and the car is made available for use in the overloaded zone.

---

This is a continuation-in-part of applications Ser. Nos. 94,723 and 110,464 and 220,522 which were filed respectively on Mar. 10, 1961, May 16, 1961, and Aug. 30, 1962. The first two have issued as patents 3,256,958 and 3,292,736.

This invention relates to elevator systems, and it has particular relation to elevator systems wherein a plurality of elevator cars are arranged in a structure to operate as a bank.

The problem of providing an efficient elevator system for a structure is complicated by the frequent variations in traffic demands or traffic patterns which are encountered. Although such variations or patterns differ for different structures, it will be helpful to consider the primary variations for a typical office building.

On each business day, periods are encountered during which there are frequent demands for elevator service. These demands may be divided into three types. Immediately before the start of the business day and usually toward the end of the lunch period, a heavy demand for up travel from the lower terminal or first floor is encountered. This may be referred to as an "up peak."

Immediately after the close of the business day and usually at the start of the lunch hour, a heavy demand for travel toward the lower terminal floor is encountered. This demand for service predominately in the down direction may be referred to as a "down peak".

During the remainder of the business day, a demand for elevator service which is predominately equal to the two directions of travel generally is encountered. The period of this demand for substantially equal service in the two directions may be referred to as an "off peak."

Following the close of the business day, a period occurs during which the demand for elevator service is infrequent or occasional. For example, such a period occurs during the night in most office buildings, and similar infrequent demand for elevator service is encountered on holidays. Such periods may be termed "off hour" periods.

Furthermore, the traffic demands during each of the foregoing periods needs not be uniform. For example, during the off hour periods, the entry and departure of service personnel, such as charwomen, may introduce introduce intervals of increased demand for elevator service.

Expressions such as "traffic demand," "service demand" and "traffic condition" herein are employed to designate traffic pictures which may be utilized for specified control purposes. As is pointed out below, such traffic demands or conditions may include calls for elevator service registered by call means, loading of elevator cars, elevator car stopping, direct functions or rate functions.

An elevator system may be designed for attendant operation or for automatic operation. In attendant operation, an attendant located in each of the elevator cars is available for supervising the loading of his elevator car, the unloading of the elevator car and the dispatch of the elevator car from a floor. Although aspects of the invention may be incorporated in elevator systems employing either a single elevator car or a number of elevator cars arranged in a bank, and although aspects of the invention may be incorporated in elevator systems arranged either for automatic operation or attendant operation, the entire invention is particularly suitable for and may be considered adequately with reference to a bank of elevator cars arranged for automatic operation. For this reason, the following discussion will be directed primarily to such an elevator system.

In a bank of elevator cars arranged for automatic operation, the cars may operate principally between two terminal floors, which consist generally of an upper terminal floor and a lower or street terminal or first floor. A plurality of intermediate floors are located between the two terminal floors. Additionally, one or more but fewer than all of the elevator cars in the bank may serve a top extension or penthouse floor. Finally, certain or all of the cars also may provide service for a lower extension floor, such as a basement floor. However, the invention may be described adequately for a system having no lower extension floor.

In order to provide for the registration of calls for elevator service, suitable call registering means are provided. Such call registering means may comprise up floor call registering means, including an operating member located at each of the floors from which elevator service is desired in the up direction. In addition, the call registering means may include down floor call registering means, including an operating member located at each of the floors from which elevator service is desired in the down direction. Lastly, car call registering means may be provided for the purpose of registering calls for floors desired by the load within the associated elevator car. Such car call registering means may include an operating member within the elevator car for each floor to which a passenger in the car may desire to be transported.

It has been found that very efficient service is provided by an elevator system serving a structure whose floors above the lower terminal floor are divided into a plurality of separate up and down zones. Each of these zones may comprise either one floor or a plurality of adjacent floors, depending upon factors such as the total number of floors served by the system, the number of elevator cars in the system, special traffic conditions which may be encountered at a particular floor or group of floors and the quantity and cost of equipment required. It will be understood that the number of down zones need not necessarily equal the number of up zones and that the same floor or floors need not necessarily be included in both a particular down zone and a particular up zone.

In such a system, the registration of a floor call for elevator service may be accompanied by the registration of a demand for service for the zone in which the corresponding floor is located, depending upon considerations such as the respective locations of the elevator cars relative to the zone and the direction of travel for which each of one or more cars respectively are conditioned. In response to a zone demand for service, an available elevator car is assigned to serve the zone in the same direction of travel for which each floor call is registered which resulted in the registration of the zone service demand. If a plurality of cars at different locations are available for this purpose, only that one of such cars is selected which is in the best position to render the desired service. The present invention will be discussed with reference to a system of this type.

During relatively light or off peak periods of traffic demand, each of successive elevator cars may be assigned to serve a zone comprising a relatively large number of floors. Such operation, in general, minimizes car travel, decreasing wear and tear on system equipment, while concurrently providing entirely satisfactory service.

It is a general object of the present invention to provide an elevator system comprising a bank of elevator cars which furnishes improved service during periods of substantially increased traffic demand. To this end, it is another object of the invention to provide equitable elevator service during such periods for each of the floors of a zone comprising a pluraltiy of floors. By way of illustration, a down zone may comprise two adjacent floors. During a down peak period of traffic demand, successive elevator cars serving such zone may become loaded to capacity at the upper floor thereof. Accordingly, the cars are unable to receive additional passengers who desire service in the down direction from the lower floor of the zone; i.e., fully loaded cars leaving the upper floor bypass the lower floor, and prospective passengers at the latter floor must await elevator service for an undue length of time until traffic dimishes sufficiently at the upper floor to enable a car serving the zone to stop at its lower floor.

For remedying this undesirable condition, means may be provided for indicating that an elevator car conditioned for down travel is loaded to capacity at the upper floor of the zone when a down floor call is registered for the lower floor thereof. In response to such indication, the next car serving the zone is conditioned to ignore a registered down floor call for its upper floor and to stop for passengers only at its lower floor. Such stopping conveniently may result in cancellation of the aforesaid indication so that the upper floor once again may receive service. This sequence of operations is repeated as often as the above-stated initial conditions occur. Thus, substantially uniform service is provided for each of the floors of the zone.

It is still another object of the invention to rearrange, in response to occurrence of a predetermined condition, the zones into which the floors served by the elevator system normally are divided. For example, during down peak intervals of traffic, the number of down zones in the system may be increased by decreasing the number of floors contained in each of certain or all of the down zones during off peak periods of operation; e.g., an off peak down zone comprising two floors may be divided into two down peak down zones of one floor each. As a result, successive available elevator cars may be assigned to serve down zones more frequently, since each assigned car is required to serve a fewer number of floors upon receiving a down zone assignment, and service in the down direction, therefore, is expedited. This type of operation is particularly suitable, although not confined to, buildings having large floor areas and wherein a relatively high number of elevator cars serve relatively few floors, for example, in an installation in which a bank of six elevator cars serves six or seven floors. In response to termination of a down peak period, the system may be transferred to the off peak mode of operation discussed above.

During the down peak period at the end of each business day in a heavily populated office building, it may be desirable to depopulate or unload the floors one at a time in a predetermined sequence. Such a procedure, however, impose special requirements on the elevator system which serves the building.

It is a further object of the invention to provide improved elevator service during a down peak period of traffic demand in which the floors of the structure served by the system are depopulated in accordance with a predetermined sequence. For accomplishing this object, the elevator cars on a plurality of trips are assigned or "spotted" to serve primarily a particular floor which is to be unloaded during a given period of time. In order to provide service for unspotted floors for which floor calls may be registered, at the expiration of each of predetermined portions of each spotting period, the first available elevator car is assigned to answer one or more of such calls. As traffic at a spotted floor diminishes or tapers off, the frequency of such assignment to serve unspotted floors increases. As a result, traffic from each spotted floor is appreciably expedited without unduly penalizing traffic at unspotted floors. (It should be noted that relatively light traffic in either direction is to be expected at unspotted floors during the particular down peak period under discussion.)

It is also an object of the invention to provide improved service during certain periods of heavy traffic at the lower terminal floor of the structure served by an elevator system.

At the start of each business day, for example, traffic in the up direction from the lower terminal floor may be sufficient to justify the provision of a special form of elevator service which may be termed intense up peak operation. In the illustrated embodiment of the invention, such special service comprises the division of the elevator cars in a bank effectively into a plurality of sub-banks, each of which furnishes transportation principally from the lower terminal floor to a different predetermined zone of successive floors. Thus, the cars may be divided into two sub-banks, a low zone sub-bank, which transports passengers from the lower terminal floor to only a low zone of floors thereabove, and a high zone sub-bank, which carries passengers from the lower terminal floor to only the remaining or high zone of floors above the low zone. A high zone car also may answer an up floor call which may be registered for any floor in either the low or the high zone.

When each low zone and high zone car has completed its up trip, it becomes available for assignment to answer a down floor call which may be registered for any floor above the lower terminal floor. If no down floor call is registered or if there is no registered down floor call which another available car has not been assigned to answer when a car becomes available, each available car conveniently may be returned automatically to the lower terminal floor, and it may answer each down floor call during its trip to the lower terminal floor which is registered subsequent to the initiation of its return and which another car is not assigned to answer.

Since service from the lower terminal floor is of primary importance during an intense up peak period, however, it is desirable to maintain at least one elevator car in each of the high and low zone sub-banks for loading at the lower terminal floor at all times during such period, insofar as is practicable. Thus, if no car in one of the sub-banks is located at the lower terminal floor, the closest unassigned car to the lower terminal floor in such sub-bank which is set for down travel is selected for express travel to the lower terminal floor, i.e., the selected car is conditioned to by-pass each floor for which a down floor call may be registered, regardless of whether another car is assigned to answer such call. On the other hand, if no car in the sub-bank is set for down travel, the closest available car to the lower terminal floor in such sub-bank is selected for express travel thereto, even though a service demand may be registered for another floor. The foregoing operation insures that during intense up peak periods of traffic, optimum elevator service is provided for the lower terminal floor, where adequate service is of chief concern, and that concurrently satisfactory service is furnished for all floors above the lower terminal floor.

It is an additional object of the invention to provide improved elevator service during certain periods of heavy traffic at a predetermined floor above the lower terminal floor of a structure served by an elevator system.

In a building such as a hotel, a particular floor above the lower terminal floor may be designed to accommodate special activities involving large numbers of people, e.g., conventions or speical social events. For convenience, the floor under consideration will be designated a convention floor.

For a relatively short period of time following the termination of a convention session, there may be an exceptionally heavy or peak demand for elevator service from the convention floor, usually to the lower terminal floor. Under these conditions, special elevator service is warranted for the convention floor.

In a preferred embodiment of the invention, preferential or priority service is furnished for a convention floor upon the occurrence of a predetermined condition such as the capacity loading of an elevator car located at each floor. Suitable means are provided for storing for at least a predetermined time the indication that the aforesaid condition has occurred. During such storage and upon the registration of a down floor call for the convention floor, the first available elevator car located at any other floor, or the nearest available elevator car to the convention floor, if there is more than one such car, is assigned to serve the convention floor regardless of the existence of other demands for service, and the selected car proceeds directly thereto without answering on its way any floor call which may be registered for another floor. Thus, as long as an elevator car leaves the convention floor loaded to capacity and for at least a predetermined time thereafter, successive available elevator cars are dispatched directly to such floor upon the registration of a down floor call therefor. If desired, means may be provided for registering automatically a down floor call for the convention floor when any elevator car becomes loaded to capacity at that floor. Such operation further increases the frequency with which available cars are dispatched directly to the convention floor. It will be appreciated that the provision of convention floor special service substantially expedites traffic flow from such floor under the stated conditions.

It is still a further object of the invention to provide an improved elevator system comprising a bank of elevator cars for serving a main floor of a structure and a plurality of additional floors spaced in a first direction from the main floor and in which fewer than all of the elevator cars in the bank are capable of serving a predetermined one of the additional floors.

It will be recalled that the last-named floor may be a top extension or penthouse floor, and for illustrative purposes the following discussion will be directed to such a floor. Since fewer than all of the elevator cars in the bank may serve the top extension floor, separate means conveniently may be provided at the lower terminal floor for enabling a prospective passenger desiring transportation from the latter floor to the extension floor to register under certain conditions a call or demand for elevator service from the lower terminal to the extension floor. Preferably, such a call or demand may be registered unless an elevator car capable of serving the extension floor, i.e., an extension floor car, is conditioned to provide down service, in which event such car soon will arrive at the lower terminal floor and then will be conditioned to accept passengers for the extension floor, or unless a car capable of serving the extension floor is located at the lower terminal floor with its doors open and is not conditioned to start, as a result of which anyone may enter such car immediately and register a car call for the extension floor.

In response to the registration of a demand for service from the lower terminal floor to the top extension floor, the closest available extension floor car to the lower terminal floor is selected to provide such service. If the selected car is located at the lower terminal floor with its doors closed, the doors are opened so that the passenger who registered the service demand may enter the car. If, however, the selected car is located at another floor, it is automatically dispatched to the lower terminal floor to provide the desired service.

A demand for service for the top extension floor also may occur if an up floor call is registered for the floor below the extension floor or if a down floor call is registered for the extension floor, provided that no elevator car capable of serving the extension floor is conditioned to answer up floor calls, since such car may answer either of the aforesaid registered calls without undue delay. In response to the registration of such a service demand, the closest available car to the extension floor capable of serving the extension floor is dispatched to answer the floor call which prompted its selection.

If a plurality of the aforesaid different calls or demands for top extension floor service are registered concurrently, such demands or calls are answered in accordance with a sequence which depends upon the location of an available extension floor elevator car and which is designed to provide efficient extension floor service. This aspect of the invention will be discussed more fully hereinafter.

The preceding operation, it will be observed, results in optimum service for a floor which is served by fewer than all of the elevator cars in a bank.

Other objects of the invention will be apparent from the following description, taken in conjunction with the accompanying drawings, in which.

Figure 14:
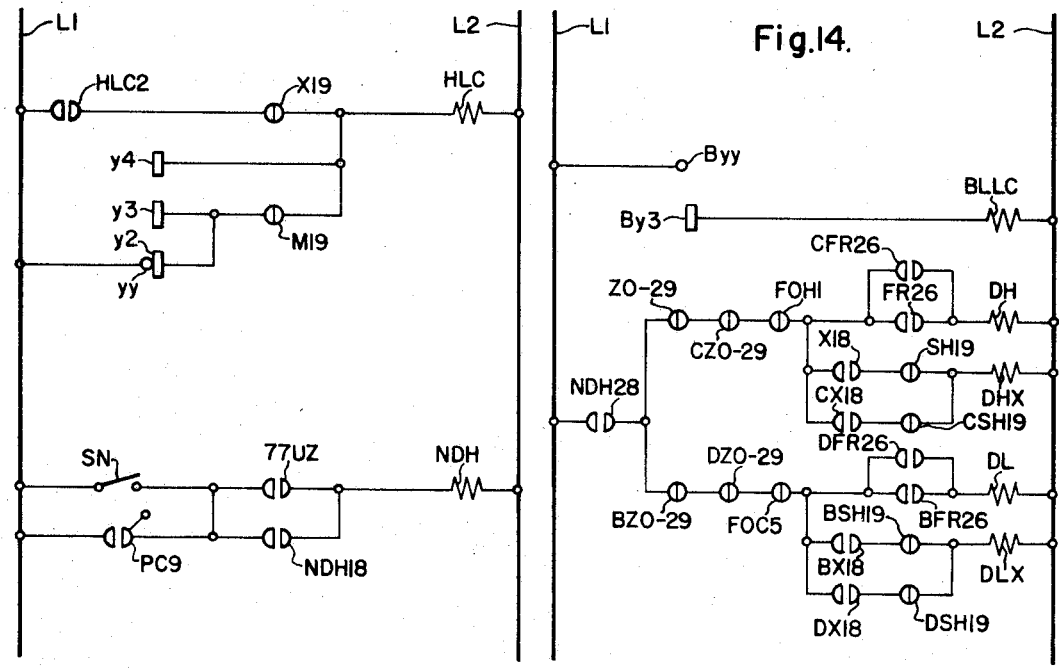
Figure 15:
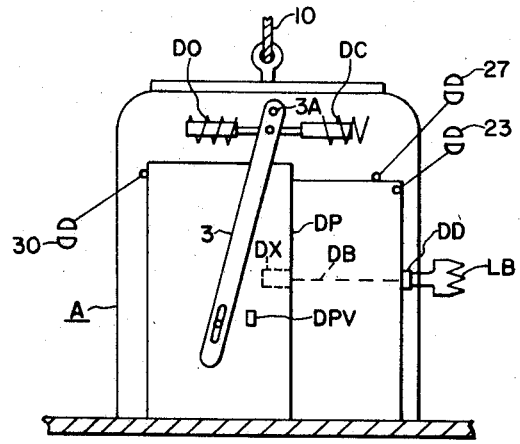
FIG. 15 is a view in front elevation illustrating suitable door operating components for one of the elevator cars of FIG. 1.
Figure 16:
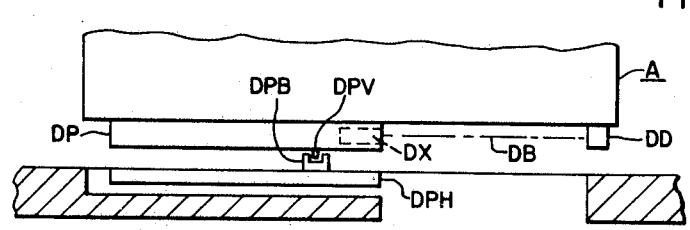
Figure 17A:
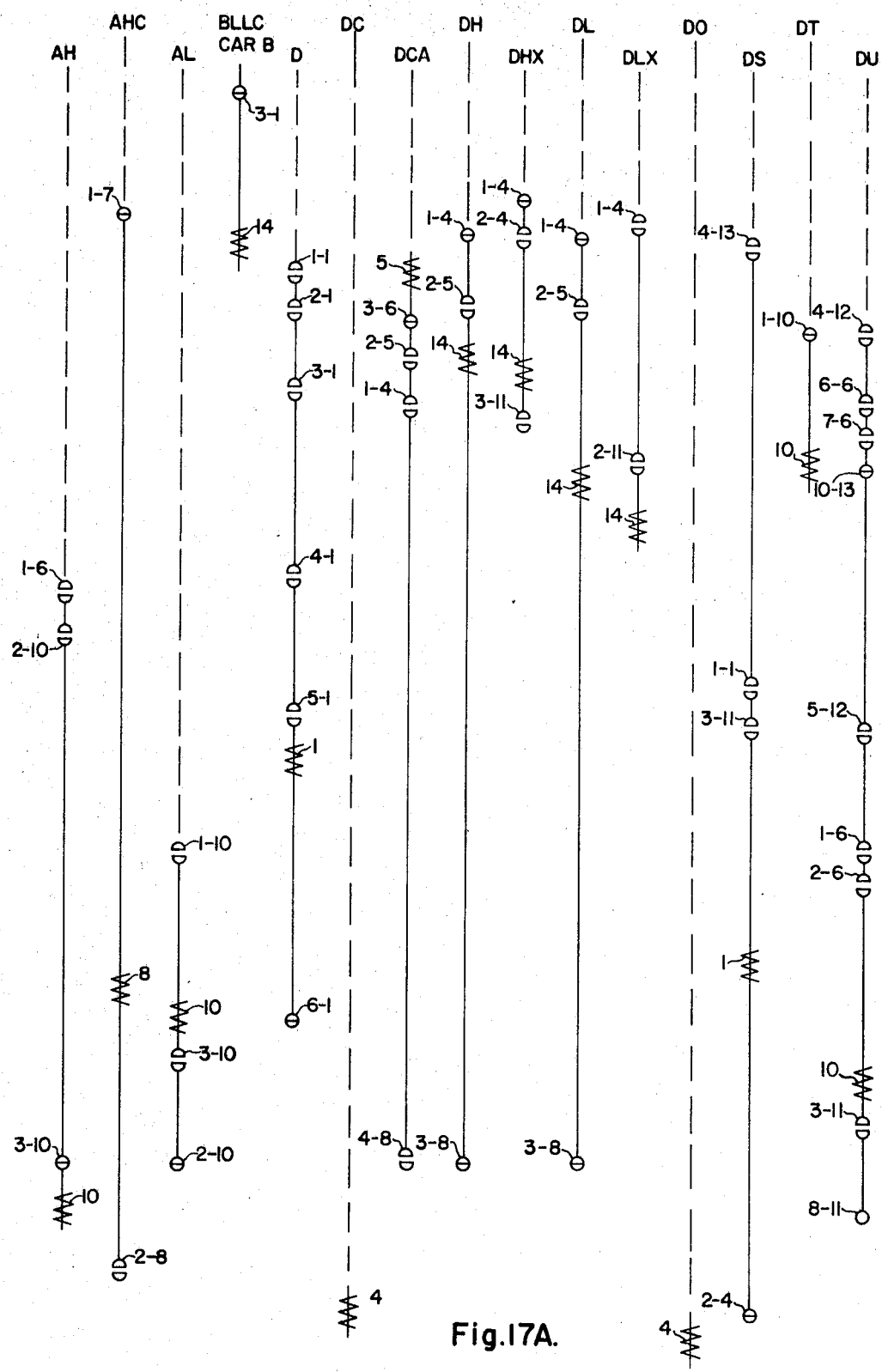
Figure 17B:
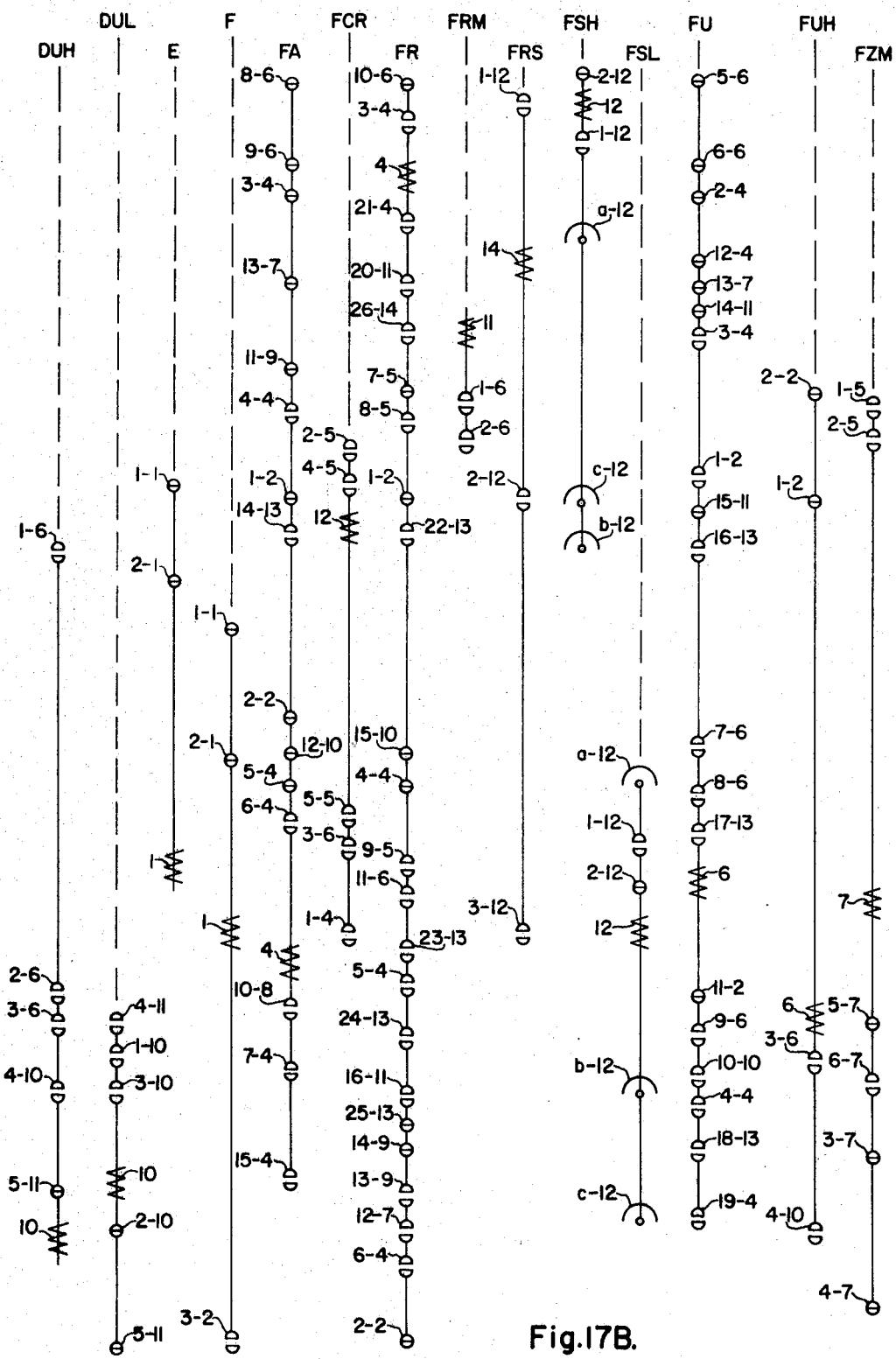
Figure 17C:
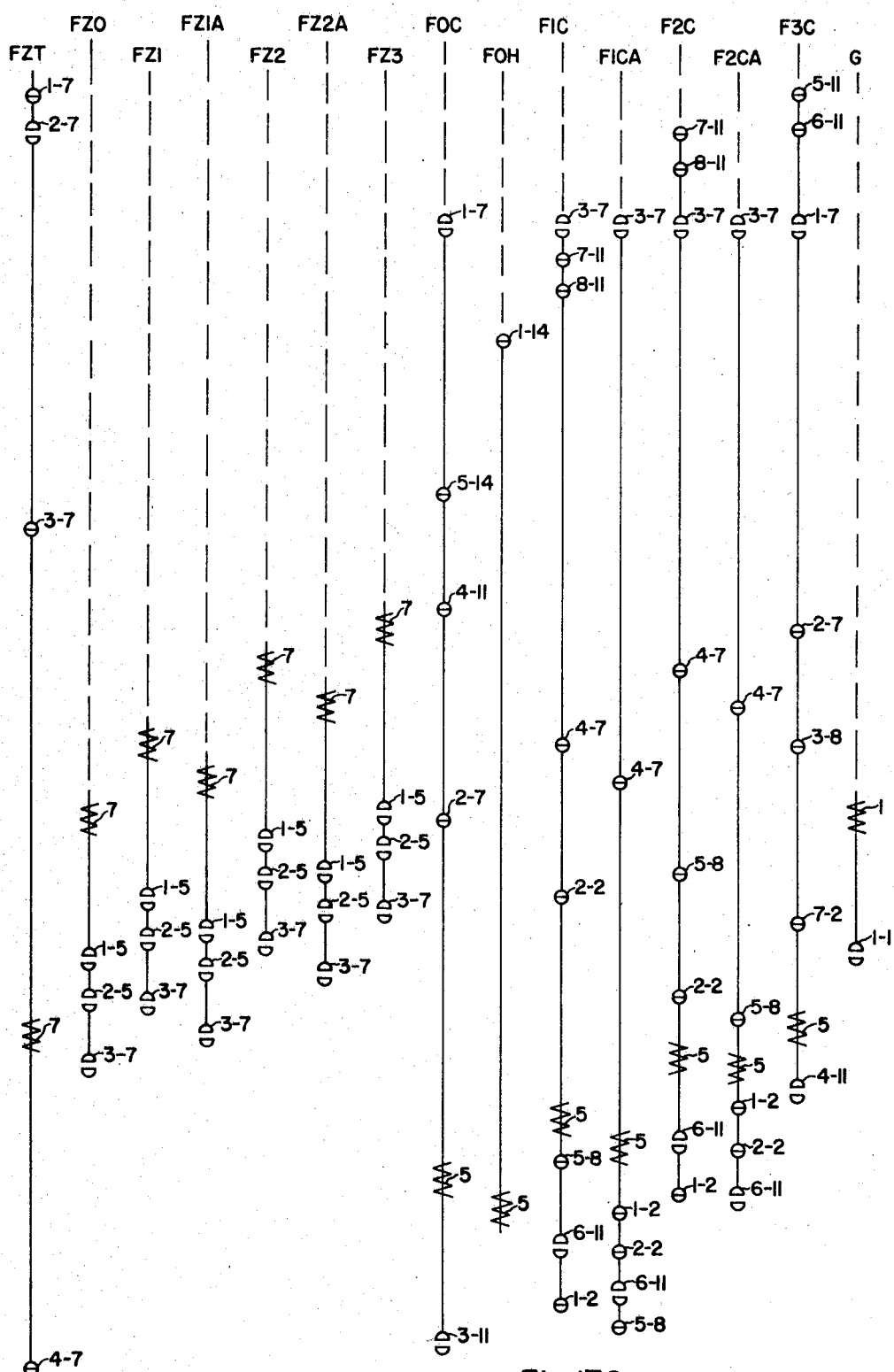
Figure 17D:
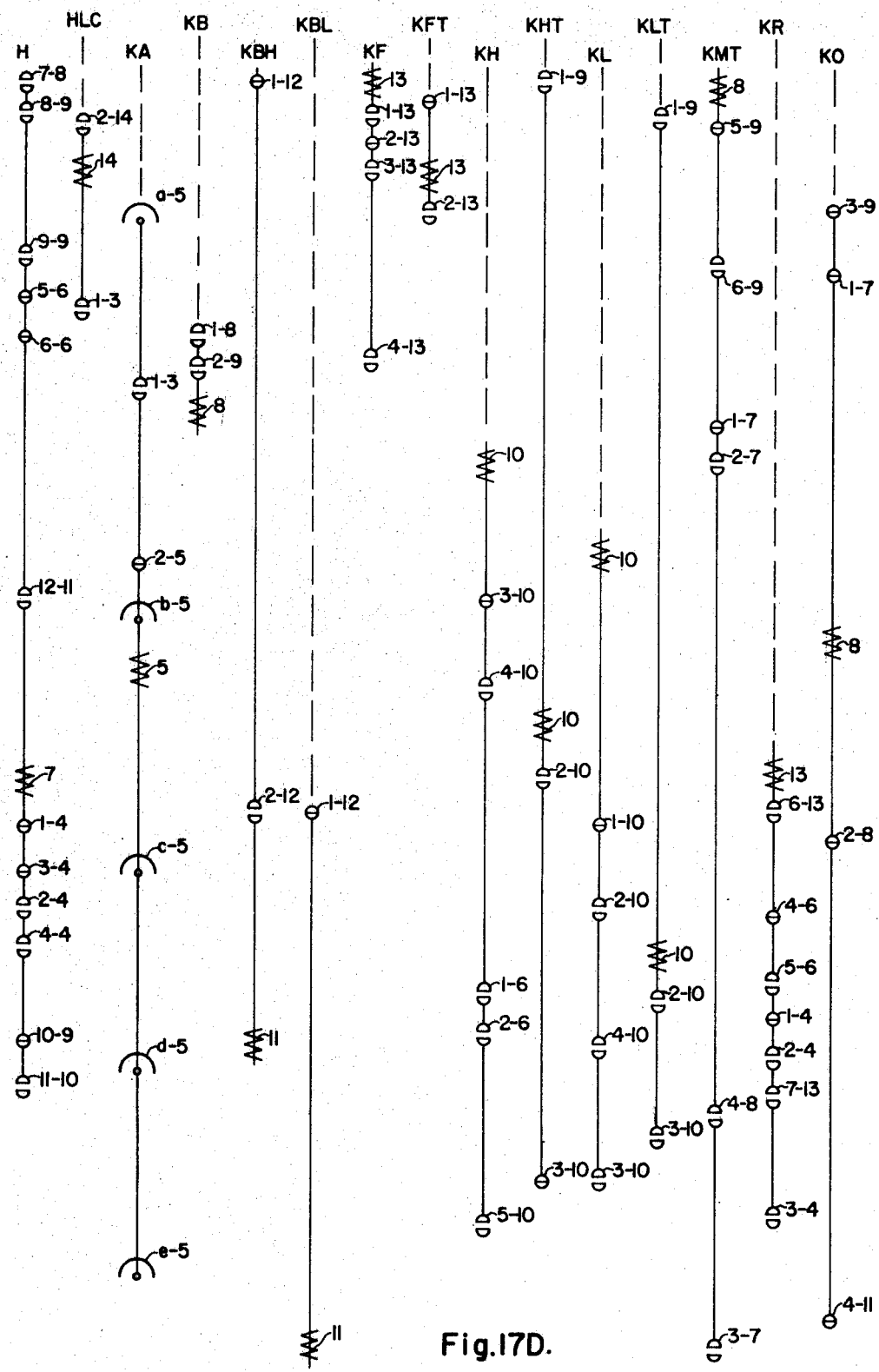
Figure 17E:
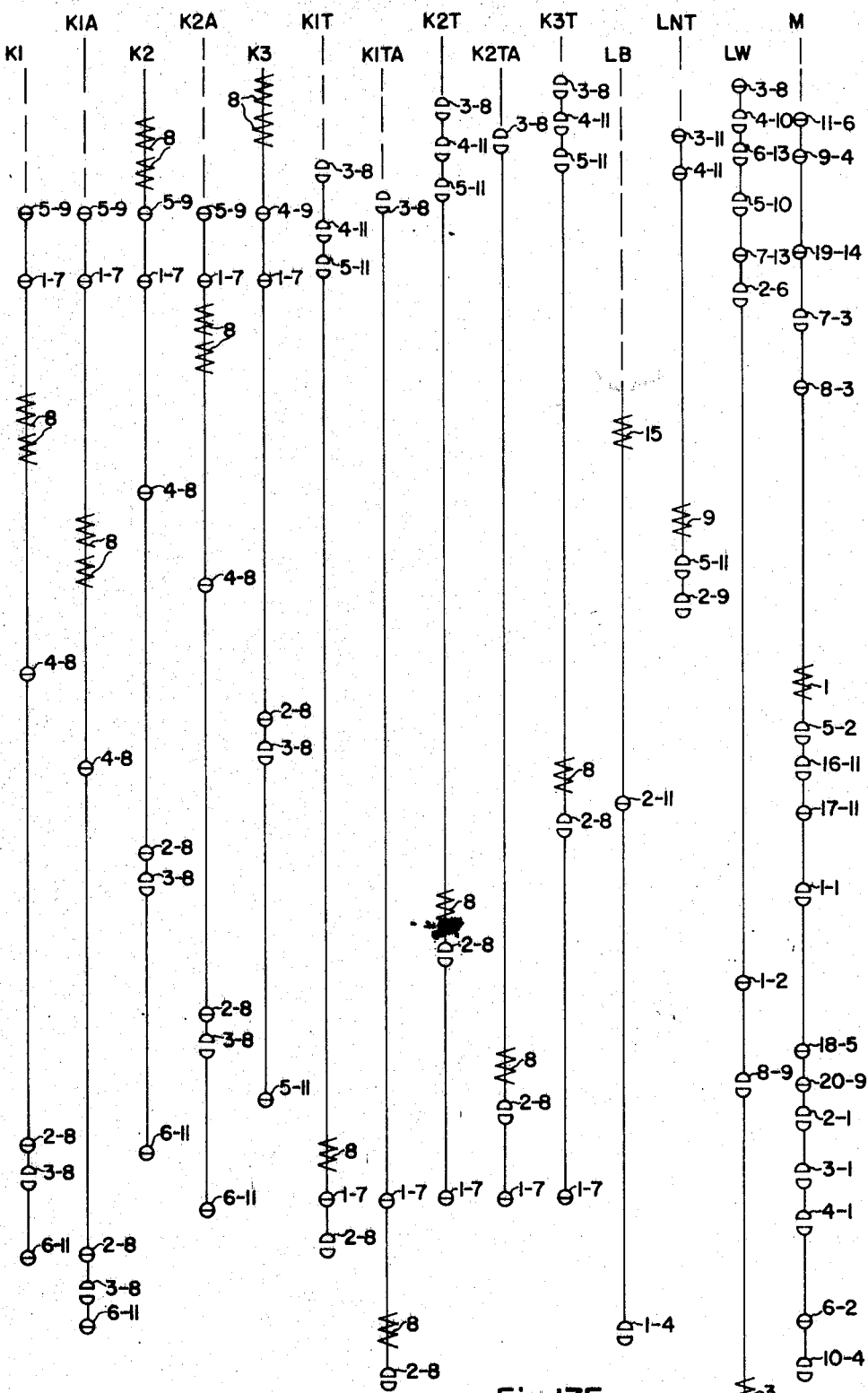
Figure 17F:
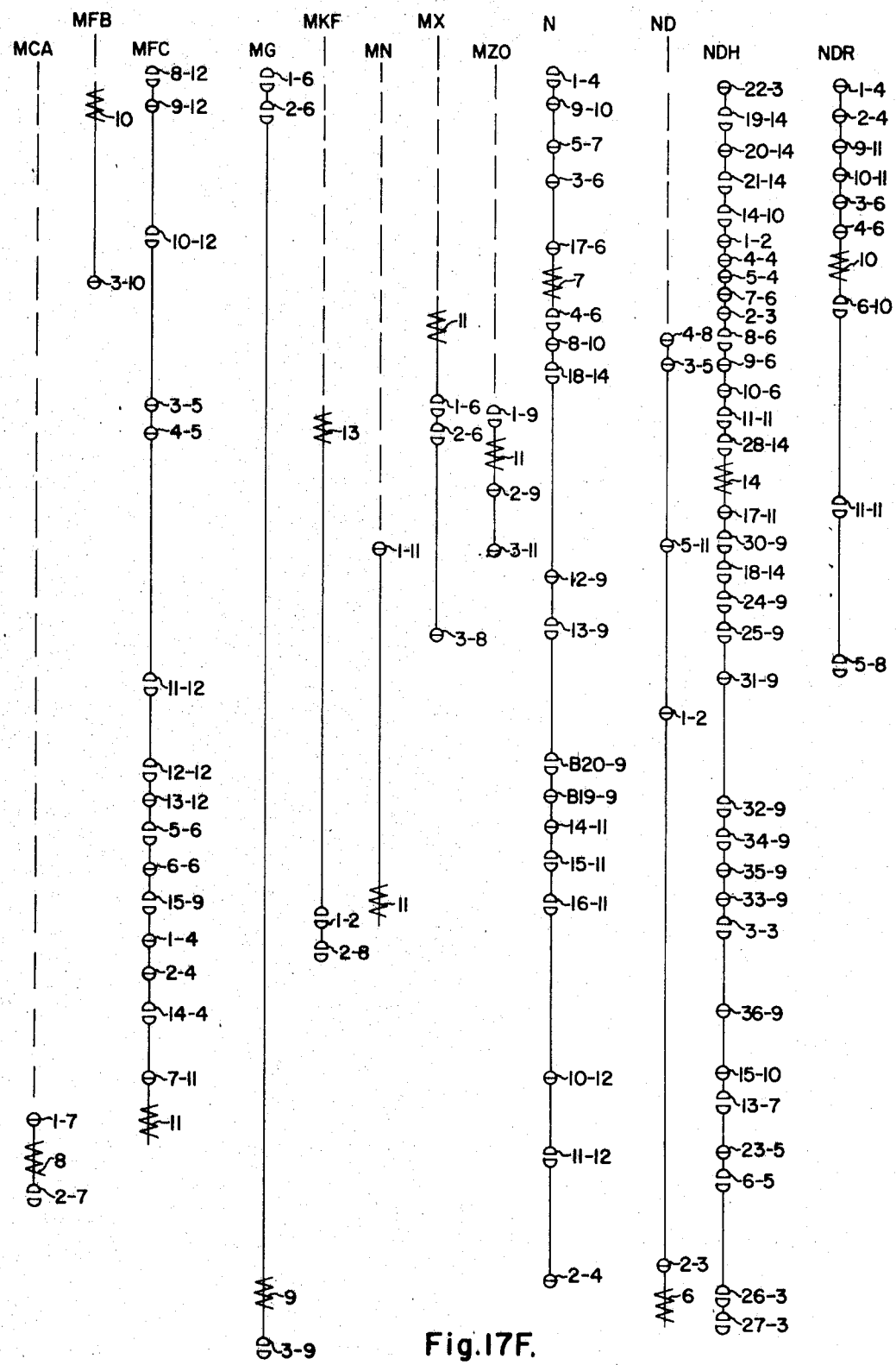
Figure 17G:
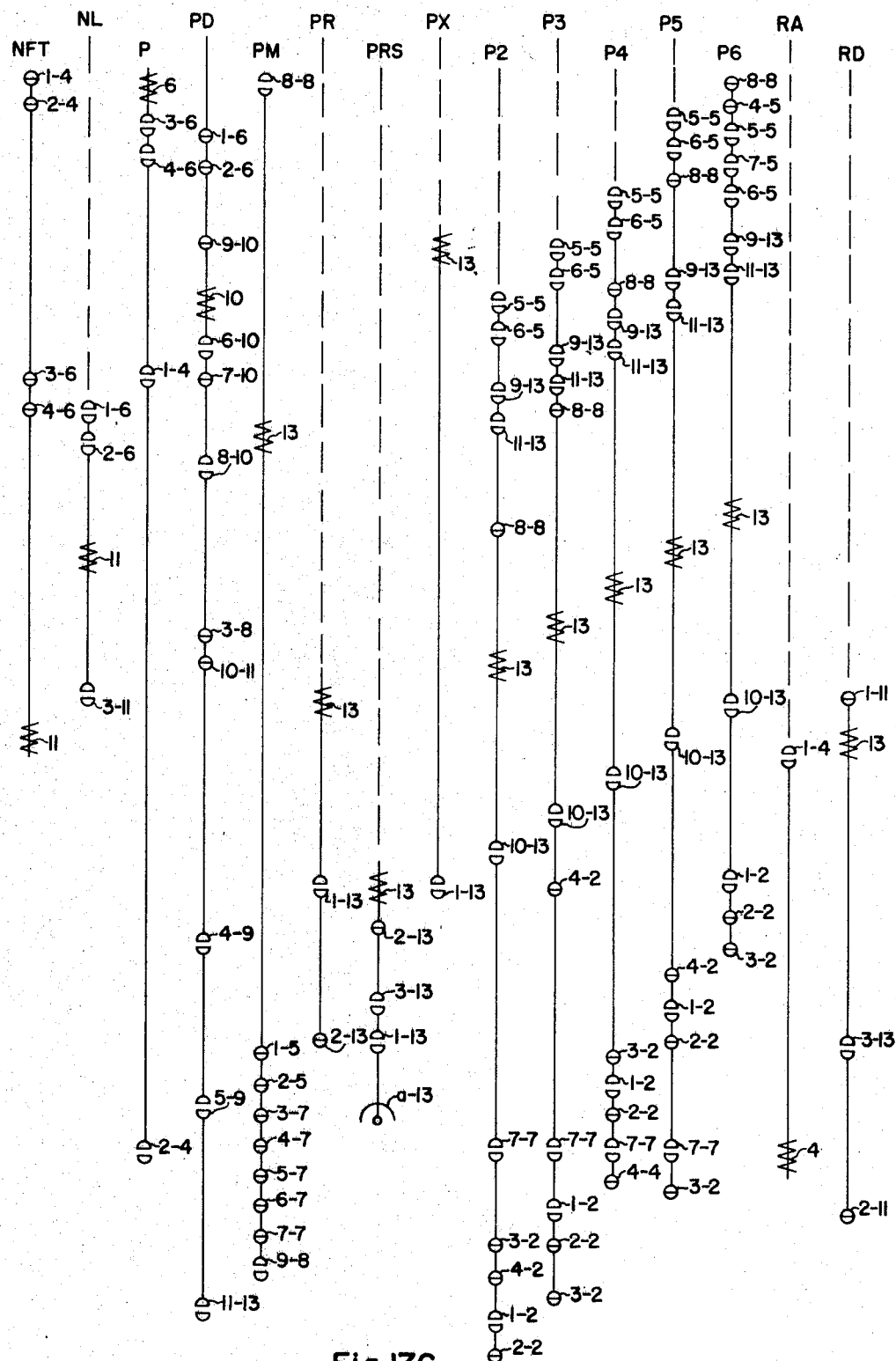
Figure 17H:
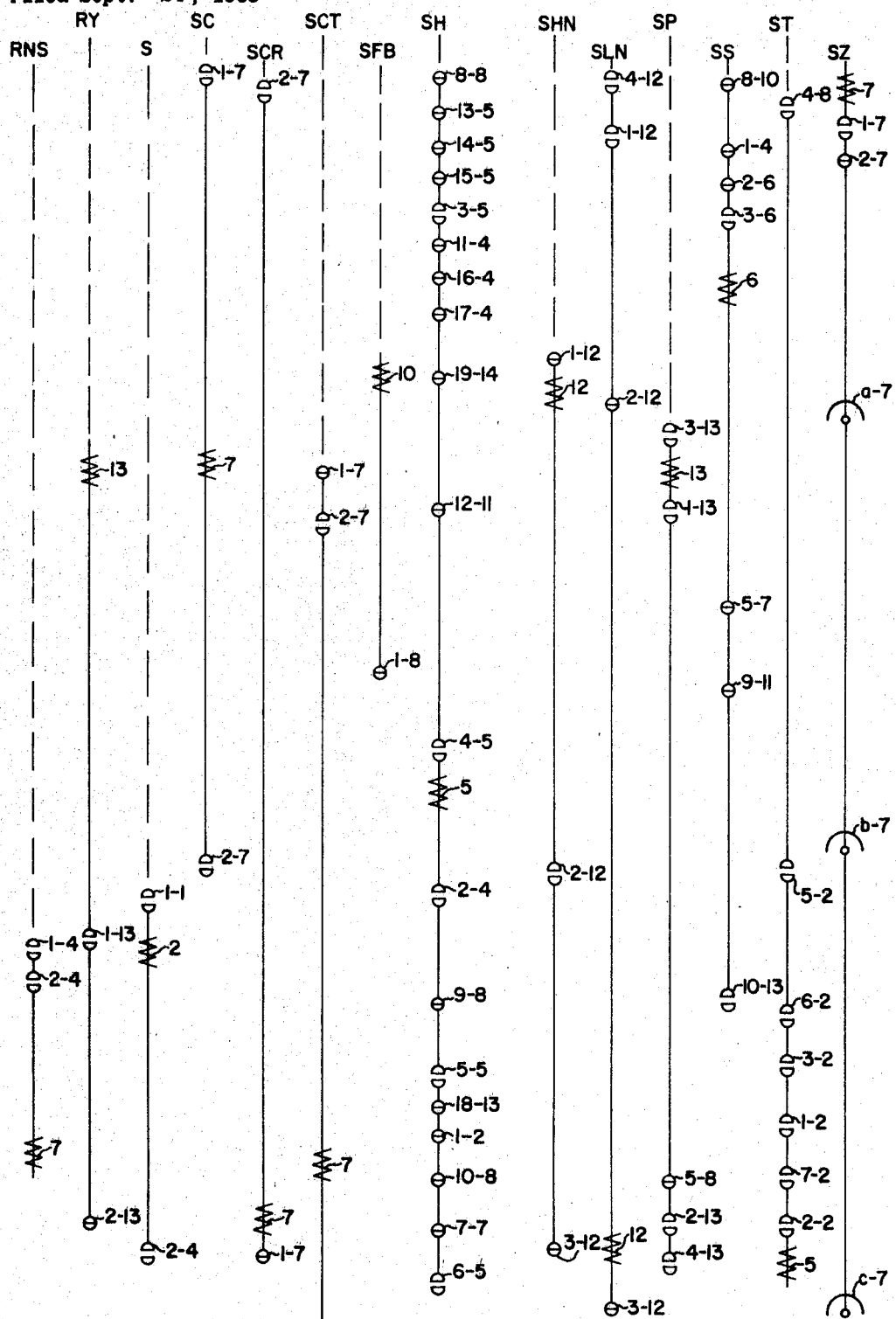
Figure 17I:
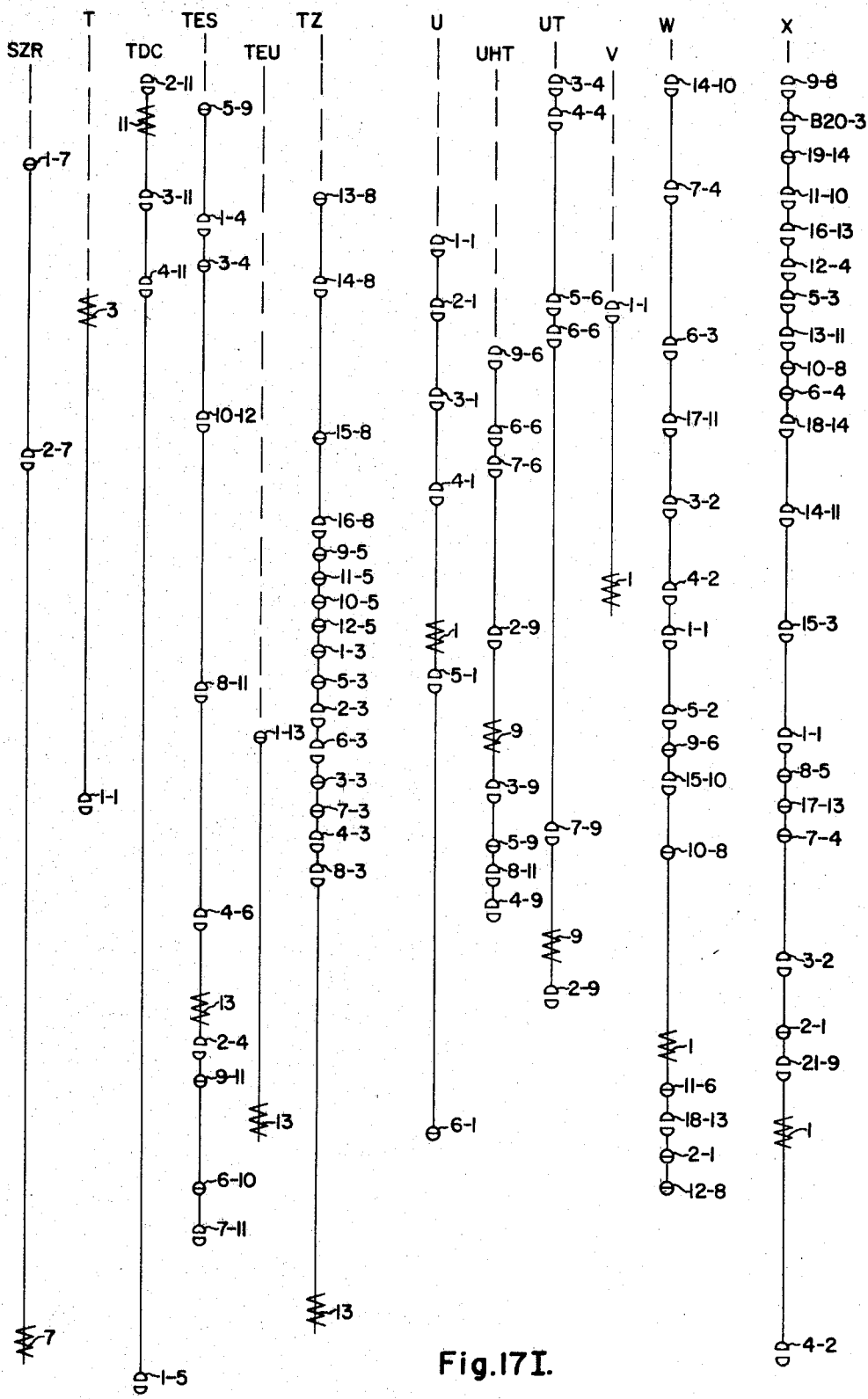
Figure 17J:
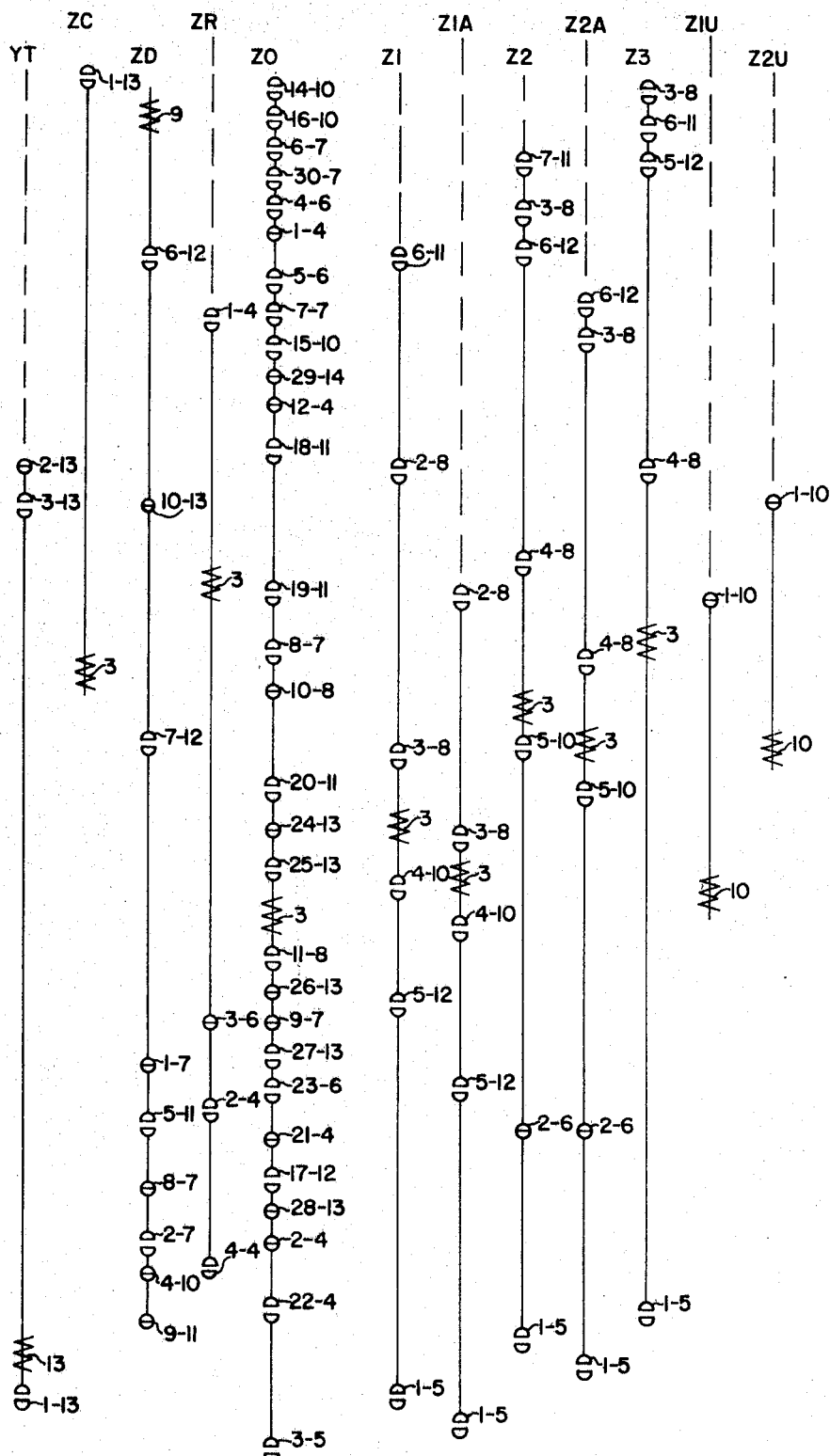
Figure 17K:
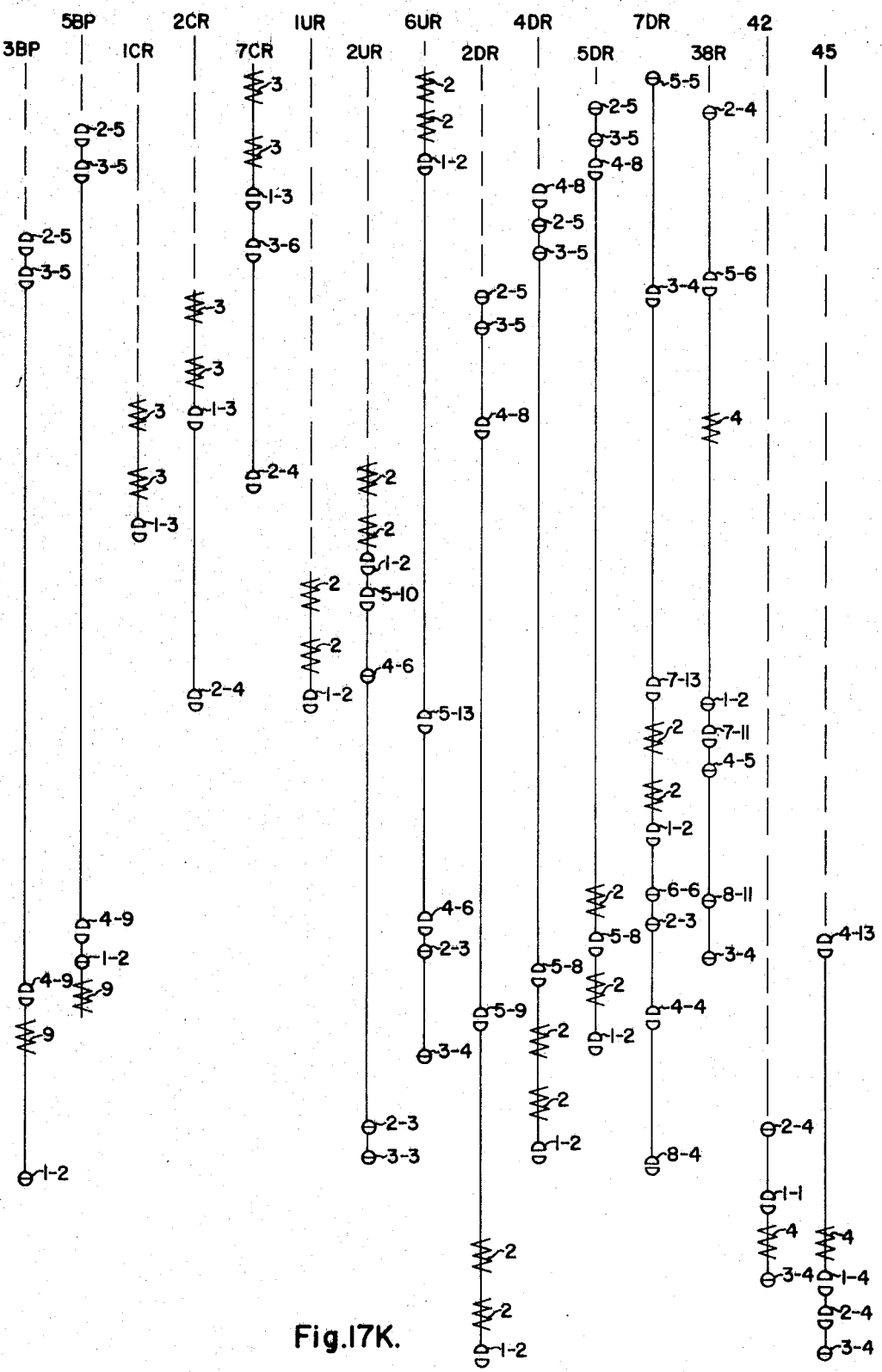
Figure 17L:
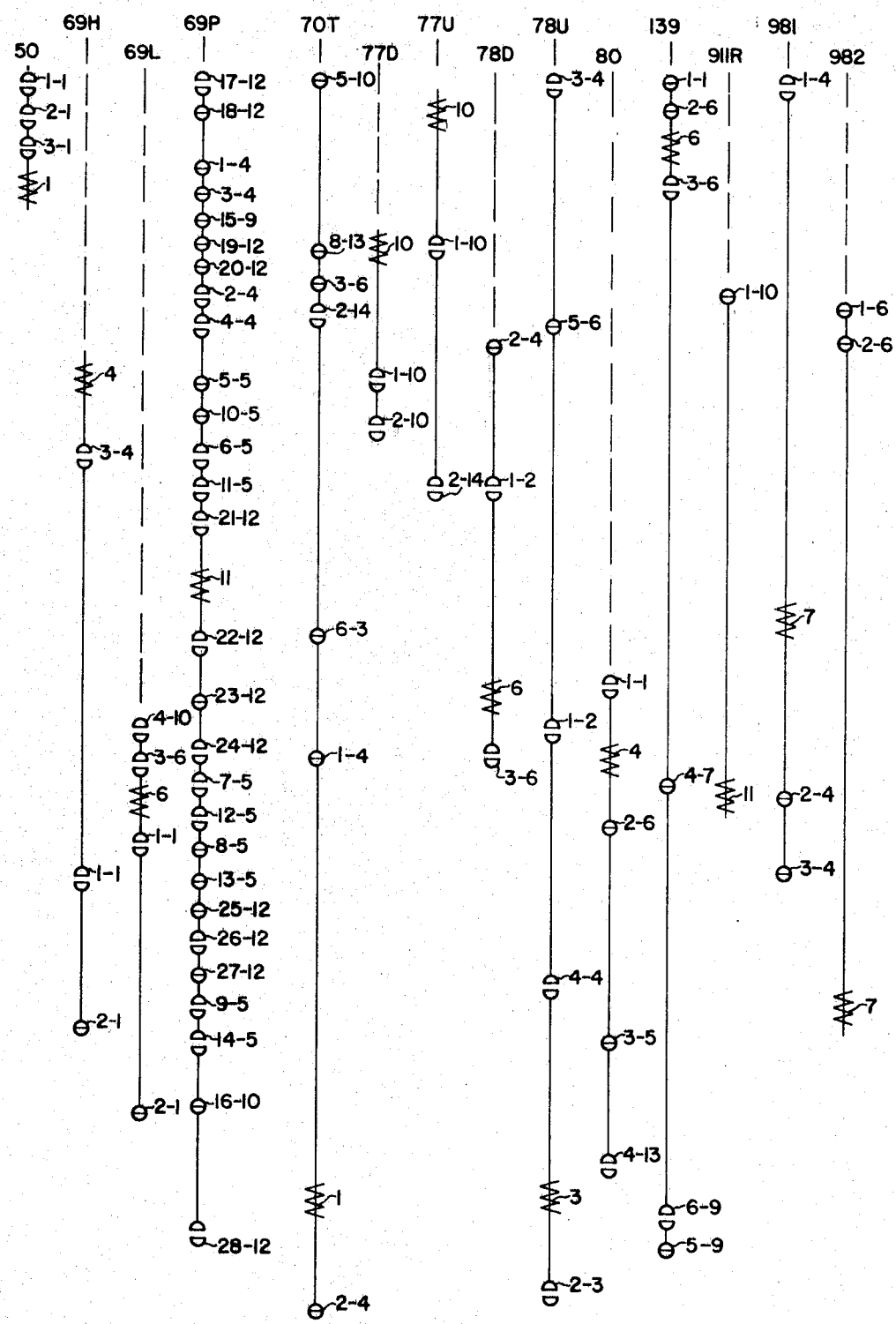

FIG. 16 is a top plan view with parts broken away, parts in section and parts not shown of the elevator car of FIG. 15 associated with a hoistway; and FIGS. 17 through 17L are key representations in stem form of electromagnetic relays, solenoids and switches and their respective associated contacts employed in the circuits of FIGS. 1 through 15. In these figures, the switches, solenoids and relays are arranged first in alphabetical and then in numeral sequence. Each stem is headed by a reference character which desginates the coil of the particular relay or switch with which it is associated. In some instances wherein groups of similar relays are employed, only representative relays in each group are shown in the key representations.

Although aspects of the invention may be incorporated in an elevator system having any desired number of elevator cars, arranged either for attendant operation or for automatic operation to serve any desired number of floors, the invention may be described adequately with reference to an elevator system arranged for fully automatic operation and serving a building or structure having six principal floors and a top extension or seventh floor. For this reason, the illustration and description of the invention will be directed particularly to such a system. Furthermore, a system comprising a bank of three elevator cars will suffice for the discussion of certain aspects of the invention, while other features thereof may be more clearly explained by reference to a system having four cars. In addition, for illustrative purposes the second through sixth floors served by the elevator system normally will be divided into first, second and third down zones, while the intermediate or second through fifth floors will be divided into low and high up zones. The first down zone comprises the second and third floors, the second down zone includes the fourth and fifth floors and the third down zone comprises the sixth floor. The low up zone includes the second and third floors and the high up zone comprises the fourth and fifth floors.

The elevator cars of the system, three or four as the case may be, are designated by the reference characters A, B, C and D. It will be assumed that only the cars A and C are capable of serving the top extension or seventh floor, while each of the remaining or six principal floors may be served by every car in the system.

Inasmuch as certain circuits for each of the elevator cars generally are similar, circuits for the elevator cars A and B are shown in substantial detail, and components for the elevator cars C and D are introduced as required for the discussion. Insofar as is practicable, circuits and components for the elevator car A are illustrated in the left column of FIGS. 1 through 6, and circuits for the elevator car B in the right column of such figures. FIGS. 7 through 14 in general illustrate circuits which are common to all of the elevator cars.

The equipment and control circuits for the elevator cars A, B, C and D include many similar components. For this reason, components for the cars B, C and D which are similar to a corresponding component for the elevator car A are identified by the reference character employed for the car A component preceded by the prefixes B, C and D, respectively. For example, associated with the elevator cars A, B, C and D are the next car relays N, BN, CN and DN. For these reference characters, the prefixes B, C and D indicate that the relays BN, CN and DN are associated, respectively, with the elevator cars B, C and D.

Electromagnetic switches and relays employed in the control circuits may have numerous contacts of either or both of two types. One type may be referred to as back or break contacts. Such contacts are closed when the associated switch or relay is deenergized and dropped out. The contacts are opened when the associated switch or relay is energized and picked up. The second type of contacts may be referred to as front or make contacts. Such contacts are opened when the associated switch or relay is deenergized and dropped out. These contacts are closed when the associated switch or relay is energized and picked up. The relays and switches in the accompanying schematic views are illustrated in their deenergized and dropped out conditions.

Each set of contacts of a relay or switch is designated by the reference character employed for the relay or switch, followed by a suitable numeral specific to the set of contacts. For example, the reference characters U1 and U6 designate, respectively, the first and sixth sets of contacts associated with the up switch U of the elevator car A. These contacts may be located by application of the key representations, FIGS. 17 through 17L, to the circuits of FIGS. 1 through 15.

Referring to FIGS. 17 through 17L, distributed along each stem located therein are the coil or coils and all of the contacts of the associated relay, solenoid or switch. Adjacent each coil is a numeral which indicates the figure number of the schematic view on which such coil appears. Adjacent each set of contacts is a pair of numerals separated by a dash. The first of these numerals indicates the number of the particular set of contacts under consideration, while the second of these numerals designates the particular schematic view on which the contacts are located.

The symbols designating the contacts on the schematic views and the key representative indicate whether a particular set of contacts are make or break. Each coil and set of contacts is positioned on its associated stem in the key representations in substantial horizontal alignment with its position in the schematic view on which it is located. Thus, a coil or set of contacts of a particular switch or relay may be found in the schematic views by first determining the key representation figure on which the switch or relay stem is located, according to its alphabetical or numerical order, locating the desired coil or contacts along its associated stem, noting the schematic view figure number on which the desired coil or contacts are located and finally by aligning the particular key representation figure horizontally with the particular schematic view so determined. The desired coil or set of contacts then will be found on such schematic view in substantial horizontal alignment with that coil or set of contacts on the key representation in use.

For example, in order to locate the coil and contacts of the up switch U in the schematic views, reference is first made to FIG. 17I, in which the stem for the up switch U is located. Proceeding along this stem, it will be found that the numeral 1 is adjacent the coil of the up switch U, indicating that such coil is located in FIG. 1 of the schematic views. In addition, it will be found that the numeral 1, indicating FIG. 1, follows the dash after the make contacts numbered 1 of the up switch U, while the numeral 1, also indicating FIG. 1, follows the dash adjacent the break contacts numbered 6 of the up switch U. Consequently, the coil of the up switch U, the make contacts U1 and the break contacts U6 all appear in FIG. 1. This coil and these contacts may be located in FIG. 1 by horizontally aligning FIG. 17I with FIG. 1, and the corresponding coil and contacts of the two figures will be found to be in substantial horizontal alignment. The location of all other coils and contacts in the circuits of FIGS. 1 through 15, may be determined by application of the key representations, FIGS. 17 through 17L, in a similar manner.

The control circuits of the present elevator system include a plurality of electromagnetic stepping switches, each of which has one or more levels. The stems for these stepping switches also appear in the key representation figures in their proper alphabetical sequence. Each level of a stepping switch is designated by the reference character employed for the switch followed by a suitable lower-case letter specific to the particular level, and each level is represented by a semicircle on its associated stem. For example, the stem for the assigned zone stepping switch KA will be found on FIG. 17D. It will be noted therein that the coil KA, the cam-operated contacts KA1, the break contacts KA2 and the five levels KA$a$, KA$b$, KA$c$, KA$d$ and KA$e$ all are located in FIG. 5 of the schematic views. The location of these components in FIG. 5 may be ascertained in a manner which will be clear from the preceding discussion.

Since the circuits for the elevator cars A and B in FIGS. 1 through 6 generally are similar, the key representation drawings, FIGS. 17A through 17L, include components specific to the car A and components common to all of the elevator cars. Car B components in FIGS. 1 through 6 may be located in a manner which will be clear from the preceding discussion.

In order to facilitate the presentation of the invention, certain apparatus specific to the car A and certain apparatus common to all of the elevator cars are set forth as follows:

APPARATUS FOR ELEVATOR CAR A

D—Down switch
DC—Door-close solenoid
DCA—Down call above relay
DO—Door-open solenoid
DS—Door relay
E—Inductor slowdown relay
F—Inductor stopping relay
FA—Down call assigned relay
FCR—Demand response relay
FR—Available car relay
FRS—Auxiliary available car relay
FU—Up call assigned relay
FUH—High up zone assigned relay
G—Holding relay
KA—Assigned zone stepping switch KB—Down zone call below relay
KF—Convention floor loading relay
KFT—Convention floor timing relay
LB—Detector relay
LW—Load relay
M—Running relay
N—Next car relay
ND—Notching relay
P—Parking relay
PX—Spotting loading relay
RA—First auxiliary running relay
S—Floor call stopping relay
SH—Down zone assigned relay
SS—Start relay
ST—Assigned zone stopping relay
T—Car call stopping relay
TDC—Priority zone stopping relay
U—Up switch
V—Speed relay
W—Up preference relay
X—Down preference relay
ZC—Convention floor position relay
Z0, Z1, Z1A, Z2, Z2A, Z3—Zone position relays
1CR through 7CR—Car call registering relays
38R—Car call above relay
42—Auxiliary door-control relay
45—Door-control relay
50—Motor-generator starting relay
69H—High call reversal relay
69L—Low call reversal relay
70T—Non-interference relay
78D—Up call below relay
78U—Up call above relay
80—Second auxiliary running relay
139—Motor-generator shutdown relay
981—Lower terminal no-start relay

APPARATUS COMMON TO ALL CARS

AH—Master high up zone assigned relay
AHC—Highest down call relay
AL—Low up zone assigned relay
DT—Down by-pass timing relay
DU—Up zone demand relay
DUL—Low up zone demand relay
DUH—High up zone demand relay
FRM—Master available car relay
FSH—High zone stepping switch
FSL—Low zone stepping switch
FZM—Master zone relay
FZT—Zone resetting relay
FZ0, FZ1, FZ1A, FZ2, FZ2A, FZ3—Zone relays—F0C, F1C, F1CA, F2C, F2Ca, F3C—Assigned zone relays
H—Motor-generator running relay
KBH—High zone demand relay
KBL—Low zone demand relay
KH—High up zone call relay
KHT—High up zone timing relay
KL—Low up zone call relay
KLT—Low up zone timing relay
KMT—Down zone priority relay
K0, K1, K1A, K2, K2A, K3—Down zone demand registering relays
K1T, K1TA, K2T, K2TA, K3T—Down zone timing relays
LNT—Absence timing relay
MCA—Master down call above relay
MFB—Lower terminal surplus car relay
MFC—Multiple available car relay
MG—Motor-generator timing relay
MKF—Master convention floor loading relay
MN—Master next car relay
MX—Master down preference relay
MZ0—Master car position relay
NDH—Intense up peak relay
NDR—No demand return relay
NFT—Loading relay
NL—Lonely car relay
PD—Instant dispatch relay
PM—Spotting interrupting relay
PR—Spotting resetting relay
PRS—Spotting stepping switch
P2 through P6—Floor spotting relays
RNS—No scan relay
RY—Spotting resumption relay
SC—Down demand mid-point relay
SCR—Pulsing relay
SCT—Firing relay
SFB—Lower terminal non-next relay
SHN—High zone no selection relay
SLN—Low zone no selection relay
SP—Spotting transfer relay
SZ—Down demand mid-point stepping switch
SZR—Scan relay
TZ—Zone transfer relay
UHT—First loading interval relay
UT—Second loading interval relay
YT—Spotting interrupting timing relay
ZD—Down zone demand relay
Z1U—Low up zone position relay
Z2U—High up zone position relay
3BP, 5BP—Passing relays
1UR through 6UR—Up floor call registering relays
2DR through 7DR—Down floor call registering relays
69P—Closest car relay
77D—Down by-pass relay
77U—Up by-pass relay
911R—Clearance relay
982—Master lower terminal relay In addition to the foregoing apparatus, certain relays conveniently may be listed separately as follows, since they do not, strictly speaking, fall within either of the above categories, as will become apparent as the discussion proceeds:

DH—High zone demand relay
DHX—High zone down relay
DL—Low zone demand relay
DLX—Low zone down relay
F0H—Assigned zone relay
HLC and CHLC—High zone low floor relays
BLLC and DLLC—Low zone high floor relays
KR—Lower terminal extension demand relay
RD—Extension car scanning relay
TES—Extension car scanning relay
TEU—Extension car up relay
ZR—Extension floor position relay In order to present the invention in an orderly manner, the apparatus and control circuits for each of the FIGS. 1 through 14 will be discussed separately. Thereafter, a number of typical operations of the entire system will be considered.

Since many similar components are employed in the apparatus and control circuits for the elevator cars A, B, C and D, the description of the apparatus and control circuits will be directed primarily to those associated with the car A. With the notation employed, similar components employed for the other elevator cars readily may be traced. Where different components are employed for certain of the elevator cars, these different components will be discussed as required.

For simplifying the discussion of the invention, the invention will be described as applied to the elevator control system of the Savino et al., application Ser. No. 110,464, filed May 16, 1961 which is now Patent 3,292,-736 and referred to hereafter for reference purposes. The conventions employed herein are the same as those employed in the Savino et al. application. A comparison of the Savino et al. application with the present application will reveal that whereas the three elevator cars of the Savino et al. application serve a structure having only six floors, the present system is assumed ot serve in addition an extension or seventh floor. It will be noted that several of the control components associated with the extension floor are similar to corresponding components for the remaining floors, the latter of which are described in detail in the Savino et al. application. A further comparison will disclose that FIGS. 1 through 12 herein respectively are similar to the same figures of the Savino et al. application, while FIGS. 15 and 16 herein are the same as FIGS. 13 and 14, respectively, of the application. A number of circuits and components which are not shown in the Savino et al. prior application are shown in the present FIGS. 1 through 12 in heavy lines. Finally, each of FIGS. 13 and 14 of the present application wholly illustrates circuits which do not appear in the Savino et al. application.

FIGURE 1

Figure 1:
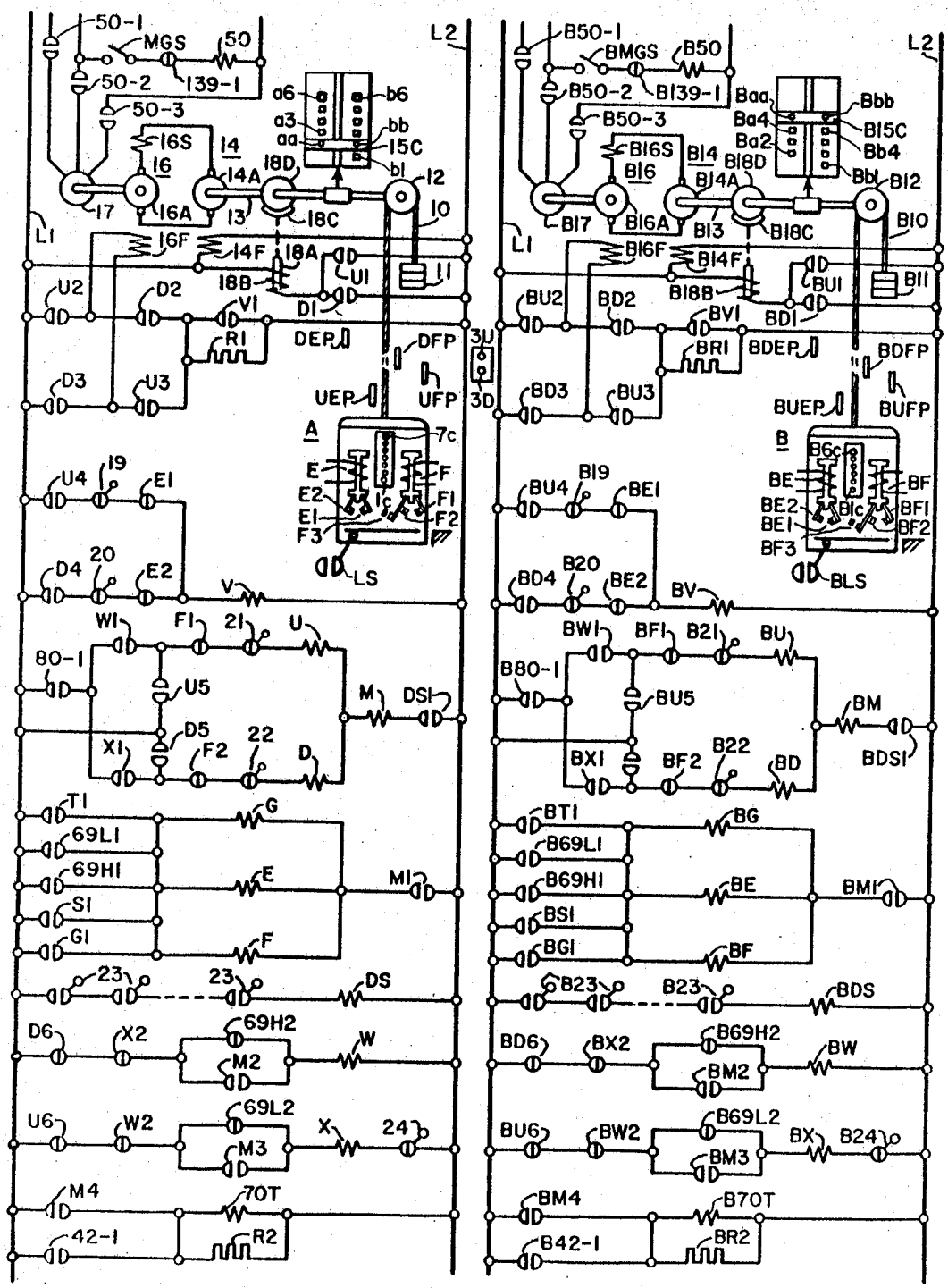
FIGURE 1 is a schematic view in straight-line form of a portion of an elevator control system embodying the invention.

FIG. 1 shows the elevator cars A and B and certain control circuits associated therewith. The elevator car A (illustrated in the left column) is assumed to be stopped at the second floor of the structure, whereas the elevator car B (illustrated in the right column) is assumed to be stopped at the fifth floor of the structure.

In FIG. 1 the following apparatus, in addition to certain of the relays and switches listed above, is common to both the present FIG. 1 and FIG. 1 of the aforesaid Savino et al. application:

Apparatus for car A

10—Rope
11—Counterweight
12—Sheave
14—Direct-Current motor
L1 and L2—Direct-current buses
3U—Up floor-call push button
3D—Down floor-call push button
E—Inductor slowdown relay
F—Inductor stopping relay
UEP, DEP, UFP and DFP—Inductor plates
15—Floor selector
16—Direct-current generator
17—Induction motor
MGS—Manually-operable switch
18B—Brake coil As explained heretofore, similar components are provided for the remaining elevator cars in the system.

In addition to the foregoing components, FIG. 1 also shows a plurality of car-call push buttons 1c through 7c for the elevator car A, which are actuated for the purpose of registering calls for the first through seventh floors, respectively, as desired by passengers entering the car A. Similar push buttons are provided for the car C, since it is assumed that such car also serves all seven floors. In the aforesaid Savino et al. application, no elevator car has a car-call push button for the seventh floor, inasmuch as all of the cars therein serve only six floors. It will be noted that since the car B is assumed to be incapable of serving the seventh floor, no seventh floor car-call push button is provided therefor, and similarly for the car D.

It also will be observed that the elevator car A has a normally-open load switch LS. This switch is operated to close when a predetermined load, such as capacity load, is disposed within the car A. The switch LS replaces the load switch LW and its associated contacts LW1 through LW5 of the aforesaid Savino et al. application.

With the exception of the foregoing modifications, FIG. 1 is similar to FIG. 1 of the Savino et al. application and may be understood more fully by reference to such application.

FIGURE 2

Figure 2:
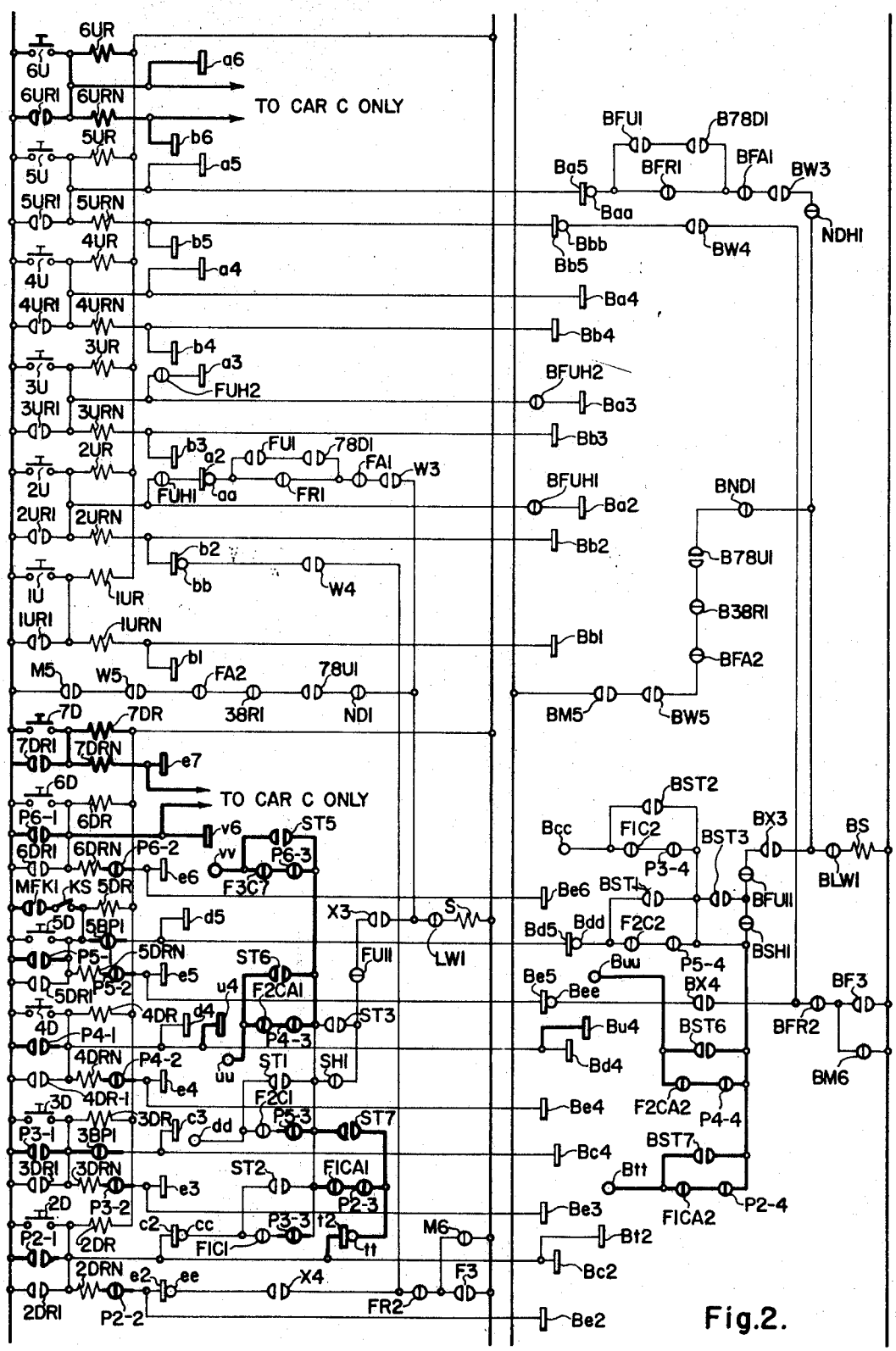
FIGS. 2 through 14 are schematic views with circuits shown in straight-line form of further portions of the elevator control system illustrated in FIG. 1.

FIGURE 2 shows the floor call registration circuits for the elevator cars. The upper part of the figure illustrates up floor call registering circuits, while the lower part shows down floor call registering circuits.

Except for the following additions, FIG. 2 is similar to FIG. 2 of the aforesaid Savino et al. application.

The up floor call push button 6U, its associated up floor call registering relay 6UR and cancelling coil 6URN and their associated floor selector contact segments (for example, the contact segments a6 and b6 for the car A) for the sixth floor have been added to the group of similar components for the first through fifth floors, respectively, inasmuch as the present elevator system now serves a seventh or extension floor. Since only the cars A and C are assumed to serve the seventh floor, similar floor selector contact segments need not be provided for any of the remaining cars in the elevator system.

It will be noted that for the elevator car B, break contacts NDH1 of the intense up peak relay NDH are provided for the purpose of controlling in part the energization of the floor call stopping relay BS for the car B. Thus, during intense up peak operation, the contacts NDH1 are open to prevent energization of the floor call stopping relay BS when the elevator car B is conditioned for travel in the up direction (make contacts BW3 are closed).

Turning back for a moment to FIG. 1, as pointed out in the preceding discussion, the load switch LS for the car A replaces the load switch LW and its associated contacts LW1 through LW5 of the aforesaid Savino et al. application. Returning to FIG. 2 and referring to the floor call stopping relay S, the present car A load relay break contacts LW1 directly in series therewith similarly replace the load switch break contacts LW1 of the Savino et al. application and perform the same function as the latter contacts. Thus, as long as the car A is fully loaded, the relay LW is picked up and its contacts LW1 are open to prevent energization of the relay S and consequently to cause the car A to by-pass each floor for which a floor call may be registered.

A down floor call push button 7D and its associated down floor call registering relay 7DR, cancelling coil 7DRN and floor selector contact segments, e.g. the contact segment e7 for the car A, have been added to the group of similar components for the second through sixth floors, respectively. The contact segment e7 is connected to a corresponding contact segment (not shown) for only the elevator car C, since only the cars A and C serve the seventh floor, as aforesaid.

A number of additional floor selector contact segments and respective associated brushes and relay contacts also have been added in FIG. 2. Thus, a contact segment V6 (which is connected to a corresponding contact segment Cv6, not shown for the car C) is associated with the down floor call registering relay 6DR for the sixth floor, inasmuch as the elevator car A (or C) may be required to stop at the sixth floor for the purpose of answering a registered down floor call therefor while traveling in the down direction from the seventh floor. The segment v6 cooperates with a brush vv. It also will be observed that floor selector contact segments t2 and u4 and their respective associated brushes tt and uu are provided for the second and fourth floors, respectively. The segments t2 and u4 are connected to corresponding contact segments for each of the other elevator cars in the bank.

Certain relay contacts in series with each of the newly added floor selector brushes control the stopping of the associated elevator car in response to a registered down floor call for the corresponding floor. For example, if a down floor call is registered for the second floor, if the elevator car A is traveling down toward the second floor, if the car A specifically is assigned to answer the down floor call for the second floor (break contacts F1CA1 and SH1 are open), or if the second floor is the spotted floor during spotting operation of the elevator system (break contacts P2–3 and SH1 are open), the floor call stopping relay S may be energized to initiate a stopping operation of the car A at the second floor only at the brush tt engages its contact segment t2 when the car A approaches the second floor and the assigned zone stopping relay ST picks up to close its make contacts ST3 in parallel with the contacts SH1 and to close its make contacts ST7 in parallel with the contacts F1CA1 and P2–3.

The operation of the relay contacts respectively associated with the remaining down floor call registering relay contact segments and brushes will be understood from the preceding discussion and by reference to the aforesaid Savino et al. application.

During energization and pickup of one of the floor spotting relays P2 through P6 to indicate that the associated floor is the spotted floor during spotting operation of the elevator system, an automatic or artificial down floor call continuously is registered for such floor. For example, if the fourth floor is the spotted floor, the floor spotting relay P4 for the fourth floor is picked up to close its make contacts P4–1 in parallel with the down floor call push button 4D and to open its break contacts P4–2, thus preventing energization of the cancelling coil 4DRN. Consequently, as long as the relay P4 remains picked up, a down floor call is registered automatically for the fourth floor. It will be apparent that an artificial down floor call is registered for each of the second, third, fifth and sixth floors in a similar manner during spotting operation of the elevator system.

It will be recalled that the present invention includes means for providing special elevator service for a convention floor. For illustrative purposes, the fifth floor is assumed to be a convention floor. Referring now to the down floor call circuits for the fifth floor, it will be noted that a manually-operable switch KS and make contacts MKF1 of the master convention floor loading relay are connected serially in parallel with the down floor call push button 5D for the fifth floor. This relay may be operated to close its contacts MKF1 upon the loading to capacity of any elevator car which is stopped at the fifth floor while conditioned for down travel. Once closed, the contatcts MKF1 remain closed for at least a predetermined period of time thereafter. Thus, if the switch KS and the contacts MKF1 both are closed, a down floor call automatically is registered therethrough for the fifth floor, provided that the associated cancelling coil 5DRN is deenergized to indicate that no elevator car conditioned for down travel is stopped at the fifth floor.

It also will be recalled that during certain periods of substantially increased traffic demand, it is desired to insure that each of a plurality of floors in a zone receives equitable elevator service. To this end and bearing in mind that the second down zone comprises the fourth and fifth floors, it will be observed that break contacts 5BP1 of the passing relay 5BP for the fifth floor are connected in series with each of the floor selector contact segments in the respective $d$ rows for the fifth floor. If any elevator car conditioned for down travel becomes loaded to capacity at the fifth floor when a down floor call is registered for the fourth floor, the contacts 5BP1 open. Consequently, the aforesaid contact segments are rendered ineffective for stopping at the fifth floor, in response to a down floor call subsequently registered therefor, a car which otherwise is in a condition so to stop, until the previously registered down floor call for the fourth floor is answered, as a result of which the contact 5BP1 reclose. It will be noted that break contacts 3BP1 are similarly associated with the third-floor down floor call car stopping circuits for a similar purpose with respect to the first down zone, which comprises the second and third floors.

FIGURE 3

Figure 3:
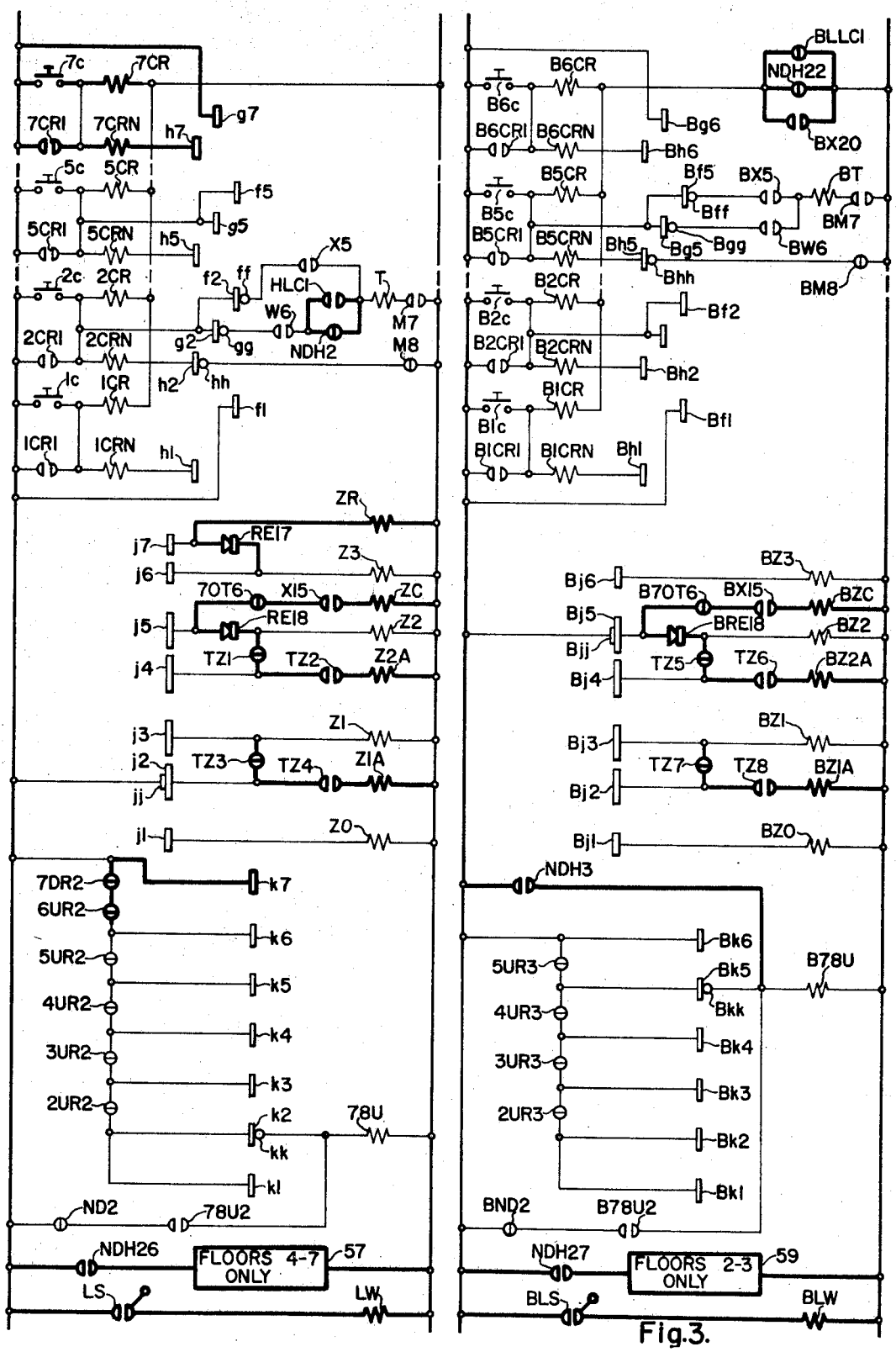

Car call registration circuits are illustrated for the elevator cars A and B in the upper part of FIG. 3. This figure also shows circuits associated with the zone position relays Z0, Z1A, Z1, Z2A, Z2, ZC, Z3 and ZR, with the up call above relay 78U and with the load relay LW.

The present FIG. 3 is similar to FIG. 3 of the aforesaid Savino et al. application except for the following modifications.

Inasmuch as the elevator car A is capable of serving the seventh or extension floor, car A car call circuits for the seventh floor have been added. These circuits include a car call push button 7c, a car call registering relay 7CR, cancelling coil 7CRN and floor selector contact segments $g7$ and $h7$. The arrangement of such components is similar to that shown for the corresponding car A sixth-floor components in the Savino et al. application. Since the elevator car B is incapable of serving the seventh floor, no seventh-floor car call circuits are shown for such car.

For the elevator car A, parallel make contacts HLC1 and break contacts NDH2 are provided for controlling, in part, the energization of the car call stopping relay T. The contacts NDH2 are open as long as the elevator system is conditioned for intense up peak operation, while the contacts HLC1 close each time the car A stops at the second or third floor or as it reaches the fourth floor and, once closed, remain closed as long as the car A is conditioned for up travel. Thus, when the elevator system is not conditioned for intense up peak operation, the contacts NDH2 are closed, and operation of the contacts HLC1 has no effect on operation of the car A car call stopping relay T. But during intense up peak operation, the relay T can be energized and picked up, if the car A is conditioned for up travel (make contacts W6 are closed), only when the contacts HLC1 are closed.

It will be observed that the circuits associated with a car call stopping relay BT for the car B is not modified similarly. However, it will be noted that three parallel sets of contacts have been inserted in the line extending in common from the car B car call registering relays B1CR through B6CR to the bus L2. Thus, if the elevator system is not conditioned for intense up peak operation, break contacts NDH22 are closed, and operation of break contacts BLLC1 and make contacts BX20 in parallel therewith is without effect on operation of the car B. During intense up peak operation, on the other hand, the contacts NDH22 are open, and the car B car call registering relays may be energized only if the contacts BX20 are closed to indicate that the car B is conditioned for down travel or, if the car B is conditioned for up travel (the contacts BX20 are open), only if the contacts BLLC1 are closed to signify that the car B floor selector carriage is not in its third-floor position. The reasons for these differences between the car call stopping and registering circuits for the cars A and B will become apparent hereafter.

Referring now to the middle portion of FIG. 3, the zone position relay Z1A may be energized to indicate that the elevator car A is adjacent the second floor (the car A floor selector brush $jj$ is in engagement with its associated contact segment $j2$), provided that make contacts TZ4 of the zone transfer relay are closed. Closure of the contacts TZ4, however, is accompanied by opening of the associated break contacts TZ3 to disconnect the zone position relay Z1 from the contact segment $j2$. As a result, when the relay TZ is picked up, the relay Z1 may be energized only when the car A is at or adjacent the third floor and the brush $jj$ engages the contact segment $j3$, but not when it is positioned at or adjacent the second floor, as is the case when the zone transfer relay is dropped out and its contacts TZ3 are closed.

From the preceding discussion, it will be understood that the zone position relays Z2A and Z2 operate in a similar manner with regard to operation of break contacts TZ1 and make contacts TZ2 of the zone transfer relay when the car A is adjacent the fourth or fifth floor and the brush $jj$ engages the contact segment $j4$ or $j5$, respectively. It will be observed that the contact segment $j5$ also is associated with the zone position relay ZC. Thus, if the elevator car A is located at the fifth floor, which is assumed to be a convention floor (the brush $jj$ is in engagement with the contact segment j5), if its non-interference time has expired (break contacts 70T6 are closed) and if the car A is conditioned for down travel (make contacts X15 are closed), the zone position relay ZC is energized and picked up. A blocking rectifier RE18 is provided for the purpose of preventing pickup of the relay ZC through break contacts TZ1 when the car A is located at the fourth floor and the brush jj is in engagement with the contact segment j4. (It is assumed that the bus L1 is positive.) Such rectifiers are well known in the art.

Inasmuch as the elevator car A serves the seventh floor, a car A floor selector contact segment is provided in the j row for the seventh floor. The contact segments j6 and j7 and the brush jj are so proportioned that the zone position relay Z3 is energized and picked up when the car A floor selector carriage is located in either its sixth- or seventh-floor position and the brush jj engages the contact segment j6 or j7, respectively. It will be noted, however, that a blocking rectifier RE17 prevents pickup of the relay ZR when the brush jj engages the contact segment j6 and that, therefore, the relay ZR relay be picked up only when the brush jj is in engagement with the contact segment j7. Since it is assumed that the elevator car B is incapable of serving the seventh floor, no contact segment for the seventh floor in the bj row and no relay similar to the zone position relay ZR for the car A need be provided for the car B. With these exceptions, the zone position relay circuits for the car B are similar to those for the car A.

Turning now to the up floor call above circuit 25 for the elevator car A, this circuit is provided with a contact segment k7, which is connected directly to the bus L1, since the seventh floor is the highest floor served by the car A, and which is engaged by the brush kk when the floor selector carriage associated with the car A is in its seventh-floor position. Disposed between the segment k7 and the segment k6 for the sixth floor are serially connected break contacts 7DR2 of the down floor call registering relay for the seventh floor and 6UR2 of the up floor call registering relay for the sixth floor. Only respective up floor call registering relay contacts for the second through sixth floors appear in the circuit 25, but the contacts 7DR2 also are included in this circuit for a purpose discussed hereinafter. Once again, no seventh-floor components need be provided in the up floor call circuit B25 for the car B. However, if the elevator system is conditioned to provide intense up peak service, make contacts NDH3 are closed for continuously energizing the up call above relay B78U for the car B. Consequently, operation of break contacts 2UR3 through 5UR3 and BND2 and make contacts B78U2 is without effect on operation of the relay B78U during such service.

A sign 57 of conventional construction may be provided above the entrance way to the car A at the lower terminal or first floor. This sign is illuminated in response to closure of make contacts NDH26 of the intense up peak relay. It may bear a suitable legend such as "FLOORS 4–7 ONLY," indicating to prospective passengers at the first floor that the car A, when the elevator system is conditoned for intense up peak operation, will answer car calls registered by such passengers for only the fourth through seventh floors. A similar sign 59 controlled by make contacts NDH27 may be furnished at a corresponding location for the car B. The legend "FLOORS 2–3 ONLY" borne by the sign 59, however, indicates the prospective passengers at the first floor that the car B will answer car calls for only the second and third floors.

The load relay LW is controlled by the load switch LS for the elevator car A. It will be recalled that the switch LS is operated to close when a predetermined load, such as capacity load, is disposed within the elevator car A.

FIGURE 4

Figure 4:
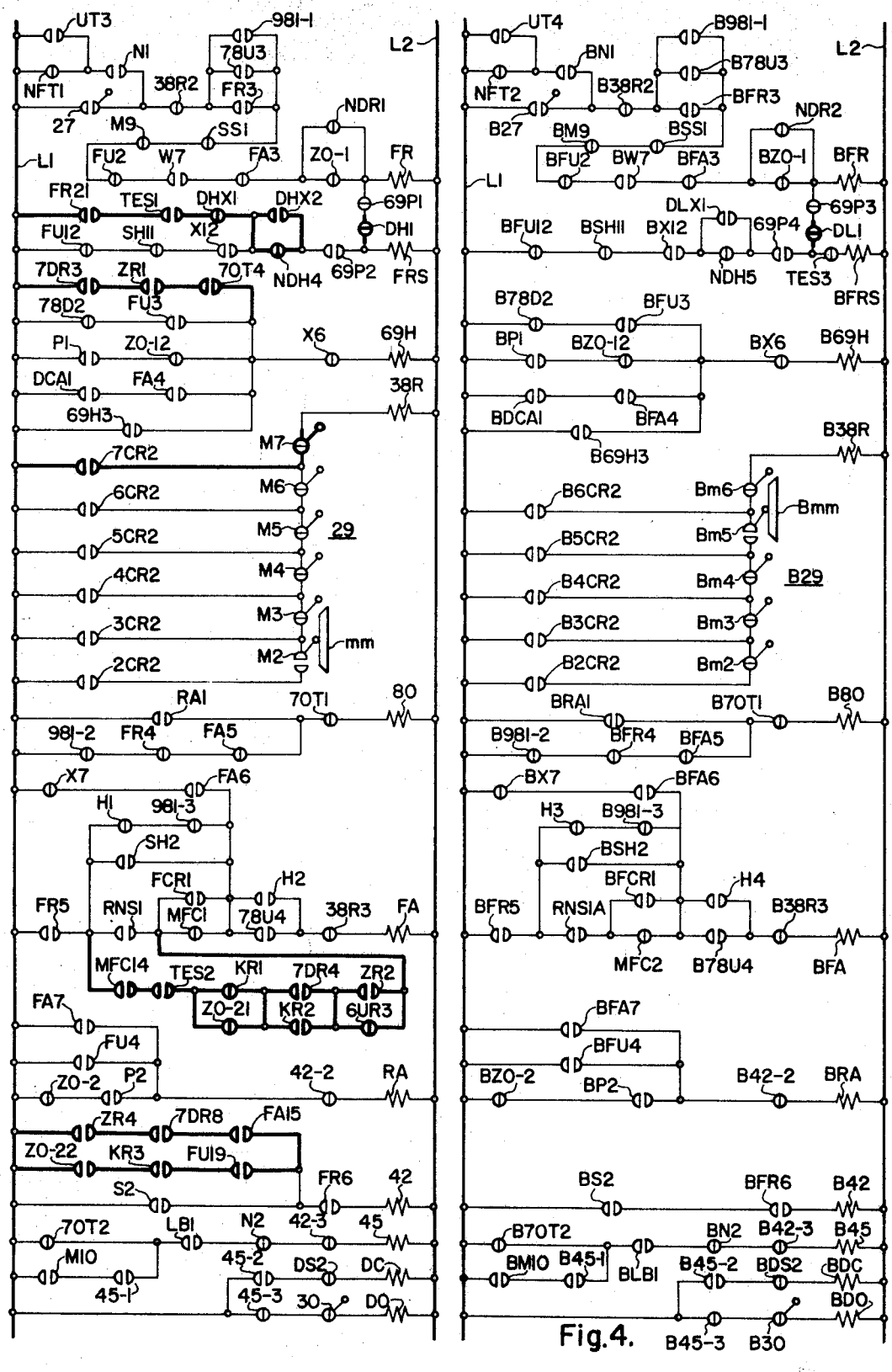

Except for the following additions, the present FIG. 4 is similar to FIG. 4 of the aforesaid Savino et al. application.

Although break contacts 69P1 of the closest car relay are closed, the auxiliary available car relay FRS cannot be energized through the same circuit which may effect pickup of the available car relay FR if break contacts DH1 of the high zone demand relay are open to indicate that the elevator system is conditioned for intense up peak operation, if no car in the high zone sub-bank, of which the car A is assumed to be a part, during such operation is located at or specifically assigned to serve the lower terminal or first floor and if at least one of such cars is available for assignment. If break contacts 69P1 of the closest car relay are open and make contacts 69P2 thereof are closed, an energizing circuit nevertheless is completed for the relay FRS if the car A is available for assignment and there is a demand for top extension (seventh) floor service (make contacts FR21 and TES1 are closed) and if the elevator system is not conditioned for intense up peak operation (break contacts NDH4 are closed). (The high zone down relay may be energized and picked up to open its break contacts DHX1 only when the elevator system is conditioned to provide intense up peak service.)

Again, if the contacts 69P1 are open and the contacts 69P2 are closed, but the contacts NDH4 are open to signify that the elevator system is conditioned for intense up peak operation, the relay FRS may be energized only if make contacts DHX2 are closed to indicate that no car in the high zone sub-bank is located at or specifically assigned to serve the lower terminal floor but that at least one of such cars is conditioned for down travel. (Under the last-named conditioned, it will be apparent that break contact DHX1 must be open and that, therefore, an energizing circuit for the relay FRS may be completed only if the car A is conditioned for down travel, is not assigned to serve a specific down zone and is not assigned to answer a registered up floor call, in which case make contacts X12 and break contacts SH11 and FU12, respectively, all are closed, as explained in the aforesaid Savino et al. application.)

It will be noted that contacts similar to the contacts FR21, TES1 and DHX1 for the car A are not provided for energizing the auxiliary available car relay BFRS for the elevator car B, inasmuch as in the present embodiment of the invention, the car B is assumed to be incapable of serving the seventh or top extension floor. On the other hand, break contacts DL1 and make contacts DLX1 associated with the relay BFRS are comparable to the above-described break contacts DH1 and make contacts DHX1 associated with the relay FRS for the car A. The contacts DL1 open if the elevator system is conditioned for intense up peak operation, if no car in the low zone sub-bank, of which the car B is assumed to be a part, during such operation is located at or specifically assigned to serve the lower terminal or first floor and if in addition at least one of such cars is available for assignment. The contacts DLX1 are closed provided that the elevator system is conditioned for intense up peak operation (in which case break contacts NDH5 in parallel therewith are open) and that no car in the low zone sub-bank is located at or specifically assigned to serve the first floor but that at least one of such cars is conditioned for down travel. Finally, since the elevator car B is incapable of serving the seventh floor, break contacts TES3 open when there is a service demand therefor to render the relay BFRS incapable of being energized, thus preventing selection of the car B to serve such floor.

It will be understood that the modifications in the auxiliary available car relay circuits for each remaining elevator car in the system likewise depends upon whether or not the particular car is capable of serving the seventh floor and whether during intense up peak operation such car is associated with the high or the low zone sub-bank.

To effect reversal of the direction of travel for which the elevator car A is conditioned from up to down as it arrives at the seventh floor to answer a down floor call therefor, serially-connected make contacts 7DR3 of the down floor car registering relay for the seventh floor, make contacts ZR1 of the seventh floor zone position relay for the car A and make contacts 70T4 of the car A non-interference relay are provided for energizing the high call reversal relay 69H through break contacts X6 of the car A down preference relay.

In the car call above circuit 29 associated with the car call about relay 38R, make contacts 7CR2 of the car A seventh-floor car call registering relay and a normally closed switch m7, which is operated by the cam mm, have been added. Consequently, as long as a car A car call is registered for the seventh floor and inasmuch as the seventh floor is the highest floor served by the car A, the relay 38R is energized and picked up through the contacts 7CR2 and the switch m7, provided that the car A is not located at the seventh floor.

It will be observed that a series-parallel arrangement of contacts are connected across make contacts RNS1 of the no scan relay in one of the initial energizing circuits for the down call assigned relay FA. These contacts are associated with service by the elevator car A for the top extension (seventh) floor. Thus, if the contacts RNS1 are open, the relay FA nevertheless may be energized initially, provided that make contacts MFC14 of the multiple available car relay and make contacts TES2 of the extension car scanning relay both are closed. The last-named relay is energized and picked up if there is a demand for seventh floor service and if at least one elevator car capable of serving such floor is available for assignment. (It will be noted that for initial energization of the relay FA, make contacts FR5 must be closed to indicate that the car A is available for assignment. It also will be observed that closure of the contacts MFC14 is accompanied by opening of break contacts MFC1. Under these circumstances, make contacts FCR1 of the car A demand response relay must be closed in parallel with the open contacts MFC1 to indicate that the car A has been selected to respond to the aforesaid demand for seventh floor service in order for the relay FA to be energized initially.)

Pickup of the down call assigned relay FA through the contacts MFC14 and TES2 also requires closure of break contacts KR1 of the lower terminal extension demand relay to indicate the absence of a demand for service from the lower terminal or first floor to the seventh floor and/or closure of break contacts ZO-21 of the car A first floor zone position relay (the latter contacts are closed if the car A is not located at the lower terminal floor); closure of make contacts 7DR4 to signify that a down floor call is registered for the seventh floor and/or closure of make contacts KR2 (note that if the latter contacts are closed, break contacts KR1, which are associated with the same relay, must be open); and finally, closure of make contacts ZR2 of the car A zone position relay for the seventh floor, indicating that the car A is located at the seventh floor, and/or closure of break contacts 6UR3 of the up floor call registering relay for the sixth floor, signifying that no up floor call is registered for such floor.

If the car A is selected to answer a down floor call for the seventh floor or to return to the first floor in response to a demand for service from the latter floor to the seventh floor, as the case may be, energization and pickup of the relay FA in the appropriate one of the foregoing manners effects reversal of the direction of travel for which the car A is conditioned from up to down at the time such reversal is necessary.

For effecting opening of the doors of the elevator car A when it is available for assignment (make contacts FR6 are closed) at the first floor and it has been selected to respond to a demand for service therefrom to the seventh floor, the auxiliary door-control relay 42 under such conditions is energized through make contacts ZO-22 of the car A first-floor zone position relay, make contacts KR3 of the lower terminal extension demand relay and make contacts FU19 of the car A up call assigned relay. Similarly, for effecting opening of the doors of the car A when it is available for assignment at the seventh floor and it has been selected to answer a down floor call for such floor, the relay 42 is energized through make contacts ZR4 of the car A seventh floor zone-position relay, make contacts 7DR8 of the down floor call registering relay for the seventh floor and make contacts FA15 of the car A down call assigned relay.

FIGURE 5

Figure 5:
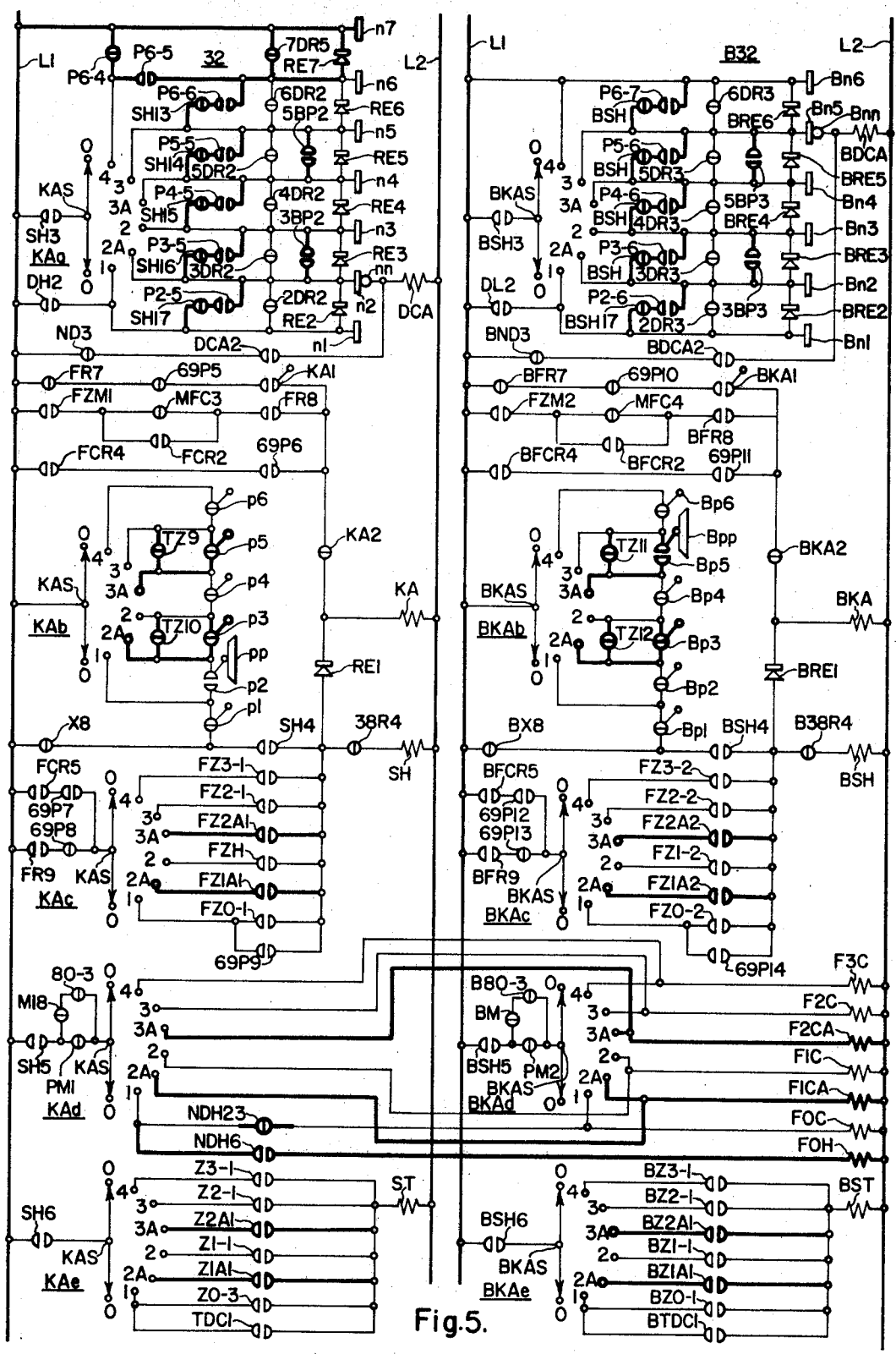

The present FIG. 5 is similar to FIG. 5 of the aforesaid Savino et al. application with the exception of the following modifications.

Two additional stepping position contacts, designated 2A and 3A, have been added for engagement by the brushes of each level of the assigned zone stepping switch KA. As is explained in the Savino et al. application, when the common shaft KAS steps, each of the brushes of the switch KA steps in synchronism therewith to engage successively the contacts of the associated switch level.

The additional contacts 2A and 3A for each level of the stepping switch KA are associated with the second and fourth floors, respectively. It will be recalled that, normally, both the second and third floors are included in the first down zone while the fourth and fifth floors comprise the second down zone. Under such conditions, the contacts 2A and 3A of the stepping switch KA are, in effect, inoperable for controlling assignment of the elevator car A, since zone relay make contacts FZ1A1 and FZ2A1 respectively associated with the contacts 2A and 3A in the c level of the stepping switch cannot close to effect continuous energization of the stepping switch coil and thus to terminate the rotation of the brushes as they step to either of these positions. During down peak and floor spotting periods of operation, however, each of the second, third, fourth and fifth floors constitutes a separate down zone, and it is necessary to provide means for permitting the assignment of the car A specifically to answer a down floor call for each of these floors alone, as opposed to its assignment to answer all registered down floor calls in a zone comprising more than one of these floors, as aforesaid. It will be apparent that the additional contacts 2A and 3A in each level of the assigned zone stepping switch KA and their respective associated components provide the means for accomplishing such operation, which will be discussed in detail hereinafter.

Referring to the level KAb of the assigned zone stepping switch, since the cam-operated switches p1 through p5 are connected in series, during non-down peak periods of traffic, when the second and third floors form the first down zone and the fourth and fifth floors comprise the second down zone, it is necessary to render the newly added switches p3 and p5 ineffective for controlling operation of the car A. This is accomplished by zone transfer relay break contacts TZ10 and TZ9 respectively connected in parallel with the switches p3 and p5, inasmuch as these contacts are open only during down peak periods of operation.

Under normal conditions, when an elevator car is assigned to serve a specific down zone, another car cannot be assigned to serve the same down zone. For example, if the car A is assigned to serve the second down zone (comprising the forth and fifth floors), one of the brushes of each level of its assigned zone stepping switch KA is in engagement with the associated stepping contact numbered 3. Referring to the level KAd, this results in energization of the assigned zone relay F2C which remains picked up, preventing assignment of another car to serve the second down zone, until the car A has answered all registered down floor calls in such zone. When the elevator system is conditioned for spotting operation, however, it is desirable to permit the assignment of more than one car at a time to serve each spotted floor. Turning again to the level KAd, break contacts PM1 of the spotting interrupting relay, break contacts 80-3 of the car A second auxiliary running relay and break contacts M18 of the car A running relay are provided for this purpose. When any floor is being spotted, the contacts PM1 are open (these contacts are closed at all other times). Thus, if the car A is spotted to serve the fifth floor, the assigned zone relay F2C momentarily picks up through the contacts 80-3 and M18. As soon as the car A is conditioned to run to the fifth floor, however, the contacts 80-3 and then the contacts M18 open to drop out the relay F2C, permitting the immediate assignment of another car to serve the fifth floor. Both of these sets of contacts remain open until the car A arrives at the fifth floor, at which time the brushes of the stepping switch KA are reset to their homing position in a manner which is discussed in detail in the aforesaid Savino et al. application.

During an intense up peak period of operation of the elevator system, it is necessary to distinguish between the assignment to serve the lower terminal or first floor of an elevator car in the high zone sub-bank, of which the car A is a part, and of one in the low zone sub-bank, of which the car B forms a portion. To this end, the assigned zone relay FOH is associated with the $d$ level of the assigned zone stepping switch KA. Except for intense up peak periods of operation of the elevator system, break contacts NDH23 continuously remain closed to render the assigned zone relay FOC operable for indicating that the car A is assigned to serve the first floor, if such be the case, while make contacts NDH6 remain open to prevent pickup of the relay FOH. But when the system is conditioned for intense up peak operation, the contacts NDH23 are open to prevent pickup of the relay FOC regardless of whether the car A is assigned to serve the first floor, while the contacts NDH26 are closed to permit energization and pickup of the relay FOH if the car A is so assigned. It will be noted that operation of the relay FOC with respect to the elevator car B is not affected similarly by the conditioning of the elevator system to provide intense up peak service, since the car B then is part of the low zone sub-bank, as aforesaid. It will be understood that the association of each remaining car in the system with the relays FOH and FOC likewise depends upon whether such car during intense up peak operation is part of the high zone or the low zone sub-bank.

From the detailed discussion in the aforesaid Savino et al. application of the down call above relay DCA associated with the $a$ level of the assigned zone stepping switch KA it will be understood that this relay is energized and picked up regardless of other system conditions as long as make contacts DH2 of the high zone demand relay are closed. Closure of the contacts DH2 indicates that the elevator system is conditioned for intense up peak operation, that no car in the high zone sub-bank during such operation is located at or specifically assigned to serve the first floor and that at least one of such cars is available for assignment. Similarly, make contacts DL2 of the low zone demand relay are closed to pick up the down call above relay BDCA for the car B, provided that during intense up peak operation no elevator car in the low zone sub-bank is located at or specifically assigned to serve the first floor but that at least one of such cars is available for assignment.

Inasmuch as the car A is capable of serving the seventh or extension floor, components for the seventh floor (floor selector contact segment $n7$, break contacts 7DR5 and rectifier RE7) have been added in the down floor call above circuit 32 for the car A. It will be noted that such components are similar to those for each of the remaining floors from which a down floor call may be registered.

Insofar as operation of the level KAa is concerned with respect to the down call above relay DCA, the seventh and sixth floors normally form the third down zone. However, during spotting operation of the elevator system and when the spotted floor is the sixth floor, break contacts P6-4 of the floor spotting relay for the sixth floor are open and make contacts P6-5 thereof are closed. Consequently, under such conditions operation of break contacts 7DR5 of the down floor call registering relay for the seventh floor is without effect on operation of the relay DCA if one of the brushes of the level KAa is in engagement with the associated contact numbered 4 to indicate that the car A is spotted to serve the sixth floor.

It will be observed that across the down floor call registering relay break contacts for each floor below the seventh floor in the down floor call above circuit 32, are serially connected break contacts of the down zone assigned relay SH for the car A and make contacts of the floor spotting relay for the respective floor. For example, if the spotted floor is the fifth floor during spotting operation of the elevator system, break contacts 5DR2 of the down floor call registering relay for the fifth floor are open and make contacts P5-5 of the floor spotting relay for the fifth floor are closed. If break contacts SH14 also are closed to indicate that the car A is not assigned to serve a particular down zone (in which case the brushes of the stepping switch KA are in their homing position), the aforesaid opening of the contacts 5DR2 is without effect on operation of the relay DCA, i.e., the car A does not "see" the down floor call for the fifth floor when the car is located therebelow. On the other hand, if the contacts SH14 are open to signify that the car A is assigned to serve a particular down zone, the relay DCA operates in the manner described in the aforesaid Savino et al. application.

It also will be noted that make contacts 5BP2 of the fifth floor passing relay 5BP are connected across the contacts 5DR2. Consequently, if the relay 5BP is energized to indicate that an elevator car conditioned for down travel has been loaded to capacity at the fifth floor when a down floor call is registered for the fourth floor (make contact 4DR2 are open), its contacts 5BP2 are closed to render ineffective the subsequent opening of the contacts 5DR2. The contacts 5BP2 remain closed until the previously registered down floor call for the fourth floor is answered (break contacts 4DR2 reclose). Make contacts 3BP2 of the third floor passing relay 3BP are connected across break contacts 3DR2 of the down floor call registering relay for the third floor for a similar purpose with respect to the third and second floors.

FIGURE 6

Figure 6:
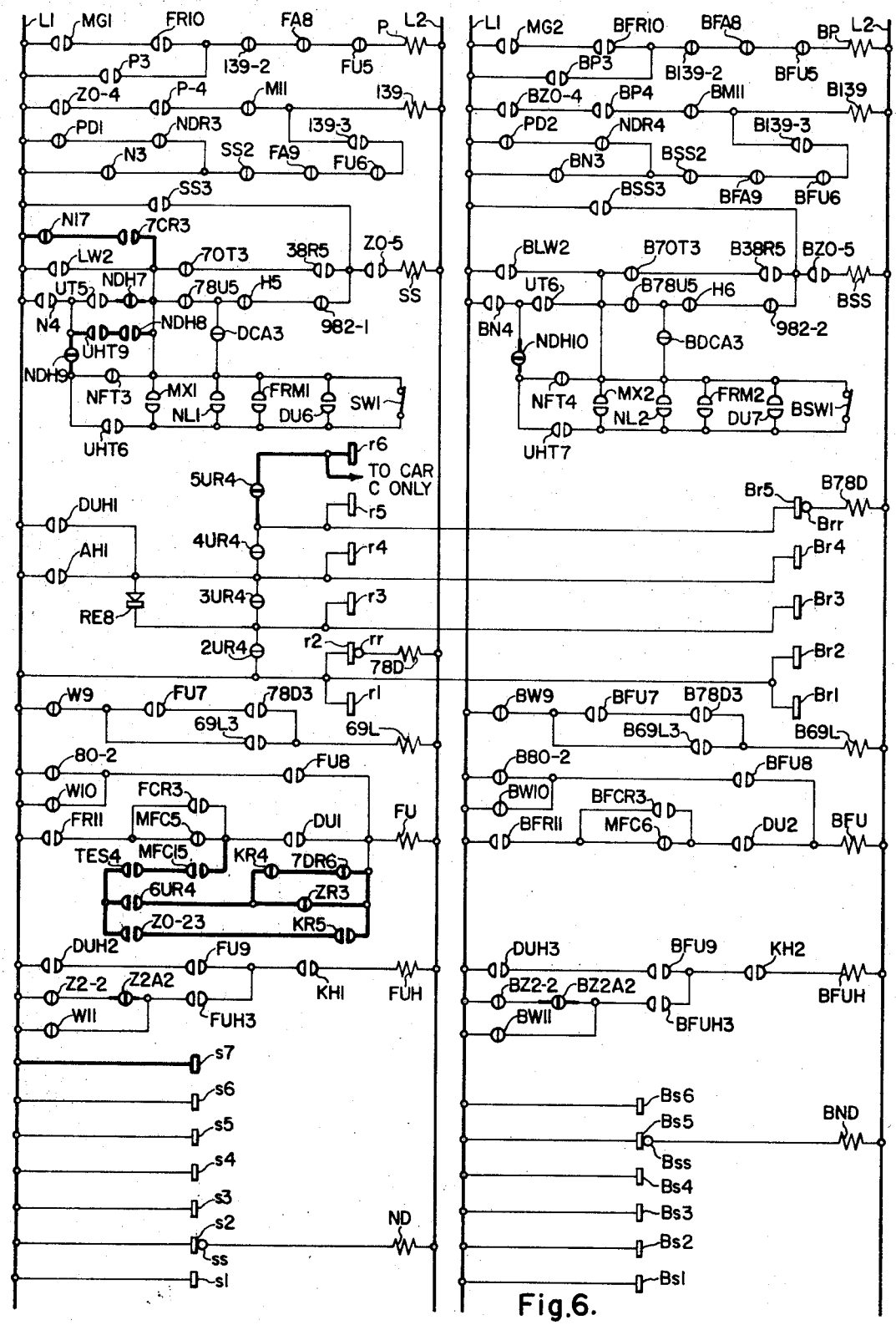

Except for the following modifications, the present FIG. 6 is similar to FIG. 6 of the aforesaid Savino et al. application.

As in the Savino et al. application, the start relay SS, when picked up, indicates that the elevator car A is to be started from the lower terminal or first floor. Serially connected break contacts N17 and make contacts 7CR3 are provided for controlling, in part, energization of the relay SS. If the car A specifically has not been selected as the next car to leave the first floor, the contacts N17 are closed, and if a car A car call simultaneously is registered for the seventh floor, the contacts 7CR3 also are closed. It will be noted that similar contacts are not provided for the elevator car B, since this car is assumed to be incapable of serving the seventh floor.

Make contacts LW2 of the car A load relay have been substituted for but serve the same purpose as the load switch make contacts LW2 of the Savino et al. application. Thus, if the car A is fully loaded, the present contacts LW2 are closed for partially completing an energizing circuit for the relay SS.

Break contacts NDH7 and NDH9 and make contacts NDH8 are controlled by the intense up peak relay NDH.

If the relay NDH is dropped out, operation of the start relay SS will be understood by reference to the aforesaid Savino et al. application. On the other hand, if the relay NDH is energized and picked up to condition the elevator system for intense up peak operation, during which the cars A and C form the high zone sub-bank, the contacts NDH7 are open to render ineffective operation of make contacts UT5 of the second loading interval relay, and the contacts NDH9 likewise are open to render ineffective operator of all of the contacts therebelow in FIG. 6 associated with the relay SS. Additionally, the contacts NDH8 are closed for permitting make contacts UHT9 of the first loading interval of the car A at the first floor. During intense up peak operation, the contacts UHT9 close upon expiration of the suitable period of time, such as fifteen seconds, following the selection of the car A or C as the next car in the high zone sub-bank to leave the lower terminal floor.

Break contacts NDH10 of the intense up peak render ineffective operation of all of the contacts therebelow in FIG. 6 associated with the Start relay BSS for the elevator car B. However, it will be observed that make contacts UT6 of the second loading interval relay are effective for controlling the loading interval of the car B at the first floor at all times, including periods of intense up peak operation, when the cars B and D form the low zone sub-bank. As in the Savino et al. application, these contacts during non-intense up peak operation close upon expiration of an interval of thirty seconds following selection of any elevator car as the next car to leave the first floor. But during intense up peak periods of operation, the contacts UT6 close upon expiration of a suitable interval of time, such as fifteen seconds, following the selection of the car B or D as the next car in the low zone sub-bank to leave the first floor.

Turning now to the up call below relay 78D, break contacts 5UR4 of the up floor call registering relay for the fifth floor and a car A floor selector contact segment r6 have been added for controlling this relay, since the car A now serves the seventh floor and, therefore, the sixth floor is an intermediate floor insofar as this car is concerned. Inasmuch as the sixth floor is the highest floor served by the car B, however, no floor selector contact segment is provided for the sixth floor in the Br row. Thus, as long as the elevator car A floor selector carriage is located in its third, fourth, fifth or sixth-floor position and no up floor call is registered for an intermediate floor below the floor corresponding to the position of the carriage, the up call below relay 78D will be energized and picked up, and similarly for the up call below relay B78D with respect to the third, fourth or fifth floor. Since there is no contact segment in the r row for the seventh floor, the relay 78D is always dropped out when the car A selector carriage is located in its seventh-floor position, whereas it will be noted that the relay B78D is always dropped out when the car B selector carriage is located in its sixth-floor position.

The series-parallel arrangement of contacts across make contacts DU1 of the up zone demand relay in the initial energizing circuit of the up call assigned relay FU are associated with top extension (seventh) floor service by the car A. If the contacts DU1 are open, the relay FU nevertheless may be energized initially, provided that break contacts MFC15 of the multiple available car relay and make contacts TES4 of the extension car scanning relay both are closed. The last-named relay is energized and picked up if there is a demand for seventh-floor service and if at least one elevator car capable of serving such floor is available for assignment. (It will be noted that for initial energization of the relay FU, make contacts FR11 must be closed to indicate that the car A is available for assignment. It also will be observed that closure of the contacts MFC15 is accompanied by opening of break contacts MFC5. Under these circumstances, make contacts FCR3 of the car A demand response relay must be closed in parallel with the open contacts MFC5 to indicate that the car A has been selected to respond to the aforesaid demand for seventh-floor service in order for the relay FU to be energized initially.)

Pickup of the up call assigned relay FU through the contacts MFC15 and TES4 also requires completion of one of two parallel energizing paths. Thus, make contacts 6UR4 are closed if an up floor call is registered for the sixth floor, and break contacts ZR3 are closed if the car A is not located at the seventh floor. On the other hand, break contacts KR4 of the lower terminal extension demand relay are closed in the absence of a demand for service from the first floor to the seventh floor, and break contacts 7DR6 are closed if no down floor call is registered for the seventh floor. Alternatively, make contacts ZO–23 are closed provided that the car A is located at the lower terminal floor, and make contacts KR5 are closed if there is a demand for service from the lower terminal to the seventh floor. (Note that if the latter contacts are closed, break contacts KR4, which are associated with the same relay, must be open.)

If the car A is selected to answer an up floor call for the sixth floor or to respond to a demand for service from the first to the seventh floor, as the case may be, energization and pickup of the relay FU in the appropriate one of the foregoing manners effects the dispatching of the car A to the sixth floor (or the opening of its doors if it already is located at the sixth floor) or the opening of its doors at the first floor, respectively. Once again, it will be observed that the circuit of the up call assigned relay BFU for the elevator car B is not modified similarly, since the car B does not serve the seventh floor.

Under normal conditions of operation, the high up zone assigned relay FUH, once energized, is maintained energized through its holding circuit until the demand for up service for the high up zone (fourth and fifth floors) is terminated (make contacts KH1 open) or until the car A is conditioned for travel in the up direction (break contacts W11 are open), provided that it also is located in the high up zone. During normal operation, opening of break contacts Z2–2 indicates that the car A is located at either the fourth or fifth floor, as the case may be. Under certain special conditions of operation, however, the contacts Z2–2 open only when the car is located at the fifth floor, not at either the fourth or fifth floor. Inasmuch as under the last-named conditions these two floors still comprise the high up zone, break contacts Z2A2 have been added in series with the contacts Z2–2. The contacts Z2A2 are open under the aforesaid special conditions when the car A is located at the fourth floor. Under normal conditions of operation, the contacts Z2A2 always are closed.

Referring now to the notching relay ND, a contact segment s7 similar to the segments s1 through s6 has been added for engagement by the car A floor selector carriage brush ss as the carriage notches to its seventh-floor position. It will be apparent from the preceding discussion that no corresponding contact segment need be provided for the car B notching relay BND.

FIGURE 7

Figure 7:
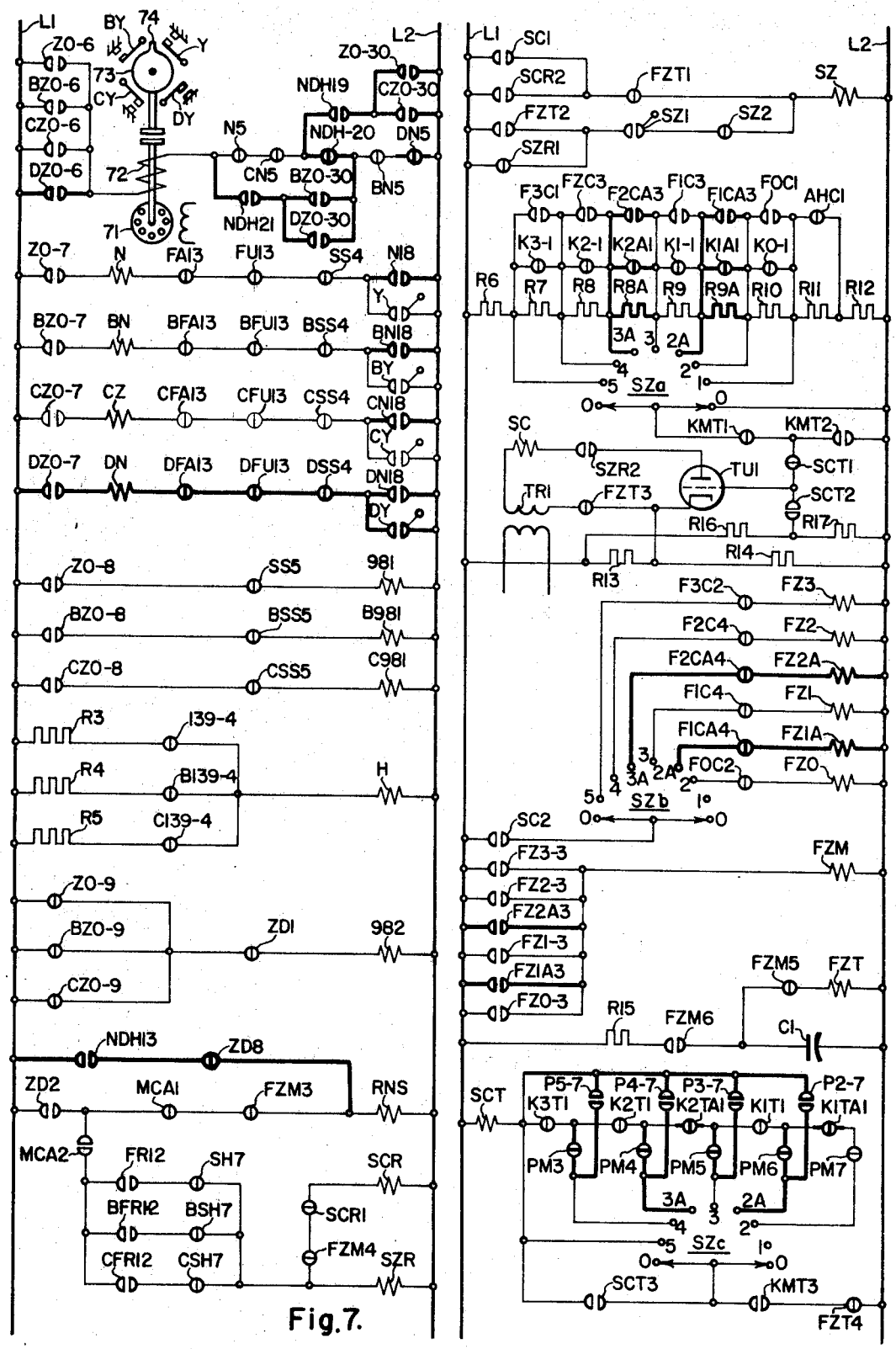

The present FIG. 7 is similar to FIG. 7 of the aforesaid Savino et al. application except for the following modifications.

In the upper portion of the left-hand column of FIG. 7, components for the car D have been added to the lower terminal next car selection circuits of the elevator system. By inspection, it will be noted that these components are similar to those for the remaining cars A, B and C.

When the elevator system is not conditioned for intense up peak operation, make contacts NDH19 and NDH21 of the intense up peak relay are open and break contacts NDH20 thereof are closed. Operation of the next car selection circuits under such conditions will be fully understood by reference to the aforesaid Savino et al.

application. (It will be apparent that operation of the make contacts of the next car relay for each car which have been added across the corresponding mechanical switch in the energizing circuit for such relay, e.g., make contacts N18 in parallel with the switch Y in the circuit of the car A next car relay N, is without effect on operation of the respective relay when the elevator system is not conditioned to provide intense up peak service.)

During intense up peak periods of operation, however, when the elevator cars are divided into a low zone sub-bank (cars B and D) and a high zone sub-bank (cars A and C), it is necessary to select one of the cars in each sub-bank which may be located at the lower terminal floor as the next car in the sub-bank to leave such floor. The energizing circuit for the electromagnetic clutch 72 has been modified for this purpose. Thus, when the system is conditioned for intense up peak operation, make contacts NDH19 and NDH21 are closed, and make contacts NDH20 are open. Assuming that such is the case and that no elevator car is located at the first floor (make contacts Z0–6, Z0–30, BZ0–6, BZ0–30, CZ0–6, CZ0–30, DZ0–6, and DZ0–30 all are open), the clutch 72 is de-energized. Assume that the car A now arrives at the first floor. As a result, make contacts Z0–6 and Z0–30 close to establish the following energizing circuit:

L1, Z0–6, 72, N5, CN5, NDH19, Z0–30, L2

Energization of the clutch 72 results in rotation of the cam 73 in a counterclockwise direction, as viewed in FIG. 7, by the motor 71. When the cam protuberance reaches the switch Y, the switch closes to energize the next car relay N therethrough, indicating that the car A has been selected as the next car in the high zone sub-bank to leave the first floor. (Under the assumed conditions, all of the break contacts in the energizing circuit of the relay N are closed, as are make contacts Z6–7, which closed upon arrival of the car A at the first floor.) Pickup of the relay N is accompanied by closure of its make contacts N18 to establish a holding circuit around the switch Y and in opening of break contacts N5 to deenergize the clutch 72. Consequently, rotation of the cam 73 is terminated.

Let it be assumed that the car B now arrives at the lower terminal floor. As a result, makes contacts BZ–6 and BZ0–30 close to reenergize the clutch 72 as follows:

L1, BZ0–6 (and Z0–6), 72, NDH21, BZ0–30, BN5, DN5, L2

The cam 73 once again rotates in a counterclockwise direction, opening the switch Y and thereafter closing the switch BY. Opening of the switch Y is without immediate effect on system operation inasmuch as the relay N is maintained energized through its holding contacts N18. Closure of the switch BY, however, results in pickup of the next car relay BN, signifying that the car B has been selected as the next car in the low zone sub-bank to leave the first floor. (Make contacts BZ0–7 closed when the car B arrived at the first floor.) Such pickup effects closure of make contacts BN18 to establish a holding circuit for the relay around the switch BY, while break contacts BN5 open to deenergize the clutch 72, once again terminating rotation of the cam 73.

Thus, both of the next car relays N and BN now are energized and picked up, respectively indicating that the car A will be the next car in the high zone sub-bank to leave the lower terminal floor and that the car B will be the next car in the low zone sub-bank to leave such floor.

Referring to the lower portion of the left-hand column of FIG. 7, the no scan relay RNS is energized and picked up when the elevator system is conditioned for intense up peak operation (make contacts NDH13 are closed), provided that the down zone demand relay is dropped out (break contacts ZD8 are closed).

Turning to the right-hand column of FIG. 7, two additional stepping position contacts, designated 2A and 3A, have been added for engagement by the brushes of each level of the down demand midpoint stepping switch SZ. These additional contacts 2A and 3A for each level are associated with the second and fourth floors, respectively. It will be recalled that, normally, both the second and third floors are included in the first down zone while the fourth and fifth floors comprises the second down zone. Under such conditions, the contacts 2A and 3A of the stepping switch SZ are, in effect, inoperable for selecting the "midpoint" of down zone demands for service or the highest timed-out (priority) down zone, as the case may be, since neither down zone demand registering relay break contacts K1A1 and K2A1, respectively associated with the contacts 2A and 3A in the *a* level, nor down zone timing relay break contacts K1TA1 and K2TA1, respectively associated with the contacts 2A and 3A in the *c* level of the stepping switch, can open to effect continuous energization of the stepping switch coil and thus to terminate rotation of its brushes as they step to either of these positions.

During down peak and floor spotting periods of operation, however, each of the second, third, fourth and fifth floors constitutes a separate down zone, and it is necessary to provide means for selecting the midpoint of down zone demands or the highest timed-out down zone, as the case may be, with respect to each of these floors alone, as opposed to such selection when each of the second and third down zones comprises more than one of these floors, as aforesaid. It will be apparent that the additional contacts 2A and 3A in each level of the down demand midpoint stepping switch SZ and their respective associated components, as well as the additional zone relay make contacts FZ1A3 and FZ2A3 in the energizing circuit of the master zone relay FZM, provide the means for accomplishing such operation, which will be discussed in detail hereinafter.

In connection with the preceding discussion, during spotting operation of the elevator system the *c* level of the stepping switch SZ is operative for effecting the dispatching of successive available elevator cars to each spotted floor. When cars are to be spotted to serve a specific floor, break contacts PM3 through PM7 of the spotting interrupting relay all are open to render ineffective operation of all of break contacts K3T1, K2T1, K2TA1, K1T1 and K1TA1, respectively.

If one of the second through fifth floors is the spotted floor at this time, however, the respective associated floor spotting relay make contacts P2–7 through P5–7 are closed to effect pickup of the firing relay SCT when one of the brushes of the level SZc steps to the corresponding associated stepping contact. For example, if the fifth floor is the spotted floor, make contacts P5–7 are closed; and when one of the brushes of the *c* level steps to its contact numbered 4, the following energizing circuit is established:

L1, SCT, P5–7, KMT3, FZT4, L2

(Under the assumed conditions, the contacts KMT3 and FZT4 both are closed.)

As is explained in the aforesaid Savino et al. application, pickup of the relay SCT results in termination of the stepping of the brushes of the stepping switch SZ and, under the assumed conditions, the dispatching of an available elevator car to serve the fifth floor in the down direction. (It will be observed by inspection that break contacts of the spotting interrupting relay PM and make contacts of the floor spotting relay P6 for the sixth floor need not be provided in the circuits associated with the level SZc, since, if the sixth floor is the spotted floor, all of the contacts P2–7 through P5–7 are open; and the relay SCT must pick up, even in the absence of such contacts, upon engagement of the stepping contact numbered 5 by one of the brushes of the *c* level.) In effect, an artificial priority down floor call is established for each spotted floor during its associated spotting period, and operation of the stepping switch SZ, and in particular of the level SZc, in response thereto results in the dispatching or spotting of successive available elevator cars to serve each spotted floor in the down direction.

FIGURE 8

Figure 8:
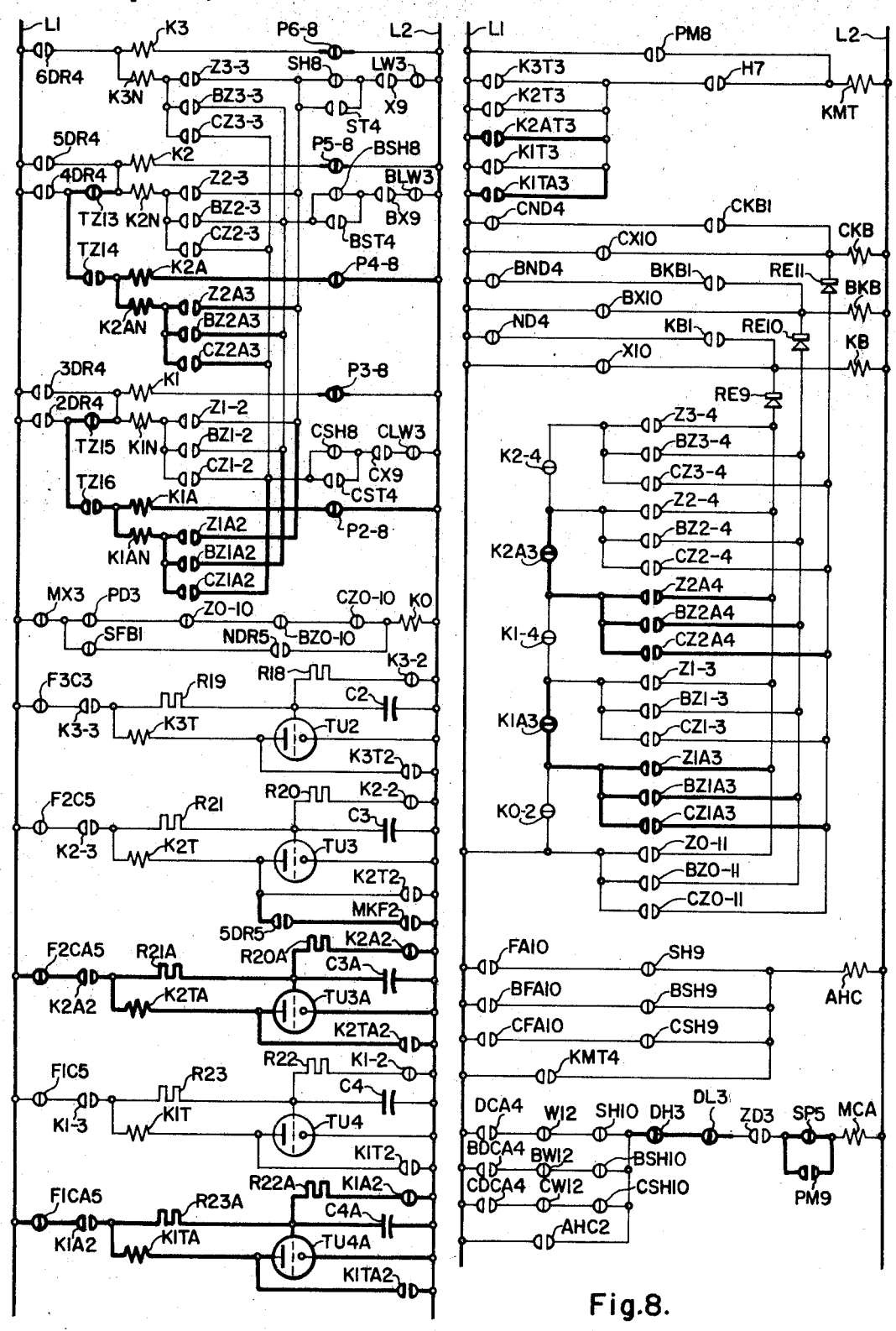

With the exception of the additions discussed below, the present FIG. 8 is similar to FIG. 8 of the aforesaid Savino et al. application.

The relays in FIG. 8 are associated with the registration of down zone service demands and with the provision of elevator service in the down direction. The newly added components are related principally to down peak and floor spotting periods of operation.

By way of introduction, it will be recalled that the floors above the first floor in the present elevator system normally are divided into three down zones, the first down zone comprising the second and third floors, the second down zone including the fourth and fifth floors and the third down zone comprising the sixth floor. The present invention contemplates, however, that under certain conditions, such as during down peak periods of operation, the number of down zones into which the aforesaid floors are divided is increased to provide more efficient elevator service in the down direction. More particularly, each of the floors above the first floor constitutes a separate down zone under such conditions.

Referring to the upper portion of the left-hand column of FIG. 8, the down zone demand registering relays K1A and K2A and their respective cancelling coils K1An and K2An are associated with the second and fourth floors, respectively. Energization of each of these relays is controlled in part by respective make contacts TZ14 and TZ16 of the zone transfer relay. It also will be observed that energization of each of the down zone demand registering relays K2 and K1 now is controlled in part by break contacts TZ13 and TZ15, respectively.

Let it first be assumed that the zone transfer relay is deenergized and dropped out, as a result of which its break contacts TZ13 and TZ15 are closed, while its make contacts TZ14 and TZ16 are open. Assume also that a down floor call is registered for the fifth or the fourth floor (make contacts 5DR4 or 4DR4 are closed). Consequently, the down zone demand registering relay K2 is energized and picked up through the contacts 5DR4 or 4DR4 and TZ13 and break contacts P5–8 (under the assumed conditions, and the contacts P5–8 must be closed). Pickup of the relay K2 indicates the registration of a demand for down service for the second down zone. Any elevator car located in the second down zone and which is capable of answering the down floor call for the fifth or the fourth floor, as the case may be, will effect cancellation of the second down zone demand for service. For example, if the elevator car A is conditioned for down travel (make contacts X9 are closed), is not fully loaded (break contacts LW3 are closed), is located at the fifth or fourth floor (make contacts Z2–3 are closed) and is not assigned to serve a particular down zone (break contacts SH8 are closed), or if it is assigned to serve the second down zone (break contacts SH8 are open), when it reaches such zone (make contacts ST4 close), the following energizing circuit is established:

L1, 5DR4 or 4DR4 and TZ13, K2N,
                 Z2–3, SH8, or ST4, X9, LW3, L2

Energization of the cancelling coil K2N results in the resetting of the down zone demand registering relay K2 to indicate cancellation of the demand for down service for the second down zone.

The foregoing operations of the relay K2 and its cancelling coil K2N are in all respects the same as those described for the same components in the aforesaid Savino et al. application.

Assume next that both of make contacts 4DR4 and 5DR4 are closed to indicate the registration of down floor calls for the fourth and fifth floors, respectively, but that now zone transfer relay break contacts TZ13 are open and make contacts TZ14 thereof are closed. Opening of the contacts TZ13 prevents energization of the relay K2 through the contacts 4DR4, but this relay nevertheless is picked up through the contacts 5DR4. Closure of the contacts TZ14 results in energization and pickup of the down zone demand registering relay K2A through the contacts 4DR4 and break contacts P4–8. Thus, whereas in the preceding example the registration of a down floor call for the fourth or fifth floor (or both) resulted in pickup of only the relay K2 to indicate the registration of a single down zone demand for service, in the instant case a down floor call registered for each of these floors effects pickup of a separate respective one of the relays K2 and K2A, i.e., two separate down zone demands for service now are registered.

Any elevator car which stops at the fifth foor to answer the registered down floor call therefor will effect energization of the cancelling coil K2N to reset the down zone demand registering relay K2. (When the zone transfer relay is picked up, the zone position relay Z2 is picked up to close its make contacts Z2–3 only when the car A is located at the fifth floor, as opposed to the closure of such contacts in the preceding example when the car A was located at either the fifth or fourth floor, and similarly for the corresponding zone position relays BZ2 and CZ2 and their respective make contacts BZ2–3 and CZ2–3 for the cars B and C, respectively.) Likewise, any elevator car which stops at the fourth floor to answer the down floor call therefor will cancel the down zone demand for service for such floor. If the elevator car A, e.g., is conditioned for down travel (make contacts X9 are closed), is not fully loaded (break contacts LW3 are closed), is located at the fourth floor (make contacts Z2A3 are closed) and is not assigned to serve a particular down zone (break contacts SH8 are closed), or if it is assigned specifically to serve the fourth floor (break contacts SH8 are open), when it reaches such floor (make contacts ST4 close), the following energizing circuit is established:

L1, 4DR4, TZ14, K2AN, Z2A3, SH8 or ST4, X9, LW3, L2

Energization of the cancelling coil K2AN results in resetting of the down zone demand registering relay K2A to indicate cancellation of the demand for down service for the down zone which now comprises only the fourth floor.

Operation of the down zone demand registering relay K1A and its cancelling coil K1AN for the second floor and operation of the relay K1 and of its cancelling coil K1N under such conditions will be understood from the preceding discussion.

During floor spotting operation of the elevator system, each of the down zone demand registering relays is prevented from pickup when elevator cars are to be spotted to the floor associated therewith. For example, during spotting of cars to the fifth floor, break contacts P5–8 open to prevent pickup of the relay K2; during spotting of the fourth floor, break contacts P4–8 open to prevent energization of the relay K2A, and similarly for the remaining spotted floors.

The down zone timing relays K1TA and K2TA also are associated with the second and fourth floors, respectively. Operation of these relays and their associated components will be understood from the detailed description of operation of the typical down zone timing relay K3T in the aforesaid Savino et al. application and from the preceding discussion. For present purposes, each of the relays K1TA and K2TA, like each of the relays K1T, K2T, and K3T, will be assumed to have a time delay in pickup of the order of forty seconds.

It will be recalled that the present invention includes means for providing special elevator service for a convention floor and that for illustrative purposes the fifth floor is assumed to be a convention floor. Referring to the down zone timing relay K2T, which is associated with the second down zone (fourth and fifth floors), it will be noted that this relay is connected to the bus L2 through make contacts 5DR2 of the down floor call registering relay for the fifth floor and make contacts MKF2 of the master convention floor loading relay. The last named relay is energized to close its contacts MKF2 upon the loading to capacity of any elevator car which is stopped at the fifth floor while conditioned for down travel. Once closed, the contacts MKF2 remain closed for at least a predetermined period of time thereafter. Thus, if break contacts F2C5 are closed to indicate that no elevator car specifically is assigned to serve the second down zone, if a demand for down service is registered for the second down zone (make contacts K2–3 are closed) as the result of the registration of a down floor call for the fifth floor (make contacts 5DR5 are closed) and if the contacts MKF2 also are closed, the relay K2T is energized and picked up without regard to the time delay normally introduced by the tube TU3 and associated components. Such pickup results in the provision of priority down service for the fifth floor.

Turning to the top of the right-hand column of FIG. 8, pickup of the down zone priority relay KMT may be effected by closure of make contacts K1TA3 or K2TA3 of the down zone timing relays for the second and fourth floors, respectively. In addition, if elevator cars are to be spotted to serve a specific floor, make contacts PM8 of the spotting interrupting relay are closed to energize the relay KMT.

Break contacts K1A3 and K2A3 of the down zone demand registering relays respectively associated with the second and fourth floors and make contacts of the individual elevator car zone position relays for these floors, such as the respective contacts Z1A3 and Z2A4 for the car A, have been added to the circuits which control operation of the down zone call below relays KB, BKB and CKB for the cars A, B and C respectively. The purpose of these contacts will be understood from the preceding discussion, in conjunction with the detailed description of operation of the relays KB, BKB and CKB in the aforesaid Savino et al. application.

The master down call above relay MCA may be energized only if break contacts SP5 of the spotting transfer relay or make contacts PM9 of the spotting interrupting relay are closed. The contacts SP5 open at the beginning of spotting operation and remain open until the spotting of elevator cars to the last spotted floor is finally terminated. The contacts PM9 are closed when available elevator cars are to be spotted to serve a specific floor.

If the elevator system is conditioned for intense up peak operation, if no car in the high zone sub-bank (the cars A and C) during such operation is located at or specifically assigned to serve the lower terminal or first floor and if at least one of such cars is available for assignment, break contacts DH3 of the high zone demand relay are open to prevent energization of the relay MCA. If, on the other hand, during intense up peak operation no car in the low zone sub-bank (the cars B and D) is located at or specifically assigned to serve the first floor and if at least one of these cars is available for assignment, break contacts DL3 of the low zone demand relay are open to prevent energization of the relay MCA.

FIGURE 9

Figure 9:
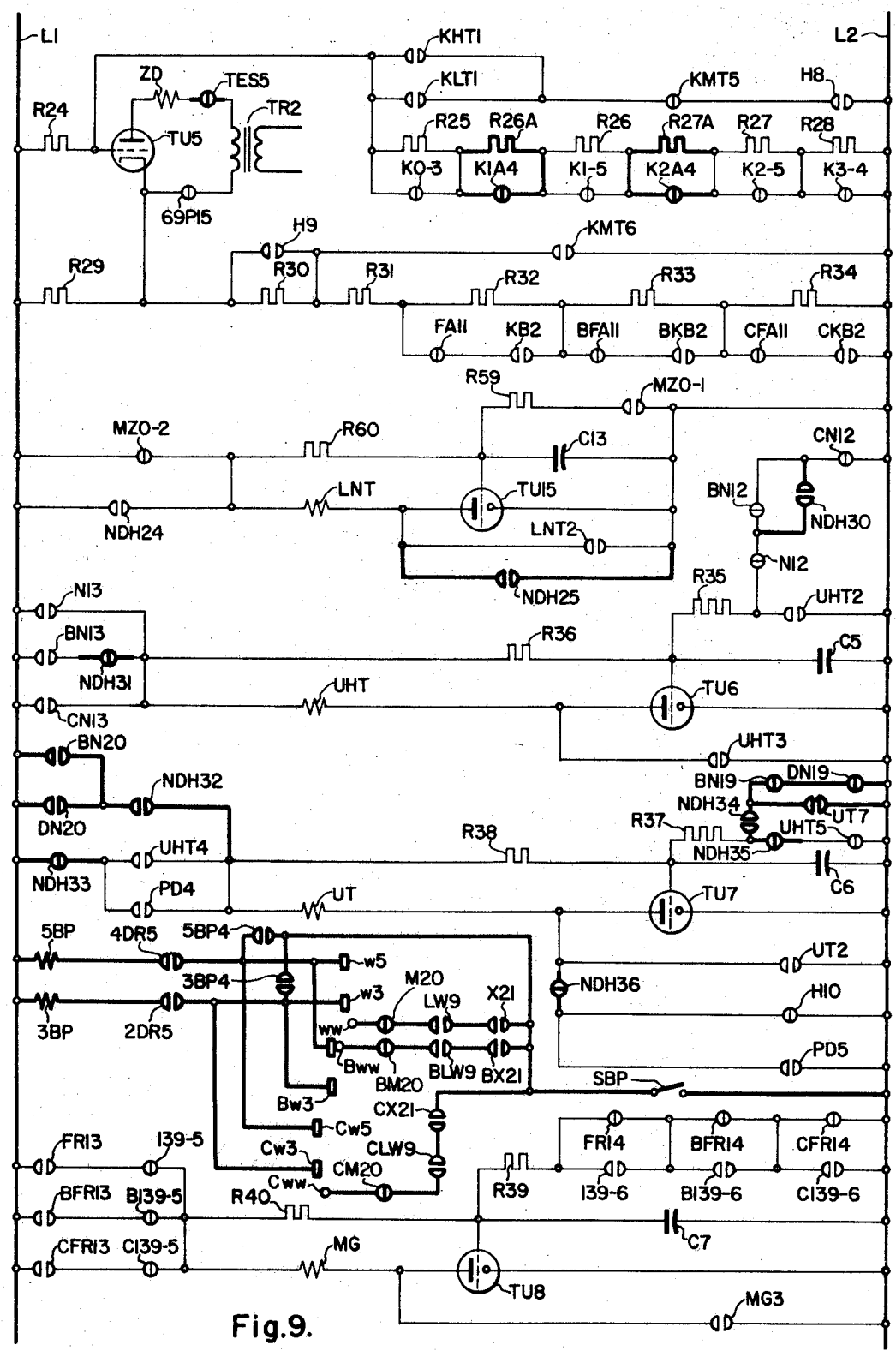

Except for the following additions, FIG. 9 is similar to FIG. 9 of the aforesaid Savino et al. application.

Break contacts TES5 of the extension car scanning relay are provided for the purpose of controlling in part, the energization of the down zone demand relay ZD. Thus, if an elevator car capable of serving the top extension (seventh) floor is available for assignment and if there is a demand for extension floor service, the contacts TES5 are open to prevent pickup of the relay ZD, or, if the relay already is picked up, to effect dropout thereof.

Operation of the resistors R26A and R27A and the respective associated break contacts K1A5 and K2A5 of the down zone demand registering relays for the second and fourth floors, respectively, in the bridge circuit which controls energization of the relay ZD will be understood from the preceding discussion of FIG. 8 and from the detailed discussion of operation of the relay ZD in the aforesaid Savino et al. application.

When the elevator system is conditioned for intense up peak operation, make contacts NDH24 and NDH25 are closed to energize and pick up the absence timing relay LNT.

Turning to the first loading interval relay UHT and the second loading interval relay UT, when the elevator system is not conditioned to provide intense up peak service, make contacts NDH30, NDH32 and NDH34 of the intense up peak relay are open and break contacts NDH31, NDH33, NDH35 and NDH36 thereof are closed. Operation of the relays UHT and UT under such conditions will be fully understood by reference to the aforesaid Savino et al. application. (Briefly, under normal operating conditions, pickup of the relay UHT is subjected to a time delay of fifteen seconds after one of the cars A, B, and C is selected as the next car to leave the first floor, provided that the car remains at such floor for at least fifteen seconds; such pickup initiates a timing operation of the relay UT, which picks up fifteen seconds thereafter; i.e., the relay UT picks up thirty seconds after selection of the aforesaid car, provided that the same car remains at the first floor for an additional fifteen seconds.)

During intense up peak periods of operation, however, when the elevator cars are divided into a high zone sub-bank (cars A and C) and a low zone sub-bank (cars B and D), it is necessary to provide means for determining the maximum loading interval of each car in each of the sub-banks which is selected as the next car in the sub-bank to leave the lower terminal or first floor. The circuits associated with the relays UHT and UT have been modified to this end, although it will be understood that separate loading interval relays may be employed for this purpose, if desired.

Referring first to the first loading interval relay UHT, when the elevator system is conditioned for intense up peak operation, make contacts NDH30 are closed and break contacts NDH31 are open, thus rendering ineffective operation of break contacts BN12 and make contacts BN13 of the next car relay for the elevator car B. Consequently, during intense up peak periods, only the respective contacts of the next car relays for the high zone sub-bank cars A and C control operation of the relay UHT, that is, this relay has a time delay in pickup of fifteen seconds following selection of the car A or the car C as the next car in the high zone sub-bank to leave the lower terminal floor.

As noted above, pickup of the relay UHT normally initiates a timing operation of the circuits associated with the second loading interval relay UT. This is accomplished by means of make contacts UHT4 and break contacts UHT5. But during intense up peak operation, break contacts NDH33 and NDH35 are open, and thus the relay UT operates independently of operation of the relay UHT. It will be observed that opening of the contacts NDH33 also prevents operation of make contacts PD4 of the instant dispatch relay from affecting operation of the relay UT, while opening of break contacts NDH36 has a similar effect with respect to make contacts PD5 and break contacts H10 of the motor-generator running relay. In addition, make contacts NDH32 and NDH34 are closed. It will be apparent that as a result, during intense up peak periods, the contacts BN19, BN20, DN19 and DN20 of the respective next car relays for the low zone sub-bank cars B and D control operation of the relay UT, i.e., this relay has a time delay in pickup of fifteen seconds following selection of the car B or the car D as the next car in the low zone sub-bank to leave the first floor.

Turning now to the lower part FIG. 9, an energizing circuit for each of the passing relays 5BP and 3BP can be completed only if a manually-operable switch SBP is closed. If such be the case, the relay 5BP initially picks up when an elevator car conditioned for down travel is loaded to capacity at the fifth floor and a down floor call is registered for the fourth floor. Similarly, the relay 3BP initially picks up if an elevator car conditioned for down travel is loaded to capacity at the third floor when a down floor call is registered for the second floor.

Each of the passing relays 3BP and 5BP may be energized initially through any one of three parallel circuit branches, each of which is associated with a separate one of the elevator cars A, B and C. It will be observed that each circuit branch includes a floor selector contact segment for the corresponding floor. For example, car A floor selector contact segments $w3$ and $w5$ are associated with the relays 3BP and 5BP, respectively. The contact segment $w3$ is engaged by a car A floor selector carriage brush $ww$ when the car A is located at the third floor, while the contact segment $w5$ is engaged by the same brush when the car A is positioned at the fifth floor. These contact segments and their brush are incorporated in the car A floor selector 15 of FIG. 1 in a manner which will be understood more fully by reference to the aforesaid Savino et al. application.

Let it be assumed that the switch SBP is closed, that elevator car A is stopped (break contacts M20 are closed) at the third floor (the brush $ww$ is in engagement with the contact segment $w3$), is conditioned for down travel (make contacts X21 are closed) and is loaded to capacity (make contacts LW8 are closed) and that a down floor call is registered for the second floor (make contacts 2DR5 are closed). As a result, the following energizing circuit is completed:

L1, 3BP, 2DR5, $w3$, $ww$, M20, LW8, X21, SBP, L2

Pickup of the passing relay 3BP is accompanied by closure of its make contacts 3BP4 to establish a holding circuit for the relay through the contacts 2DR5 and the switch SBP. Thus, the relay 3BP remains energized until the contacts 2DR5 open to indicate that the down floor call for the second floor has been answered.

Assume now that the same conditions exist as in the preceding example, except that the car A is located at the fifth floor (the brush $ww$ is in engagement with the contact segment $w5$) and that a down floor call is registered for the fourth floor (make contacts 4DR5 are closed). This results in the establishment of the following energizing circuit:

L1, 5BP, 4DR5, $w5$, $ww$, M20, LW8, X21, SBP, L2

Upon pickup, the relay 5BP closes its make contacts 5BP4 to complete a self-holding circuit through the contacts 4DR5 and the switch SBP. Consequently, the relay 5BP remains picked up until the contacts 4DR5 open to signify that the down floor call for the fourth floor has been answered.

Operation of the relays 3BP and 5BP with respect to the elevator cars B and C will be understood from the preceding discussion. Pickup of these relays results in the provision, during down peak periods of operation, of substantially uniform elevator service for the second and third floors in the first down zone and for the fourth and fifth floors in the second down zone, respectively, as will be explained hereinafter.

FIGURE 10

Figure 10:
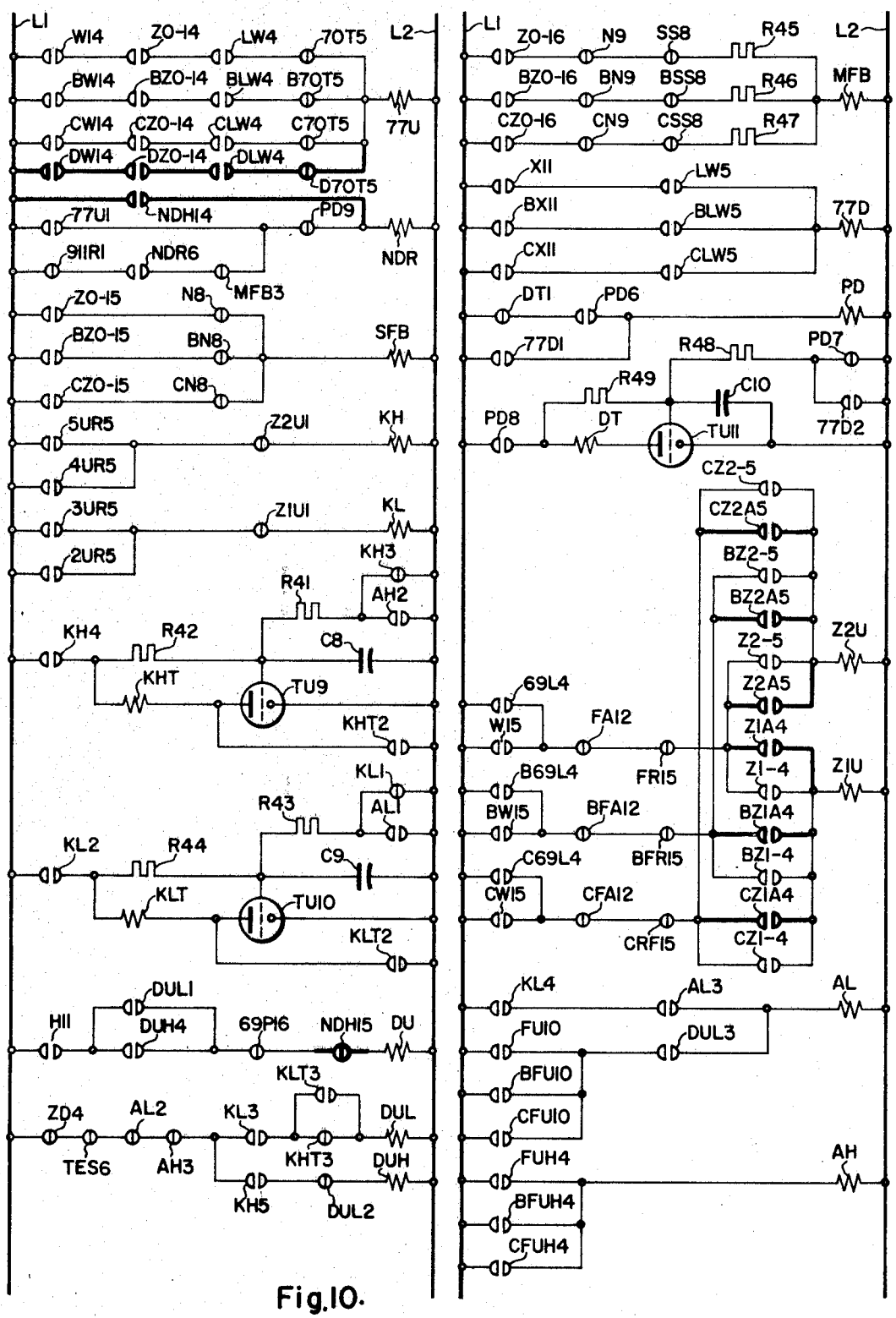

The present FIG. 10 is similar to FIG. 10 of the aforesaid Savino et al. application except for the following modifications.

Referring to the up by-pass relay 77U in the upper portion of the left-hand column of FIG. 10, a circuit branch for energizing this relay and which is associated with the elevator car D has been added in parallel with the similar branches for the cars A, B and C, respectively.

Make contacts NDH14 are closed to pick up the no demand return relay NDR as long as the elevator system is conditioned for intense up peak operation. Turning to the lower portion of the column, break contacts NDH-15 concurrently are open to prevent energization of the up zone demand relay DU.

If there is a demand for top extension or seventh-floor service and an elevator car capable of serving such floor is available for assignment, break contacts TES6 are open to prevent pickup of the low up zone demand relay DUL and the high up zone demand relay DUH.

As explained in the aforesaid Savino et al application, the high up zone position relay (mid-portion of the right-hand column of FIG. 10) may be energized only if an elevator car is positioned in the high up zone (fourth and fifth floors) and if certain other conditions exist with respect to the same car.

Normally, the location of the car A, for example, at either the fourth or fifth floor is indicated by closure of make contacts Z2–5. In the present case, however, under certain conditions to be discussed more fully hereinafter, the contacts Z2–5 are closed only if the car A is located at the fifth floor. As a result, make contacts Z2A5 have been added to indicate under such conditions whether the car A is located at the fourth floor (the contacts Z2A5 are closed) or is absent therefrom (the contacts Z2A5 are open).

Likewise, the low up zone position relay Z1U may be energized only if an elevator car is positioned in the low up zone (second and third floors). Normally, the location of the car A, for example, at either the second or third floor is indicated by closure of make contacts Z1–4. Under the same conditions mentioned above with respect to the contacts Z2–5, however, the contacts Z1–4 are closed only if the car A is located at the third floor. Consequently, make contacts Z1A4 have been added to indicate whether the car A is located at the second floor (the contacts Z1A4 are closed) or is absent therefrom (the contacts Z1A4 are open) under such conditions.

It will be observed by inspection that the foregoing discussion of the relays Z1U and Z2U likewise applies with respect to each of the elevator cars B and C.

FIGURE 11

Figure 11:
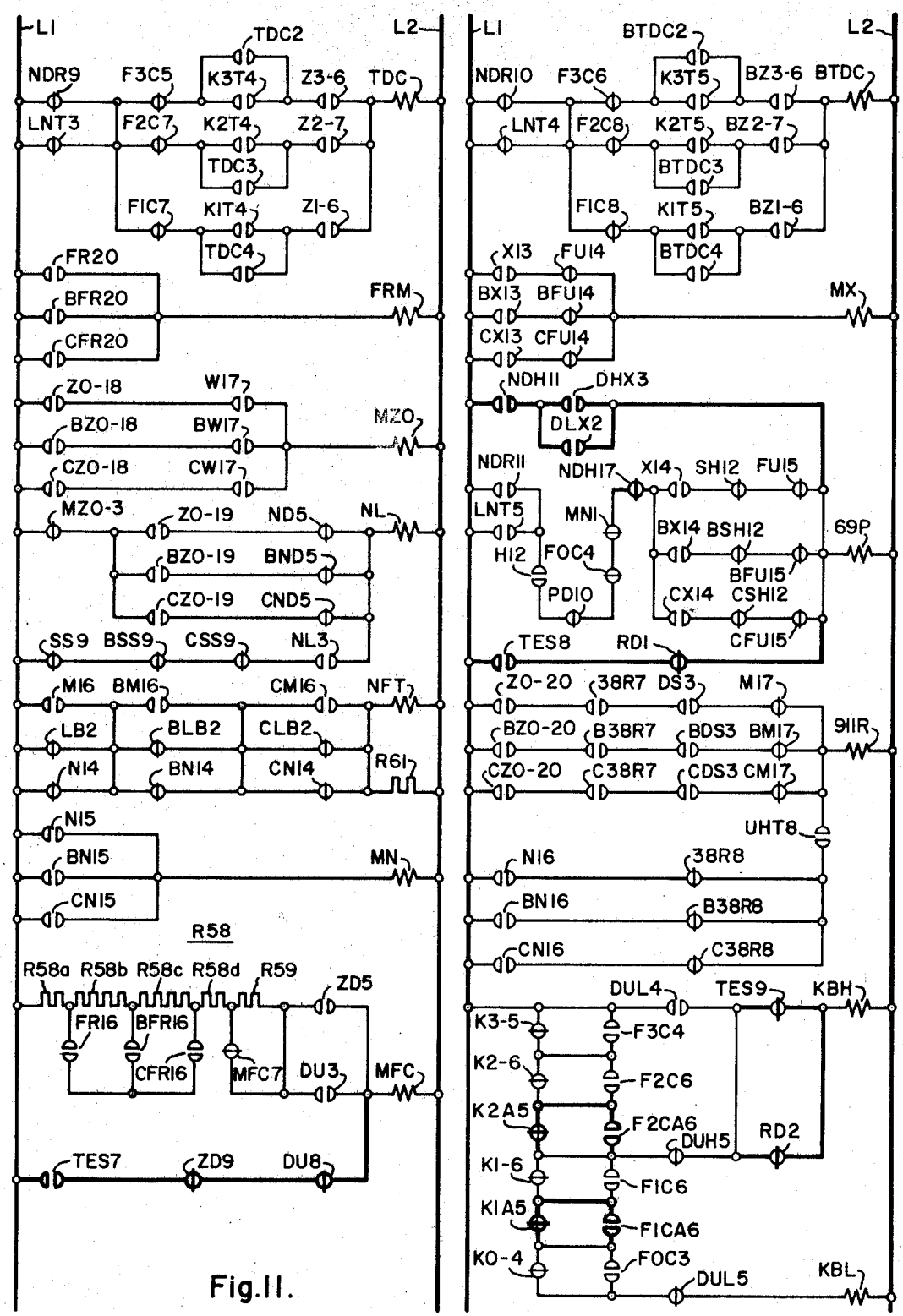

Except for the following additions, the present FIG. 11 is similar to FIG. 11 of the aforesaid Savino et al. application.

The multiple available car relay MFC at the bottom of the left-hand column of FIG. 11 is energized and picked up if there is a demand for top extension (seventh) floor service and an elevator car capable of serving such floor is available for assignment (make contacts TES7 of the extension car scanning relay are closed), provided that break contacts ZD9 of the down zone demand relay and break contacts DU8 of the up zone demand relay both are closed.

Turning to the mid-portion of the right-hand column of FIG. 11, the closest car relay 69P is energized and picked up if make contacts NDH11 are closed to indicate that the elevator system is conditioned for intense up peak operation and if make contacts DHX3 of the high zone down relay are closed to signify that during such operation an elevator car in the high zone sub-bank is conditioned for down travel but that no such car is located at or assigned to serve the first floor or if make contact DLX2 of the low zone down relay are closed to indicate similarly that during such operation an elevator car in the low zone sub-bank is conditioned for down travel but no such car is located at or assigned to serve the first floor. (It will be noted that when the contacts NDH11 are closed, break contacts NDH17 are open to prevent energization of the relay 69P therethrough.)

The relay 69P also may be picked if there is a demand for service from the lower terminal floor to the seventh floor and an elevator car capable of serving the latter floor is available for assignment (make contacts TES8 of the extension car scanning relay are closed), provided that in general neither an up floor call for the sixth floor nor a down floor call for the seventh floor is registered (break contacts RD1 of the extension floor demand relay are closed).

The high zone demand relay KBH may be energized and picked up only if break contacts TES9 and/or RD2 are closed. Conversely, if both of these sets of contacts are open, the relay KBH must be dropped out. Down zone demand registering relay break contacts K1A6 and K2A6 and assigned zone relay make contacts F1CA6 and F2CA6 respectively in parallel therewith are associated with the second and fourth floors, respectively. These contacts are operative for controlling energization of the relay KBH and the low zone demand relay KBL when each of the second, third, fourth and fifth floors constitutes a separate down zone. Such operation will be discussed more fully hereinafter.

FIGURE 12

Figure 12:
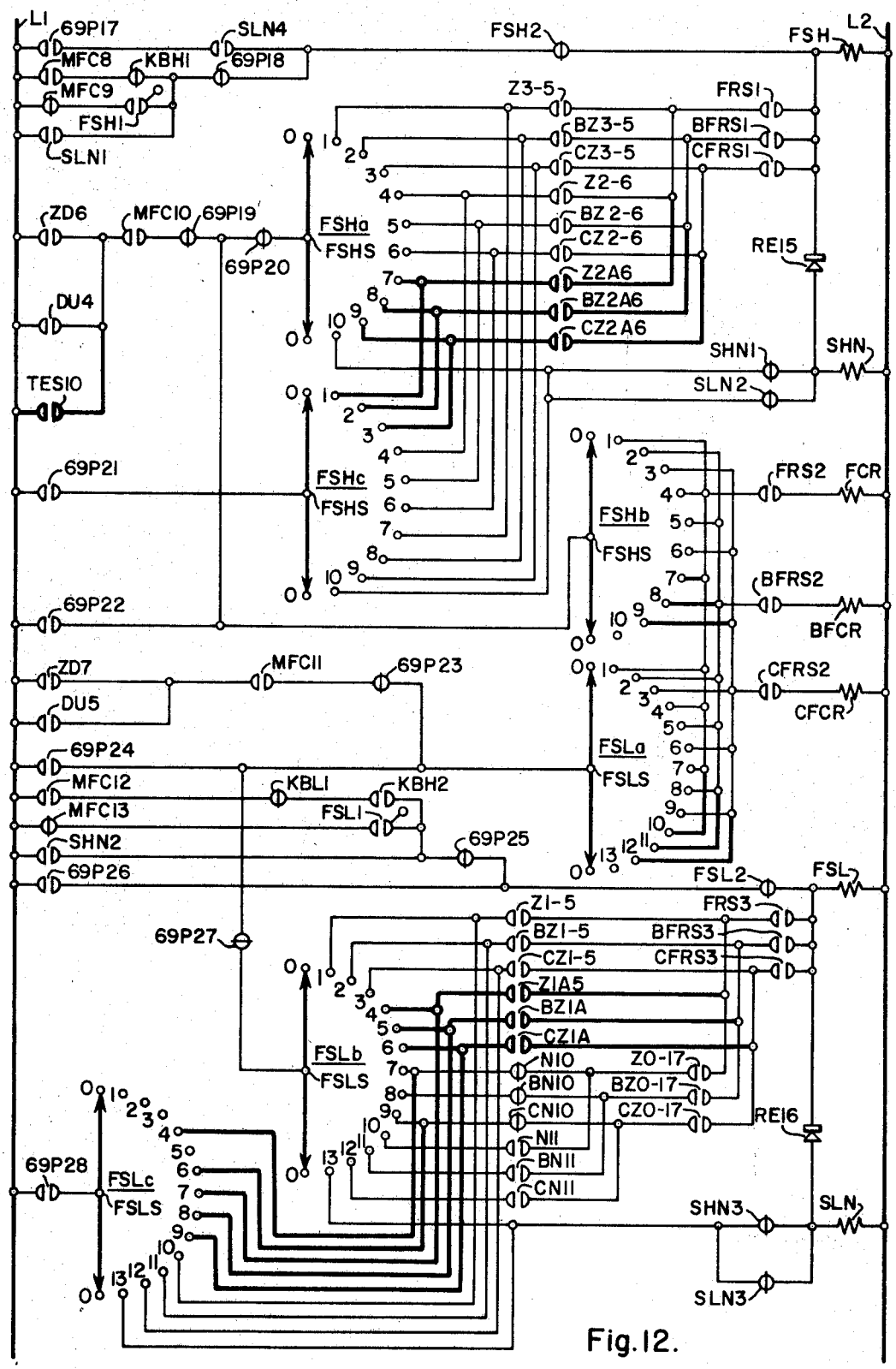

The present FIG. 12 is similar to FIG. 12 of the aforesaid Savino et al. application except for the following modifications.

Referring to the $a$ level of the high zone stepping switch FSH, make contacts TES10 are closed to render this level effective for selecting an elevator car to serve the extension (seventh) floor if at least one car capable of serving such floor is available for assignment when there is a demand for service for such floor. (If the contacts TES10 are closed, make contacts DU4 and ZD6 in parallel therewith both must be open.)

In the $c$ level of the low zone stepping switch FSL, the stepping contacts numbered 4 and 6 respectively are operative for effecting the selection of one of the top extension elevator cars A and C, if available for assignment, to furnish service for the top extension or seventh floor from the first floor, provided that such car is located at the latter floor but has not been selected as the next car to leave such floor (e.g., as signified by closure of make contacts Z0-17 and break contacts N10, respectively, for the car A).

In each of the three leevls of each of the stepping switches FSH and FSL, three positions or contacts have been added for engagement by the brushes associated therewith. For the level FSH$a$, the contacts numbered 7, 8 and 9 and for the level FSH$b$, the contacts numbered 1, 2 and 3 permit the selection of an elevator car located at the fourth floor (as indicated by closure of make contacts Z2A6 for the car A, for example) when the control system under certain conditions operates to divide what is normally the second down zone, comprising the fourth and fifth floors, into two separate down zones of one floor each. Under such conditions, the fourth, fifth, and sixth positions of each of these levels are operative for effecting selection of a car located at the fifth floor (e.g., as signified by closure of make contacts Z2-6 for the car A).

For the level FSL$b$, the contacts numbered 4, 5 and 6 and for the level FSL$c$, the contacts numbered 7, 8 and 9 permit the selection of an elevator car located at the second floor (as indicated by closure of make contacts Z1A5 for the car A, for example) when the control system under the same conditions operates to divide what is normally the first down zone, comprising the second and third floors, into two separate down zones of one floor each. Under these conditions, the first, second and third positions of the level FSL$b$ and the tenth, eleventh and twelfth positions of the level FSL$c$ are operative for effecting selection of a car located at the third floor (e.g., as signified by closure of make contacts Z1-5 for the car A).

Operation of the remaining components of FIG. 12 will be fully understood by reference to the detailed discussion of FIG. 12 in the aforesaid Savino et al. application.

FIGURE 13

Figure 13:
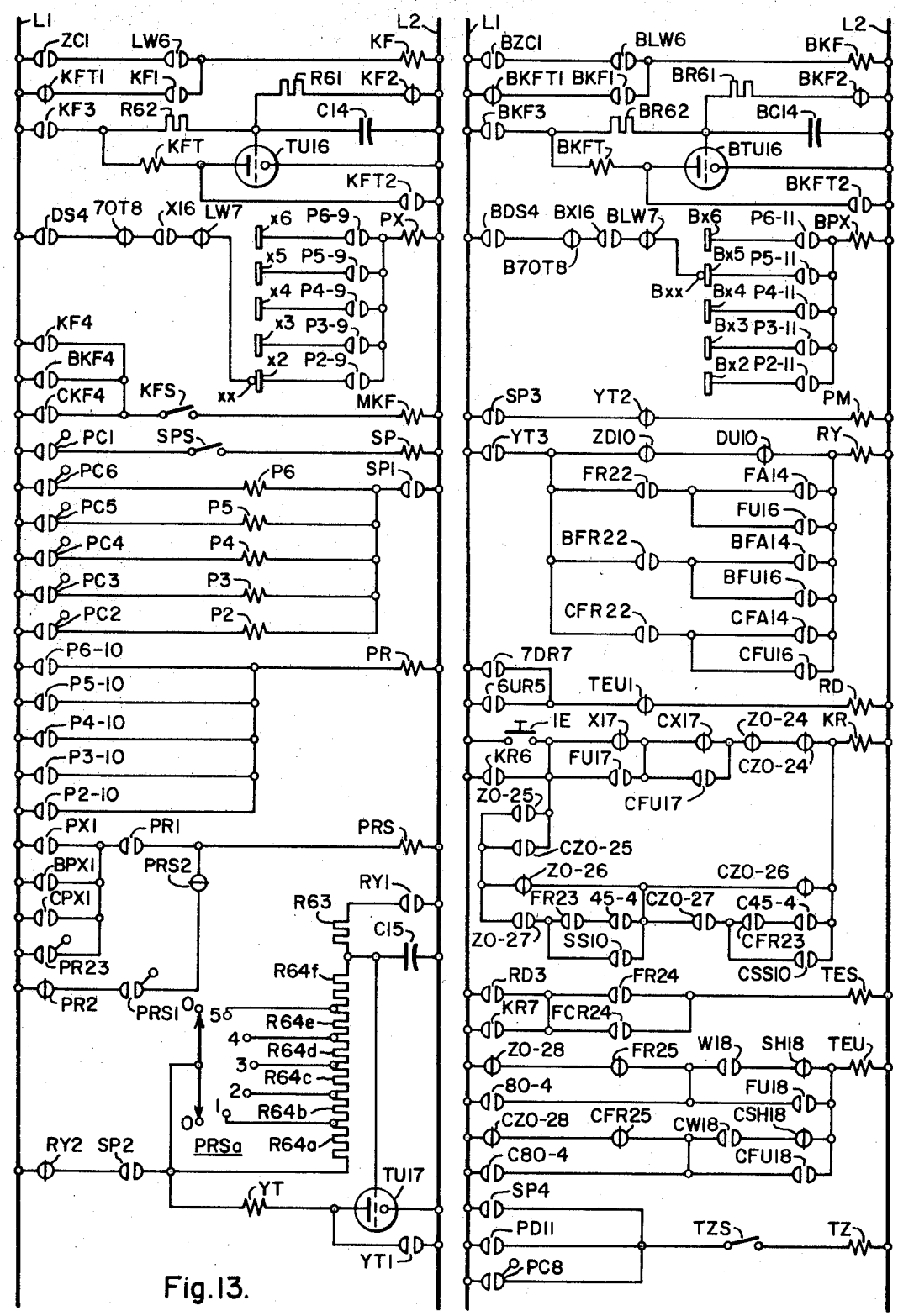

The upper portions of the two columns of FIG. 13 illustrate circuits for controlling the convention floor loading relays, the convention floor timing relays and the spotting loading relays for the elevator cars.

The convention floor loading relay KF for the car A, when picked up, indicates that the car A has been loaded to capacity at the convention (fifth) floor when conditioned for down travel. An initial energizing path for this relay may be completed through make contacts ZC1, which are closed if the car A is located at the fifth floor, if it is conditioned for down travel and if its non-interference time has expired, and through make contacts LW6, which are closed if the car A is loaded to a capacity. Pickup of the relay KF is accompanied by closure of its make contacts KF1 to establish a holding circuit for the relay through break contacts KFT1 of the car A convention floor timing relay KFT.

Referring to the circiuts associated with the relay KFT, it will be noted that such circuits include a firing capacitor C14, wich has a discharge resistor R61 and a charging resistor R62, and a cold-cathode thyratron tube TU16. It will be apparent that these circuits basically are similar to those respectively associated with the relays LNT, UHT, UT and MG of FIG. 9 and the relays K1T through K3T of FIG. 8, which are described in detail in the aforesaid Savino et al. application. Consequently, it appears unnecessary at this time to discuss further the functions of the various components in the timing circuits for the relay KFT, and the present discussion will be directed instead primarily to the operation of such circuits.

It will be assumed that system conditions are such that the convention floor loading relay KF has picked up. Opening of break contacts KF2 interrupts the discharge circuit for the capacitor C14. Closure of make contacts KF3 results in completion of the following charging circuit for the capacitor.

L1, KF3, R62, C14, L2

The capacitor C14 now charges at a rate determined by the resistance and capacitance of its charging circuit.

Upon expiration of the time required for the voltage across the capacitor C14 to build up to a suitable value, the tube TU16 fires to establish the following energizing circuit for the convention floor timing relay KFT:

L1, KF3, KFT, TU16, L2

The time delay in pickup of the relay KFT depends upon the specific requirements of each installation. As representative of suitable parameters, it will be assumed that this relay has a time delay in pickup of the order of ten seconds. The resistor R62 or the capacitor C14 or both of these components may be adjustable for the purpose of adjusting the time delay of the relay.

In picking up, the relay KFT closes it make contacts KFT2 to establish a holding circuit around the tube TU16. Inasmuch as the contacts KFT2 shunt the plate and cathode electrodes of the tube TU16, the discharge between such electrodes is terminated. The relay KFT also opens its break contacts KFT1 in the holding circuit of the car A convention floor loading relay KF, and the relay KF thus drops out. As a result, its make contacts KF3 open to interrupt the charging circuit of the capacitor C14 and the energizing circuit of the convention floor timing relay KFT. In addition, break contacts KF2 close to establish a discharge circuit for the capacitor C14 through the resistor R61. Inasmuch as the relay KFT now is denergized and dropped out, its make contacts KFT2 open with no immediate effect on the operation of the system.

Pickup of the spotting loading relay PX indicates that the car A, during spotting operation of the elevator system, is leaving, without being loaded to capacity, a floor to which it has been spotted. Associated with the relay PX is a row of contact segments x2 through x6, which are engaged successively by a brush xx as the floor selector carriage for the car A notches to its second through sixth-floor position, respectively. It will be understood that these contact segments and their associated brush are incorporated in the car A floor selector 15 of FIG. 1.

Each of the contact segments in the x row is connected to the spotting loading relay PX through make contacts of the floor spotting relay for the associated floor. Thus, it will be observed that an energizing circuit is established for the relay PX if, for example, the car A is located at the second floor (the brush xx is in engagement with the contact segment x2), if the second floor is the spotted floor (make contacts P2–9 are closed), if the doors of the car A are closed (make contacts DS4 are closed), if the car A non-interference time has expired (break contacts 70T8 are closed), if the car A is conditioned for down travel (make contacts X16 are closed) and finally if the car is not fully loaded (break contacts LW7 are closed). As the car A leaves the second floor, break contacts 70T8 open and the brush xx disengages the contact segment x2 to drop out the spotting loading relay PX.

Assuming that a manually-operable switch KFS is closed, an energizing circuit is completed for the master convention floor loading relay MKF provided that within at least the previous ten-second period of time, an elevator car has been fully loaded at the convention (fifth) floor when conditioned for down travel. If the car A, for example, meets these conditions, make contacts KF4 close to pickup the relay MKF. These contacts, once closed, remain closed to maintain such pickup for a time interval of ten seconds, as will be clear from the above descriptions of the car A convention floor loading relay KF and convention floor timing relay KFT.

The spotting transfer relay SP, when picked up, conditions the elevator system for spotting operation. In the present embodiment of the invention, energization of this relay is controlled by a manually-operable switch SPS and serially-connected make contacts PC1, which are assumed to be operated by a program clock (not shown) of a type well known in the art. It also will be assumed that the contacts PC1 are closed from 5:00 to 5:25 p.m. on each business day.

Pickup of the spotting transfer relay SP is accompanied by closure of its make contacts SP1, which are common to the respective energizing circuits of the floor spotting relays P2 through P6. Energization of each of these relays also is controlled by make contacts operated by the aforesaid program clock. For illustrative purposes, it will be assumed that make contacts PC2 through PC6 of the program clock are closed for successive five minute intervals. Thus, the floor spotting relay P2 is picked up through make contacts PC2 (and make contacts SP1) from 5:00 to 5:05 p.m.; the relay P3 is energized as a result of closure of make contacts PC3 from 5:05 to 5:10 p.m.; make contacts PC4 close to pick up the relay P4 from 5:10 to 5:15 p.m.; the relay P5 is picked up through make contacts PC5 from 5:15 to 5:20 p.m.; and, finally, the floor spotting relay P6 is energized through make contacts PC6 of the program clock from 5:20 to 5:25 p.m.

Energization of the spotting resetting relay PR is controlled by parallel make contacts of the respective floor spotting relays P2 through P6. Thus, when any of the floor spotting relays is picked up, the relay PR also is picked up. For example, if elevator cars are to be spotted to serve the sixth floor, make contacts P6–10 close to energize the relay PR, which remains picked up through these contacts from 5:00 to 5:05 p.m. on each business day. At 5:05, the contacts P6–10 open to drop out the relay PR momentarily, and make contact P5–10 close to pick up the relay once again and to maintain such pickup until 5:10 while elevator cars are spotted to serve the fifth floor, and so on. For a purpose which will be discussed hereinafter, the spotting resetting relay PR is provided with a slight delay in pickup by any conventional means.

An object of floor spotting operation of the present elevator system is to provide service primarily for each spotted floor during its associated spotting period. Although relatively light traffic in either direction is to be expected at unspotted floors during spotting operation, it is desirable to provide means for furnishing elevator service to such floors in the event that such traffic does exist. In accordance with the invention, the spotting interrupting timing relay YT is provided for this purpose. Pickup of this relay at the expiration of each of predetermined portions of each spotting period effects the assignment of the first available elevator car to answer one or more floor calls which may be registered for unspotted floors at the time of such pickup. Furthermore, by means of the spotting stepping switch PRS, which is associated with the relay YT, the frequency of such assignment to serve unspotted floors increases as traffic at a spotted floor diminishes or tapers off.

It will be noted that the timing circuits associated with the spotting interrupting timing relay YT basically are similar to those for the conventional floor timing relay KFT in the upper portion of FIG. 13 and include a firing capacitor C15, a capacitor discharge resistor R63, a capacitor charging resistor R64 and a cold-cathode thyratron tube TU17.

Let it be assumed that the spotting transfer relay picks up to close its make contacts SP2. Inasmuch as make contacts RY1 of the spotting resumption relay must be open and break contacts RY2 thereof must be closed at this time, closure of the contacts SP2 completes a charging circuit for the capacitor C15 through the contacts RY2 and the resistor R64. The capacitor C15 now charges at a rate determined by the resistance and the capacitance of its charging circuit.

Upon expiration of the time required for the voltage across the capacitor C15 to build up to a suitable value, the tube TU17 fires to establish an energizing circuit for the spotting interrupting timing relay YT through the tube and the contacts SP2 and RY2. The time delay in pickup of the relay YT under the assumed conditions depends upon the specific requirements of each installation. As representative of suitable parameters, it will be assumed that this relay has a time delay in pickup of the order of sixty seconds. The resistor R64 or the capacitor C15 or both of these components may be adjustable for the purpose of adjusting the time delay of the relay.

In picking up, the relay YT closes its make contacts YT1 to establish a self-holding circuit around the tube TU17. Since the contacts YT1 shunt the plate and cathode electrodes of the tube TU17, the discharge between such electrodes is terminated. Pickup of the relay YT also results in subsequent energization of the spotting resumption relay to open its break contacts RY2, thus interrupting the charging circuit for the capacitor C15 and the energizing circuit for the relay YT. Additionally, make contacts RY1 close to establish a discharge circuit for the capacitor C15 through the resistor R64. Since the relay YT now is deenergized and dropped out, its make contacts YT1 open with no immediate effect on the operation of the system. Such dropout also effects deenergization of the spotting resumption relay to close its break contacts RY2 and to open its make contacts RY1, thereby initiating another timing operation of the relay YT (at this time, make contacts SP2 remain closed). The relay YT continues to cycle in this manner throughout floor spotting operation of the elevator system.

The spotting stepping switch PRS is similar in construction and operation to the assigned zone stepping switch KA of FIG. 5, the down demand mid-point stepping switch SZ of FIG. 7 and the high zone and low zone stepping switches FSH and FSL of FIG. 12. The stepping switch PRS has one level PRSa. This level, in turn, includes a semicircular row of contacts, which are disposed to be engaged sequentially by two brushes, the brushes being displaced from each other by 180° about a common shaft.

In FIG. 13, the brushes associated with the stepping switch PRS are illustrated in their homing position, in which they engage blank contacts (numbered 0). The remaining five positions or contacts associated with the brushes are numbered 1 through 5, respectively. It will be observed that each of these contacts is connected to a tap on the resistor R64, the resistor thereby being divided into six sections, R64a through R64f. Thus, during floor spotting operation of the elevator system, if the brushes of the stepping switch are displaced from their homing position, a portion of the resistor R64 is shorted out, the higher the number of the stepping contact engaged by one of the brushes, the larger the portion of the resistor which is shorted out. As will be apparent by inspection and from the preceding discussion, it will be understood that this results in a proportional decrease in time delay in pickup of the spotting interrupting timing relay YT.

The spotting stepping switch PRS also is provided with a set of homing contacts PRS1. These contacts are cam-operated by the stepping switch to open when the brushes associated therewith are in their homing position. When the brushes are in any position other than their homing position, the contacts PRS1 are closed. The switch PRS additionally has a set of self-stepping break contacts PRS2. Finally, the stepping switch is provided with a set of contacts PRS3, which are cam-operated to close when the brushes are in their fifth position. When the brushes are in any position other than their fifth position, the contacts PRS3 are open.

In order to energize the coil of the stepping switch PRS initially, make contacts PR1 of the spotting resetting relay must be closed (in which case break contacts PR2 thereof will be open) and at least one of the parallel sets of make contacts PX1, BPX1 and CPX1 of the respective spotting loading relays in series therewith also must be closed to indicate that the corresponding elevator car is conditioned to leave, without a capacity load, a floor to which it has been spotted. Assume, for example, that the contacts PX1 close to indicate that the car A is so conditioned. Shortly after their closure, the contacts PX1 reopen to deenergize the coil of the stepping switch. As a result, the brushes of the stepping switch step rapidly in a counterclockwise direction, as viewed in FIG. 13, to their first position, thereby shorting out the section R64a of the resistor R64 in the timing circuit of the spotting interrupting timing relay Yt. (It will be noted that energization and deenergization of the coil of the stepping switch is accompanied by opening and then reclosure of the self-stepping contacts PRS2 and that the stepping of the brushes away from their homing position results in closure of the homing contacts PRS1 without affecting operation of the stepping switch, inasmuch as break contacts PR2 are open). Thus, each time one of the sets of make contacts PX1, BPX1 and CPX1 closes and then reopens, the brushes are stepped one position to short out, in addition to each section previously shorted out, the next successive section of the resistor R64.

As discussed heretofore, at the end of each floor spotting period, the spotting resetting relay PR drops out to open its make contacts PR1 and to close its break contacts PR2. Closure of the contacts PR2 effects energization of the coil of the stepping switch PRS through its self-stepping contacts PRS2, provided that the brushes are away from their homing position, in which case the homing contacts PRS1 also are closed. Such energization is accompanied by opening of the contacts PRS2 and thus deenergization of the stepping switch coil. It will be clear that this sequence of operations continues and that as a result the brushes rapidly step from the position in which they were located when the sequence began to their homing position, wherein the homing contacts PRS1 reopen to terminate the sequence. This insures that at the end of each floor spotting period, the brushes are reset to their homing position if they are not in such position at that time, so that the stepping switch may operate in the same manner as above during the next succeeding floor spotting period.

Note that if the brushes reach their fifth position before resetting thereof is initiated, the cam-operated contacts PRS3 close to energize the coil of the stepping switch continuously through the closed make contacts PR1. Consequently, the brushes remain in their fifth position as long as the contacts PR1 remain closed, regardless of operation of the contacts PX1, BPX1 and CPX1 in parallel with the contacts PRS3. Subsequently, the contacts PR1 open as aforesaid to interrupt the energizing circuit of the coil of the stepping switch, and as a result the brushes are reset from their fifth position to their homing position.

It will be recalled that the spotting resetting relay PR is designed to have a slight time delay in pickup. Such time delay is adjusted to insure that at the end of each floor spotting period, the contacts PR1 remain open and the contacts PR2 remain closed sufficiently long to insure that the brushes of the stepping switch PRS are reset to their homing position regardless of the position they were in when resetting was initiated.

It also will be recalled that the spotting interrupting timing relay YT is assumed to have a maximum time delay in pickup of sixty seconds. For illustrative purposes, it will be assumed further that each of the sections R64a through R64f of the resistor R64 comprises one-sixth of the total resistance thereof. Thus, each section represents a ten-second portion of the aforesaid sixty seconds. Consequently, the time delay in pickup of the relay YT decreases ten seconds for each step away from their homing position of the brushes of the stepping switch PRS. Since, during any given floor spotting period, the brushes cannot step away from their fifth position, if they reach such position, until the end of the period, when they are reset to their homing position as aforesaid, the time delay in pickup of the relay YT during such period can only decrease from a maximum of sixty seconds to a minimum of ten seconds. In other words, in the illustrated embodiment of the invention, the departure of more than fixe unloaded elevator cars from each spotted floor during its associated spotting period has no further effect on the time delay in pickup of the relay YT, the time delay under such circumstances remaining at ten seconds until the end of the particular period. As in the case of the maximum time delay in pickup of relay YT, as determined by the total resistance of the resistor R64, the portion thereof represented by each section of the resistor will depend upon the specific requirements of each installation, and each portion need not necessarily be of the same duration as each of the remaining portions.

Referring to the mid-portion of the right-hand column of FIG. 13, the spotting interrupting relay PM, when periodically deenergized during floor spotting operation of the elevator system, temporarily interrupts such operation and effects the assignment of an available elevator car to answer a floor call which may be registered for a floor other than the spotted floor during its respective spotting period. Pickup of the relay PM initially is effected by closure of spotting transfer relay make contacts SP3, which remain closed throughout spotting operation of the system. As will be understood from the preceding discussion, break contacts YT2 of the spotting interrupting timing relay thereafter open and reclose at timed intervals, thus periodically dropping out and picking up the relay PM.

Energization of the spotting resumption relay RY during floor spotting operation of the elevator system also is controlled by contacts of the spotting interrupting timing relay. When the relay RY picks up, the interruption of spotting operation effected by dropout of the spotting interrupting relay PM, as aforesaid, is discontinued and spotting operation is resumed. Thus, periodic energization of the relay RY is effected momentarily by periodic closure of make contacts YT3. An energizing path for this relay may be completed through one of a plurality of parallel circuit branches. If there is no down or up demand for service for a floor other than a spotted floor, respective break contacts ZD10 and DU10 both are closed to pick up the relay RY. If, however, there is such a demand for service, one (or both) of the sets of contacts ZD10 and DU10 are open to prevent energization of the relay RY therethrough. Alternatively, pickup of this relay may be effected through one of the remaining parallel circuit branches connected thereto, each of these branches being associated with a separate one of the elevator cars in the system. For example, if the car A is available for assignment, make contacts FR22 are closed, and if the car is dispatched to answer a down or an up demand for service, make contacts FA14 or FU16 respectively close to pick up the relay RY. Such pickup results in dropout of the spotting interrupting timing relay to open make contacts YT3 thereof, in turn dropping out the relay RY.

If a down floor call is registered for the seventh floor (make contacts 7DR7 are closed) and/or an up floor call is registered for the sixth floor (make contacts 6UR5 are closed), the extension floor demand relay RD is picked up, unless break contacts TEU1 are open to indicate that an extension floor elevator car is conditioned to provide up service.

Since fewer than all of the elevator cars in the system are assumed to be capable of serving the top extension or seventh floor, separate means are provided at the lower terminal or first floor for enabling a prospective passenger desiring transportation from the latter floor to the extension floor to register under certain conditions a call or demand for service from the lower terminal to the extension floor. In a preferred embodiment of the invention, a normally-open push button 1E is located at the first floor for this purpose. This push button controls initial energization of the lower terminal extension demand relay KR, which, when picked up, indicates that there is a demand for an extension floor car at the first floor.

Recalling that only the cars A and C are assumed to be capable of serving the seventh floor, if the push button 1E is operated to its closed condition, an energizing path for the relay KR may be completed if neither the car A nor the car C is conditioned for down travel (break contacts X17 and CX17 respectively are closed), i.e. both of these cars are conditioned for up travel, and if neither is located at the first floor (break contacts Z0–24 and CZ0–24 are closed). If, on the other hand, the contacts X17, for example, are open to indicate that the car A is conditioned for down travel, an energizing circuit nevertheless may be completed for the relay KR if the car A is assigned to answer an up floor call below, in which case make contacts FU17 in parallel with the contacts X17 are closed.

Alternatively, the relay KR may be energized if either the car A or the car C is located at the first floor, provided that certain other conditions are present with respect to the same car. If the car A, for example, is located at the first floor, break contacts Z0–24 and Z0–26 are open, but make contacts Z0–25 and Z0–27 are closed. Consequently, the relay KR may be picked up if, in addition, the car A is available for assignment (make contacts FR23 are closed) with its doors closed (make contacts 45–4 are closed) or if it is conditioned to start from the first floor (make contacts SS10 are closed). (Assuming that the car C is not positioned at the first floor, make contacts CZ0–26 are closed.)

When the lower terminal extension demand relay KR picks up as aforesaid as a result of operation of the push button 1E, it closes its make contacts KR6 in parallel with the push button to establish a self-holding circuit.

Pickup of the extension car scanning relay TES effects the selection of an available extension floor elevator car to respond to a demand for extension floor service. From the preceding discussion, it will be understood that such a demand may be indicated by closure of make contacts RD3 or KR7. If, in addition, either or both of the extension floor cars A and C are available for assignment, either or both of make contacts FR24 and CFR24 are closed to complete an energizing path for the relay TES.

The extension car up relay TEU, when picked up, indicates that an extension floor elevator car is conditioned to provide up service. For energizing this relay, circuits are provided which are associated with each of the extension floor cars A and C. If the car A, for example, is not located at the first floor and is not available for assignment, break contacts Z0–28 and FR25 respectively are closed. Alternatively, if, in general, the car A is running, make contacts 80–4 in parallel with the former contacts are closed. Furthermore, make contacts W18 are closed if the car A is conditioned for up travel, and break contacts SH18 are closed if the car is not assigned to serve a particular down zone, while make contacts FU18 in parallel therewith are closed if the car A is assigned to answer a registered up floor call. Energization of the relay TEU signifies that at least one of the cars A and C is in a condition to answer without undue delay a down floor call for the extension or seventh floor or an up floor call for the sixth floor.

The zone transfer relay TZ may be energized only if a manually-operable switch TZS in series therewith is closed. Assuming that such is the case, an energizing path is completed for this relay if the elevator system is conditioned for spotting operation (make contacts SP4 of the spotting transfer relay are closed), if there is a substantial demand for elevator service in the down direction, i.e., a break peak traffic condition (make contacts PD11 of the instant dispatch relay are closed), or if make contacts PC8 of a program clock, such as that heretofore discussed with respect to the spotting operation of the elevator system, are closed. The contacts PC8 may be operated by the clock to close at any desired time and may be maintained closed by the clock for any desired interval. Alternatively, a manually-operable switch may be substituted for the contacts PC8, or such a switch may be connected in parallel with the contacts PC8, PD11 and SP4 and may be closed to energize the relay TZ at any desired time and for any desired interval.

FIGURE 14

The circuits of FIG. 14 are associated with intense up peak operation of the elevator system.

The high zone low floor relay HLC controls the stopping of the elevator car A, when it is conditioned for up travel, in response to registered car calls therefor during intervals of intense up peak operation. Associated with this relay is a row of contact segments $y2$, $y3$ and $y4$, which are engaged successively by a brush $yy$ as the carriage of the car A floor selector (FIG. 1) notches to its second, third and fourth-floor positions, respectively. It will be observed that the brush $yy$ is connected directly to the bus L1, while the contact segment $y4$ is connected directly to the relay HLC. Thus, an initial energizing path for the relay HLC is completed whenever the car A selector carriage is located in its fourth-floor position. (The fourth floor is the lowest floor in the high zone during intense up peak operation.) On the other hand, the contact segments $y2$ and $y3$ are connected to the relay HLC through break contacts M19, which are closed only when the car A is stopped. As the result, the relay initially may be energized through the contact segment $y2$ or $y3$ only if the car A stops at the second or third floor, respectively.

Pickup of the high zone low floor relay HLC is accompanied by closure of its make contacts HLC 2 to establish a self-holding circuit through break contacts X19 of the down preference relay for the car A. Consequently, once energized, the relay HLC remains energized through its holding circuit until the contacts X19 open to indicate that the car A is conditioned for down travel.

Inasmuch as during intense up peak operation the cars A and C in the present embodiment of the invention form the high zone sub-bank, which provides service primarily from the first floor to the floors above the third floor, the car C is furnished with a relay CHLC (not shown) corresponding to the relay HLC for the car A.

On the other hand, the low zone high floor relay BLLC is provided for the car B, which, during intense up peak operation forms a part of the low zone sub-bank. Such sub-bank provides service primarily from the first to a second and third floors, the latter of which is the highest floor in the low zone. The relay BLLC controls the response of the car B to car calls which may be registered therefor during intervals of intense up peak operation. It will be apparent that this relay is energized and picked up only when the car B floor selector carriage is in its third-floor position and the brush Byy consequently is in engagement with the contact segment By3. In addition, it will be understood from the preceding discussion that a similar relay DLLC (not shown) is provided for the car D.

The intense up peak relay NDH can be energized and picked up only if a manually-operable switch SN is in its closed condition or if make contacts PC9 of a program clock, such as that heretofore discussed with respect to spotting operation of the elevator system, are closed. The contacts PC9 may be operated by the clock to close at any desired time and may be maintained closed by the clock for any desired interval. Assuming that either the switch SN or the contacts PC9 are closed, an initial energizing path for the relay NDH is completed if make contacts 77U2 are closed. These contacts close if any elevator car in the system becomes fully loaded at the lower terminal or first floor. Pickup of the relay NDH is accompanied by closure of its make contacts NDH18 to establish a self-holding circuit around the contacts 77U2. Thus, once energized, the relay NDH remains energized through its holding contacts until the switch SN and the contacts PC9 both are in their respective open conditions.

Pickup of the high zone demand relay DH and/or the high zone down relay DHX requires that during intense up peak operation (make contacts NDH28 are closed) no elevator car in the high zone sub-bank (cars A and C) is located at the first floor (break contacts Z0–29 and CZ0–29 respectively are closed) or is specifically assigned to serve such floor (break contacts FOH1 are closed). An energizing path for the relay DH is completed if at least one of the cars A and C is available for assignment (make contacts FR26 and/or CFR26 respectively are closed), whereas the relay DHX is picked up provided that at least one of such cars is conditioned for down travel (make contacts X18 and/or CX18 respectively are closed) and that the same car is not assigned to serve a specific down zone (break contacts SH19 and/or CSH19 respectively are closed.)

Similarly, pickup of the low zone demand relay DL and/or the low zone down relay DLX requires that during intense up peak operation no elevator car in the low zone sub-bank (cars B and D) is located at the first floor (break contacts BZ0–29 and DZ0–29 respectively are closed) or is specifically assigned to serve such floor break contacts F0C5 are closed). An energizing circuit is completed for the relay DL if at least one of the cars B and D is available for assignment (make contacts BFR26 and/or DFR26 respectively are closed), while the relay DLX is picked up provided that at least one of such cars is conditioned for down travel (make contacts BX18 and/or DX18 respectively are closed) and that the same car is not assigned to serve a specific down zone (break contacts BSH19 and/or DSH19 respectively are closed.)

OPERATION

During off hours and off peak periods of operation, the present elevator system operates in precisely the same manner with respect to the floors one through six as the system described in the aforesaid Savin et al. application, and such opeartion may be fully understod by reference to such application. For this reason, the present discussion of the operation of the system will be directed primarily to the modifications introduced by the components discussed hereinabove in FIGS. 1 through 14.

It will be assumed initially that the present elevator system comprises four cars, A, B, C and D. It will be understood from the preceding discussion that each car has certain circuits which are specific thereto, as shown principally in FIGS. 1 through 6 for the cars A and B, and that these circuits generally are similar to the respective corresponding circuit for the remaining cars. Where there are differences in such circuits for the various cars it will be understood that the circuits for the cars A and C are identical to each other and that the circuits for the cars B and D are identical to each other. In addition, it will be recalled that FIGS. 7 through 14 generally illustrate circuits which are common to all of the elevator cars. For the purpose of simplification and to conserve space, however, the latter circuits, with a few exceptions, include, where pertinent, components for only the cars A, B, and C. The application of car D components to these circuits, where necessary, will be understood from the foregoing and following discussions.

It also will be assumed that the seven-floor structure served by the present elevator system is a typical office building and that the traffic conditions which are discussed are representative of those which might be encountered during a typical business day. In order to follow a logical sequence of operations, let it be assumed that it is the morning of such a day near the beginning of business hours. Additionally, assume that the direct-current busses L1 (positive) and L2 (negative) are energized, that the elevator cars A and B are located at the first floor (the zone position relay ZO and BZO, FIG. 3, are picked up) and are conditioned for up travel (the up preference relays W and BW, FIG. 1, are picked up) and that the motor-generator sets of all of the elevator cars are running (each of the manually-operable switches MGS, BMGS, FIG. 1, CMGS and DMGS is closed and the motor-generator starting relays 50, B50, C50 and D50 are picked up). Furthermore, assume that the elevator car A has been selected as the next car to leave the first floor (the next car relay N, FIG. 7, is picked up). Consequently, as it is explained in the aforesaid Savino et al. application, the doors of the car A are open, while the doors of the car B are closed (the door-control relay B45, FIG. 4, and the door relay BDS, FIG. 1, are picked up). Moreover, assume that no call for service is registered in the system, that the cars A and B are available for assignment (the available car relays FR and BFR, FIG. 4, and the auxiliary available car relays FRS and BFRS are picked up) and that the manually-operable switch SN (FIG. 14) and/or program clock make contacts PC9 in the energizing circuit of the intense up peak relay NDH are closed.

(A) INTENSE UP PEAK OPERATION

It will be assumed that at this stage a sufficient number of passengers enter the car A to load the car to its rated capacity. In response to such loading, the contacts of the car A load switch LS (FIG. 3) close to energize the load relay LW. Pick up of the relay LW is accompanied by closure of its make contacts LW4 (FIG. 10) to pick up the up by-pass relay 77U. (It is assumed that the non-interference time of the car A has expired and consequently that break contacts 70T5 are closed.)

Pickup of the relay 77U results in closure of its make contacts 77U2 (FIG. 14), thus picking up the intense up peak relay NDH through the closed switch SN and/or the clock contact PC9. Pickup of the relay NDH results, in effect, in the division of the elevator cars into two sub-banks, which provide up service independently of each other. These comprise a high zone sub-bank, the cars A and C, and a low zone sub-bank, the cars B and D. The following discussion will be directed to the operation of the elevator cars under these conditions.

In picking up, the relay NDH closes its make contact NDH18 to establish a self-holding circuit around the contacts 77U2. Closure of make contacts NDH28 prepares the high zone demand relay DH, the high zone down relay DHX, the low zone demand relay DL and the low zone down relay DLX for subsequent energization. (Since the cars A and B are assumed to be located at the first floor, break contacts Z0–29 and BZ0–29 respectively are open to prevent pickup of these relays at this time.)

Turning to FIG. 3, closure of make contacts NDH26 illuminates the sign 57 above the entranceway to the car A at the first floor, indicating to prospective passengers at such floor that the car A will answer car calls registered by such passengers for only floors 4 through 7. It will be understood that a similar sign is provided for the car C. Closure of make contacts NDH27 likewise effects illumination of the sign 59 above the entranceway to the car B at the first floor, signifying to prospective passengers at such floor that the car B will answer car calls registered by such passengers for only floors 2 and 3. It also will be understood that a sign similar to the sign 59 is provided for the car D.

The intense up peak relay NDH also closes its make contacts NDH14 (FIG. 10) to insure that the no demand relay NDR remains energized and picked up continuously as long as the elevator system is conditioned for intense up peak operation. (It will be noted that the relay NDR at this time also is energized through make contacts 77U1, which closed upon the aforesaid pickup of the up by-pass relay, and break contacts PD9.) As a result, break contacts NDR1 and NDR2 (FIG. 4) open to drop out the available car relays FR and BFR for the cars A and B, respectively, since break contacts Z0–1 and BZ0–1 respectively in parallel with these contacts are open, inasmuch as both of the cars A and B are assumed to be located at the lower terminal or first floor. It will be appreciated that similar contacts in the respective circuits of the available car relays for the cars C and D prevent pickup of such relays when the latter cars are located at the first floor. Thus, none of the cars in the elevator system, when positioned at the lower terminal floor, can become available for assignment to serve another floor during intense up peak operation, when traffic will be predominately from the lower terminal floor and it is desirable to maintain as many elevator cars as practicable at such floor. It will be noted that break contacts NDH4 and NDH5 and similar contacts for the cars C and D also are open to prevent pickup therethrough of the respective auxiliary available cars relays FRS, BFRS and the corresponding relays for the cars C and D.

Referring to the next car selection circuits in the upper portion of the left-hand column of FIG. 7, closure of make contacts NDH19 and NDH21 and opening of break contacts NDH20 divides such circuits into two portions, one associated with the cars A and C of the high zone sub-bank and the other associated with the cars B and D of the low zone sub-bank. Thus, recalling that the next car relay N is picked up to indicate that the car A previously had been selected as the next car to leave the first floor, make contacts N18 are closed to establish a holding circuit for the relay N around the switch Y, and break contacts N5 are open to prevent energization therethrough of the electromagnetic clutch 72. However, inasmuch as the car B is located at the first floor, make contacts BZ0–6 and BZ0–30 are closed, and consequently an energizing circuit is completed for the clutch through these contacts and through make contacts NDH21 and break contacts BN5 and DN5. As a result, the cam 73 rotates in a counterclockwise direction until its protuberance 74 engages the operating member of the switch BY, which thus closes to energize the next car relay BN, signifying that the elevator car B has been selected as the next car in the low zone sub-bank to leave the first floor. (Again, since the car B is located at the first floor, make contacts BZ0–7 are closed. It also will be noted that the next car relay N for the car A remains picked up through its holding contacts N18.) In picking up, the relay BN closes its make contact BN18 to establish a holding circuit around the switch BY and opens its break contacts BN5 to deenergize the clutch 72, terminating rotation of the cam 73.

Turning to FIG. 4, the relay BN also opens its break contacts BN2 to deenergize and drop out the door-control relay B45, which consequently closes its break contacts B45–3 to energize the door-open solenoid DO. Such energization is accompanied by the opening of the doors of the car B in a manner which will be clear from the aforesaid Savino et al. application (see FIGS. 15 and 16 herein).

It will be understood that a sequence of operations similar to the foregoing is repeated each time it is necessary to select one of the elevator cars in each of the high and low zone sub-banks as the next car in such sub-bank to leave the lower terminal floor.

Referring now to FIG. 9, the intense up peak relay, in picking up as aforesaid, also closes its make contacts NDH30, NDH32, and NDH34 and opens its break contacts NDH31, NDH33, NDH35 and NDH36 in the respective circuits of the first loading interval relay UHT and the second loading interval relay UT. As a result, these relays now operate independently of each other, the relay UHT controlling the loading interval at the lower terminal floor of each car which is selected as the next car in the high zone sub-bank to leave such floor and the relay UT similarly controlling the loading interval of each low zone sub-bank "next" car, will be understood from the preceding discussion of these relays in FIG. 9.

When the car A was selected as the next car to leave the first floor, as aforesaid, break contacts N12 of its next car relay opened and make contacts N13 thereof closed to initiate a timing operation of the relay UHT. Likewise, when the car B was selected as the next car in the low zone sub-bank to leave the first floor in the manner set forth above, break contacts BN19 of its next car relay opened and make contacts BN20 thereof closed to initiate a timing operation of the relay UT. It will be recalled that each of these relays has a time delay in pick up of fifteen seconds.

Turning next to FIG. 6, it will be noted that the intense up peak relay also opens its break contacts NDH7 and NDH9 and closes its make contacts NDH8 in the circuits associated with the start relay SS for the car A (and similarly for the start relay for the car C) and opens its break contacts NDH10 in the circuits of the start relay BSS for the car B (and likewise for the start relay for the car D). Consequently, during intense up peak operation, the relay UHT controls the loading interval of each first-floor "next" car in the high zone sub-bank, whereas the relay UT controls the loading interval of each first-floor "next" car in the low-zone sub-bank, the interval in each instance being fifteen seconds. Inasmuch as it has been assumed that the car A is loaded to capacity, however, make contacts LW2 of its load relay are closed to shunt the closed make contacts N4 of its next car relay and make contacts UHT5 and NDH8. As a result, the relay SS now is picked up without regard to operation of the contacts UHT9, provided that make contacts 38R5 are closed to indicate that a car call has been registered for the car A by at least one of its passengers for at least one of the floors above the first floor (see the car A car call above relay 38R, FIG. 4). Assuming that such is the case, pickup of the relay SS effects the starting of the car A from the first floor, as explained in the aforesaid Savino et al. application.

By observation of FIG. 3, it will be noted, however, that break contacts NDH2 of the intense up peak relay now are open to prevent energization therethrough of the car A car call stopping relay T. Consequently, the relay T cannot be energized to stop the car A in response to a registered car call therefor unless make contacts HLC1 of the high zone low floor relay in parallel with the contacts NDH2 are closed.

Referring to FIG. 14, it will be observed that the relay HLC cannot pick up to close its contacts HLC1 until the car A reaches the fourth floor and its floor selector carriage brush yy engages the associated contact segment y4, unless the car first stops (break contacts M19 of the car A running relay close) at the second or third floor (the brush yy is in engagement with the contact segment y2 or y3, respectively) to answer a registered up floor car therefor in the manner described in the aforesaid Savino et al. application (see the up floor call circuits of FIG. 2). Once picked up, the relay HLC remains picked up through its holding contacts HLC2 until the car A subsequently becomes conditioned for down travel (break contacts X19 of the car A down preference relay open). The low zone high floor relay BLLC, on the other hand, is energized only when the car B floor selector carriage is in its third-floor position and the brush Byy is in engagement with the associated contact segment By3.

Returning to the car call circuits of FIG. 3, it will be understood from the foregoing discussion that during intense up peak periods the car A is conditioned to transport passengers from the first floor to only the floors in the high zone (fourth floor and above) by virtue of operation of break contacts NDH2 and make contacts HLC1 in parallel therewith (and similarly for the car C). If, however, the car A stops in response to a registered up floor call for a floor in the low zone, the contacts HLC1 close for permitting the car also to answer a car call for any floor thereabove in the low zone which presumably is registered by the passenger who previously registered the aforesaid up floor call. (It will be observed that in the present embodiment of the invention, such operation is meaningful only if the car A stops to answer a registered up floor call for the second floor and if a passenger who enters the car at such floor registers a car call for the third floor, since the low zone herein comprises only the second and third floors. Moreover, it should be noted that during intense up peak periods of operation, relatively little or no up traffic is to be expected from floors above the first floor.)

Furthermore, it will be understood that during an intense up peak period the car B is conditioned to transport passengers from the first floor to only the floors in the low zone by reason of operation of break contacts NDH22, which are open throughout such period, break contacts BLLC1 and make contacts BX20 of the car B down preference relay, which are closed only when the car is conditioned for down travel (and similarly for the car D). More particularly, if the car B during an up trip from the first floor (the contacts BX20 are open) is required to answer a registered car call for the third floor (the highest floor herein of the low zone), the contacts BLLC1 open as the car approaches such floor to cancel any car call which may have been registered mistakenly by a passenger in the car for a floor above the third floor. (It will be recalled that the sign 59 in the lower part of the right-hand column of FIG. 3 is illuminated to indicate to prospective car B passengers at the first floor that this car provides service from the first floor to only the second and third floors.)

The aforesaid pickup of the intense up peak relay also results in opening of its break contacts NDH1 (FIG. 2) in the up floor call circuit associated with the floor call stopping relay BS for the car B (and similarly for the car D). Consequently, none of the low zone sub-bank cars is capable of answering any registered up floor call during intense up peak periods. It will be observed, however, that corresponding contacts are not associated with the floor car stopping relay S for the car A (and likewise for the car C). Thus, each of the high zone subbank cars during each of its up trips from the lower terminal floor remains conditioned to answer up floor calls which may be registered when the elevator system is conditioned for intense up peak operation, provided that the car is not loaded to capacity, (i.e.) provided that break contacts LW1 of the car A load relay and similar contacts for the car C are closed.

It will be noted that the intense up peak relay additionally closes its make contacts NDH3 (FIG. 3) to maintain the up call above relay B78U continuously picked up during intense up peak operation, regardless of whether or not an up floor call is registered for a floor above the position of the car B. As a result, make contacts B78U3 (FIG. 4) remain closed. Thus, the available car relay BFR picks up to indicate that the car B is available for assignment as soon as the car answers its last car call (break contacts B38R2 close) in the low zone (second and third floors) on each up trip (make contacts BW7 are closed) from the first floor and its doors close (the switch B27 closes), as will be understood from the aforesaid Savino et al. application (and similarly for the car D). Inasmuch as the up call above relay 78U (FIG. 3) for the car A is not picked up in a like manner, however, the available car relay FR (FIG. 4) cannot be energized to indicate that the car A is available for assignment both until break contacts 38R2 close to signify that such car has answered its last car call and until make contacts 78U3 close to indicate that no up floor car is registered for a floor above the position of the car (and likewise for the car C).

Let it now be assumed that the car A has completed an up trip in the high zone, that the car B has answered its last car call in the low zone and consequently that the available car relays FR and BFR respectively are picked up to indicate that each of these cars is available for assignment. Under normal conditions, each of the cars in general would remain at the floor at which it last stopped until it is assigned to answer an up or a down zone demand for service, as is fully explained in the aforesaid Savino et al. application. It will be observed, however, that during intense up peak operation, break contacts NDH15 (FIG. 10) are open to prevent pickup of the up zone demand relay DU. Thus, no car may be assigned to answer an up floor car which may have been registered for a floor below the position of the car A as it proceeded upwardly from the first floor or above the position of the car after it became available for assignment, such call being answered by the next high zone sub-bank car to leave the first floor which is not loaded to capacity, as pointed out above.

Assume additionally that the down zone demand relay ZD (FIG. 9) is dropped out to indicate that there is no down zone demand for service. As a result, break contacts ZD8 (FIG. 7) are closed, and thus the no scan relay RNS is energized through these contacts and make contacts NDH13 of the intense up peak relay. Pickup of the relay RNS is accompanied by closure of its make contacts RNS1 and RNS2 (FIG. 4) to energize the respective down call assigned relays FA and BFA for the cars A and B. In picking up, these relays close their respective make contacts FA4 and BFA4 to pick up the high call reversal relays 69H and B69H through closed make contacts DCA1 and BDCA1. (It will be observed that since it is assumed that no down floor call is registered, the down call above relays DCA and BDCA, FIG. 5, both are picked up.) Consequently, the cars A and B reverse the direction of travel for which they are conditioned from up to down and automatically run to the first or lower terminal floor, as will be clear from the aforesaid Savino et al. application.

Let it now be assumed, however, that when the car A becomes available for assignment as aforesaid (the available car relay FR, FIG. 4, picks up), the down zone demand relay ZD (FIG. 9) is picked up to indicate the existence of at least one down zone demand for service. Normally, the car A under such conditions would be assigned to respond to such service demand in the manner discussed in the Savino et al. application. But assume also that at this time the elevator car C is absent from the first floor, has not been assigned specifically to serve such floor, and is not available for assignment. Referring to FIG. 14, it will be observed that this combination of circumstances results in energization and pickup of the high zone demand relay DH through make contacts NDH28 of the intense up peak relay, through break contacts Z0–29 and CZ0–29 of the respective first-floor zone position relays for the cars A and C, through break contacts F0H1 of the first-floor high zone sub-bank assigned zone relay and through make contacts FR26 of the car A available car relay. Such pickup is accompanied by opening of break contacts DH1 (FIG. 4) to prevent energization therethrough of the car A auxiliary available car relay FRS, closure of make contacts DH2 (FIG. 5) to pick up the car A down call above relay DCA, regardless of the location of the car A with respect to the floor for which the down floor call is registered which resulted in the aforesaid pickup of the relay ZD, and in opening of break contacts DH3 (FIG. 8) to prevent pickup of the master down call above relay MCA.

Turning to FIG. 7, it will be apparent as a result that the no scan relay RNS now is energized and picked up through make contacts ZD2 and break contacts MCA1 and FZM3, inasmuch as break contacts ZD8 are open. Once again, pickup of the relay RNS effects the reversal of the direction of travel for which the car A is conditioned from up to down (the up preference relay W, FIG. 1, drops out and the down preference relay X picks up) and initiates movement of the car toward the first floor.

Upon opening of make contacts W7 (FIG. 4) of the car A up preference relay, the available car relay FR is deenergized, and dropout of this relay is accompanied by opening of its make contacts FR26 (FIG. 14) to drop out the high zone demand relay DH. However, make contacts X18 of the car A down preference relay close to energize and pick up the high zone down relay DHX through break contacts of the car A down zone assigned relay. Such pickup results in closure of make contacts DX3 (FIG. 11) to energize the closest car relay 69P through make contacts NDH11 of the intense up peak relay. (Note that break contacts NDH17 are open during intense up peak operation to prevent energization therethrough of the relay 69P.)

Pickup of the relay 69P is accompanied by closure of its make contacts 69P2 (FIG. 4) to energize and pick up the car A auxiliary available car relay FRS through now closed make contacts DHX2 and X12 and through break contacts SH11 and FU12. Pickup of the relay 69P also results in selection of the car A for express travel to the lower terminal floor by operation of the stepping switch circuits of FIG. 12 and of the car A assigned zone stepping switch KA (FIG. 5), as explained in detail in the aforesaid Savino et al. application. (Normally, when a car is selected in this manner by operation of the relay 69P, the car on its way down by-passes each floor for which a down floor call may be registered except, in general, when such a call is a priority or timed out call which another car has not been assigned to answer. This is accomplished by operation of the priority zone stopping relay TDC, FIG. 11, for the car A, for example. But during intense up peak operation, make contacts NDH14, FIG. 10, are closed to maintain continuous pickup of the no demand return relay NDR, as aforesaid, and make contacts NDH24 and NDH25, FIG. 9, are closed to maintain the absence timing relay LNT continuously picked up. As a result, parallel break contacts NDR9, and LNT3, FIG. 11, both are open to prevent pickup of the relay TDC during intense up peak operation, and the car A consequently cannot stop to answer any down floor call on its trip to the first floor.)

Turning to FIG. 5, it will be understood that the brushes of the car A assigned zone stepping switch KA are in their first position as a result of the foregoing sequence of operations. Such operation is accompanied by pickup through the level KAc of the down zone assigned relay SH, which closes its make contacts SH5 to pick up the assigned zone relay F0H through break contacts PM1, the level KAd and make contacts NDH6 of the intense up peak relay. It will be observed that the assigned zone relay F0C cannot pick up through the level KAd, since break contacts NDH23 are open. Pickup of the relay SH also is accompanied by opening of its break contacts SH19 (FIG. 14), while pickup of the relay F0H effects opening of its break contacts F0H1 to drop out the high zone down relay DHX (and the high zone demand relay DH should the car C in the meantime have become available for assignment, as a result of which make contacts CFR26 of its available car relay would be closed). In dropping out, the relay DHX opens its make contacts DHX3 (FIG. 11) to drop out the closest car relay 69P. The resetting of the stepping switch KA (FIG. 5) and of the stepping switches of FIG. 12 to their respective homing positions will be understood by reference to the aforesaid Savino et al. application.

Although the immediately preceding discussion is directed to operation of the high zone sub-bank cars during intense up peak operation, and more particularly to the elevator car A, it will be observed by inspection that the control system operates the cars B and 4 of the low zone sub-bank in substantially the same manner under like conditions. For the cars B and D however, the low zone demand relay DL and the low zone down relay DLX of FIG. 14 and the assigned zone relay F0C of FIG. 5 respectively replace the similar relays DH, DHX and F0H associated with the high zone sub-bank.

Inasmuch as in the illustrated embodiment of the invention each of the high and low zone sub-banks during intense up peak operation comprises only two elevator cars, when both cars in one of the sub-banks are absent from the lower terminal floor the relay 69P effects the selection of the first of such cars which becomes conditioned for down travel for express travel to such floor. It should be noted, however, that in an elevator system in which at least one of the sub-banks comprises three or more cars, it would be possible for two (or more, as the case may be) f such cars to be conditioned for down travel before all of the cars in the sub-bank become absent from the first floor. It will be appreciated that under such conditions, pickup of the closest car relay 69P would result, by operation of the stepping switch circuits of FIG. 12, in the selection for express travel to the first floor of the *lowest* unassigned one of the cars conditioned for down travel in the sub-bank. Such operation will be fully understood by reference to the aforesaid Savino et al. application and from the preceding discussion.

Let it now be assumed that the switch SN and the program clock contacts PC9 (FIG. 14) are in their respective open conditions to drop out the intense up peak relay NDH, thus terminating intense up peak operation of the elevator system. From this point on, it will be assumed that there are only three cars, A, B and C, in the elevator system, inasmuch as the operations of the system to be described hereinafter may be discussed adequately with reference to such a system.

(B) EXTENSION FLOOR SERVICE

It will be assumed that at this time a prospective passenger at the lower terminal or first floor desires elevator transportation to the seventh or top extensin floor. It will be recalled that in the present system only the cars A and C are assumed to be capable of serving such floor. Suitable signs may be located adjacent the respective entranceways of the cars at the first floor indicating that the cars A and C serve the seventh floor and that the car B does not.

If one of the cars A and C has been selected as the next car to leave the first floor, its doors are open and the aforesaid passenger may enter such car and register a car call therein for the seventh floor, as a result of which the control system will cause the car to transport the passenger to such floor in the same manner as it operates the car to answer a car call for any other floor. Such operation is described in detail in the aforesaid Savino et al. application.

Let it be assumed, however, that the cars A and B are loacted at the first floor (the zone position relays Z0 and BZ0, FIG. 3, are picked up), the car B having been selected as the next car to leave such floor (the next car relay BN, FIG. 7, is picked up, while the car A next car relay N is dropped out) and the car A being available for assignment (the available car relay FR and the auxiliary available car relay FRS, FIG. 4, are picked up). Consequently, the doors of the car B are open, but the doors of the car A are closed (the door-control relay 45, FIG. 4, is picked up). Since no car capable of serving the seventh floor is located at the first floor with its doors open, the above-mentioned passenger presses the push button 1E (FIG. 13), completing the following energizing circuit for the lower terminal extension demand relay KR:

L1, 1E, Z0–25, Z0–27, FR23, 45–4, CZ0–26, KR, L2

In picking up, the relay KR closes its make contacts KR6 to establish a holding circuit around the push button 1E, and the relay thus remains picked up when the prospective passenger releases the push button. The relay KR also closes its make contacts KR7 to pick up the extension car scanning relay TES through make contacts FR24 of the car A available car relay. In addition, the relay KR closes its make contacts KR3 (FIG. 4) to prepare the auxiliary door-control relay 42 for subsequent energization and its make contacts KR5 (FIG. 6) to prepare the up call assigned relay FU for subsequent energization.

Pickup of the relay TES is accompanied by opening of its break contacts TES5 (FIG. 9) to prevent energization of the down zone demand relay ZD and by opening of its break contacts TES6 (FIG. 10) to prevent energization of the low up zone demand relay DUL and the high up zone demand relay DUH and thus of the up zone demand relay DU. (Consequently, it will be apparent that the demand for seventh-floor service is given priority over all other service demands.) The relay TES additionally closes its make contacts TES7 (FIG. 11) to energize the multiple available car relay MFC, which picks up to open its break contacts MFC5 (FIG. 6) and to close its make contacts MFC15, thereby preparing the up call assigned relay FU for subsequent energization therethrough and through now closed make contacts TES4. Furthermore, the relay TES closes its make contacts TES8 (FIG. 11) to energize and pick up through break contacts RD1 the closest car relay 69P, which thus opens its break contacts 69P1 (FIG. 4), but the auxiliary available car relay FRS is maintained energized and picked up through make contacts 69P2, TES1 and FR21 and break contacts DHX1 and NDH14.

Pickup of the relay 69P also results in operation of the low zone stepping switch FSL (FIG. 12), as will be understood from the aforesaid Savino et al. application. When the brushes of this stepping switch reach their fourth position, the stepping switch coil is energized continuously through the level FSLc and through make contacts 69P28, break contacts N10 of the car A next car relay, make contacts Z0–17 of the car A first-floor zone position relay and make contacts FRS3 of the auxiliary available car relay for the car A. Consequently, the stepping operation of the brushes is terminated, and the car A demand response relay FCR is energized and picked up through the level FSLa and through make contacts 69P24 and FRS2. Such pickup is accompanied by closure of make contacts FCR3 (FIG. 6) to energize the up call assigned relay FU, as will be clear from the preceding discussion. In picking up, the relay FU closes its make contacts FU8 to establish a self-holding circuit through break contacts 80–2 and closes its make contacts FU19 (FIG. 4) to pick up the auxiliary door-control relay 42 through make contacts FR6, KR3 and Z0–22. Pickup of the relay 42 is accompanied by opening of its break contacts 42–3 to drop out the car A door-control relay 45. Such dropout results in opening of make contacts 45–2 to deenergize the door-close solenoid DC and in closure of break contacts 45–3 to energize the door-open solenoid D0. It will be understood that this results in the opening of the doors of the car A at the first floor.

The relay 42 additionally closes its make contacts 42–1 (FIG. 1) to pick up the car. A non-interference relay 70T, while the relay 45 opens its make contacts 45–4 (FIG. 13) to deenergize and drop out the lower terminal extension demand relay KR, which, in turn, opens its make contacts KR3 (FIG. 4) to drop out the relay 42. Although the relay 42 thus closes its break contacts 42–3, the relay 45 remains dropped out, since break contacts 70T2 now are open. The relay 42 also opens its make contacts 42–1 (FIG. 1) to initiate a timing-out operation of the non-interference relay 70T.

Inasmuch as the doors of the car A are open, the prospective passenger at the first floor who pressed the push button 1E (FIG. 13) to initiate the foregoing sequence of operations may enter the car A and may register a car call for the seventh floor by pressing the push button 7c (FIG. 3), thus picking up the car call registering relay 7CR. This relay closes its make contacts 7CR2 (FIG. 4) to pick up the car call above relay 38R through the cam-operated switch m7. Consequently, upon expiration of the car A non-interference time, break contacts 70T3 (FIG. 6) close to energize the start relay SS through break contacts N17 and make contacts 7CR3, 38R5 and Z0–5. Pickup of the relay SS results in the starting of the car A from the first floor to answer its car call for the seventh floor, as will be apparent by inspection of the drawings and from the aforesaid Savino et al. application.

Returning to the lower terminal extension demand relay KR in FIG. 13, it will be noted that if neither of the extension floor cars A and C is located at the first floor (break contacts Z0–24 and CZ0–24 of the respective lower terminal floor zone position relays for the cars A and C are closed), an energizing circuit for the relay KR may be completed by actuation of the push button 1E unless at least one of such cars is conditioned to provide down service, in which event the car soon will arrive at the lower terminal floor and then will be conditioned to accept passengers for the seventh floor. If, for example, the car A is not located at the first floor, but the car C is conditioned for down travel, break contacts CX17 of the car C down preference relay are open to prevent pickup of the relay KR, unless make contacts CFU17 of the car C up call assigned relay are closed to indicate that the car is assigned to answer an up floor call below.

Assume now that the cars A and C both are available for assignment (the available car relays FR, FIG. 4, CFR and the auxiliary available car relays FRS and CFRS are picked up) at different floors above the lower terminal floor (the zone position relays Z0, FIG. 3, and CZ0 are dropped out) and that a prospective passenger at the first floor presses the push button 1E (FIG. 13), thereby energizing the relay KR through break contacts X17, CX17, Z0–24 and CZ0–24. Pickup of the relay KR again is accompanied by closure of its make contacts KR6 to establish a self-holding circuit around the push button 1E and by closure of its make contacts KR7 to pick up the extension car scanning relay TES through parallel make contacts FR24 and CFR24. Turning to FIG. 9, it will be observed that once again break contacts TES5 are open to prevent energization of the down zone demand relay ZD, while in FIG. 10, break contacts TES6 are open to prevent energization of the low up zone demand relay DUL and the high up zone demand relay DUH and thus of the up zone demand relay DU. Additionally, make contacts TES7 (FIG. 11) are closed to pick up the multiple available car relay MFC through break contacts ZD9 and DU8, and make contacts TES8 are closed to pick up the closest car relay 69P through break contacts RD1. Referring to FIG. 4, pickup of the relay 69P is accompanied by opening of its break contacts 69P1, but the auxiliary available car relay FRS is maintained energized through make contacts 69P2, TES1 and FR21 and break contacts DHX1 and NDH4, and similarly for the car C auxiliary available car relay. It will be noted that energization of the auxiliary available car relay BFRS for the car B, which is incapabe of serving the seventh floor, is prevented by opening break contacts TES3.

It will be apparent from the preceding discussion that the following contacts are closed in the circuit of the car A down call assigned relay FA: make contacts FR5, MFC14, TES2, KR2 and H2 and break contacts Z0–21, 6UR3 and 38R3, while break contacts MFC1 and make contacts FCR1 are open (and similarly for the car C down call assigned relay).

Returning to the closest car 69P, it will be understood from the aforesaid Savino et al. application that pickup thereof results in operation of the stepping switch circuits of FIG. 12 to select, for travel to the first floor, the closest extension floor elevator car thereto which is available for assignment. Assuming that such car is the car A, the stepping switch circuits will operate to energize the car A demand response relay FCR. In picking up, the relay FCR closes its make contacts FCR4 and FCR5 (FIG. 5) respectively in series with now closed make contacts 69P6 and 69P7 of the closest car relay. As will be clear from the aforesaid Savino et al. application, the brushes of the car A assigned zone stepping switch KA thus step to their first position, wherein they cease stepping, inasmuch as make contacts 69P9 associated with the level KAc also are closed. Such operation indicates that the car A specifically is assigned to serve the lower terminal or first floor and results in pickup of the car A down zone assigned relay SH and of its down call above relay DCA (although the latter relay already may have been picked up if no down floor call previously was registered for a floor above the position of the car A).

Pickup of the relay FCR also results in closure of its make contacts FCR1 (FIG. 4) to energize and pick up the car A down call assigned relay FA, as will be understood from the preceding discussion, and this relay closes its make contacts FA4 to pick up the high call reversal relay 69H through make contacts DCA1. As is explained in the aforesaid Savino et al. application, pickup of the relay 69H results in reversal of the direction of travel for which the car A is conditioned from up to down, and the car runs to the first floor, where its doors open so that it may receive the passengers who previously pressed the push button 1E (FIG. 13), thereby indicating his desire to be transported to the seventh floor.

The following examples are illustrative of operation of the elevator system in response to the registration of an up floor call for the sixth floor (the up floor call registering relay 6UR, FIG. 2, is picked up) and/or a down floor call for the seventh floor (the down floor call registering relay 7DR is picked up), as the case may be. Inasmuch as certain details of operation will be understood from the foregoing discussion of the individual drawings herein, from the preceding description of system operation and from the aforesaid Savino et al. application, the present discussion will be presented more or less in summary form.

Let it first be assumed that a down floor call is registered for the seventh floor, that the car C is available for assignment at the first floor and that the car A is located at a floor above the first floor but below the seventh floor and also is available for assignment. Under these conditions, make contacts 7DR7 (FIG. 13) are closed to pick up the extension floor demand relay RD through break contacts TEU1. Such pickup is accompanied by closure of make contacts RD3 to energize the extension car scanning relay TES through parallel make contacts FR24 and CFR24. Pickup of the relay TES results in opening of its break contacts TES5 (FIG. 9) to prevent energization of the down zone demand relay ZD and in opening of its break contacts TES6 (FIG. 10) to prevent energization of the low up zone demand relay DUL and the high up zone demand relay DUH and thus of the up zone demand relay DU, indicating that the demand for extension floor service takes priority over all other service demands. Closure of make contacts TES7 (FIG. 11) thus effects pickup of the multiple available car relay MFC, while break contacts RD1 are open to prevent pickup of the closest car relay 69P despite closure of make contacts TES8; and parallel break contacts TES9 and RD2 both are open to prevent energization of the high zone demand relay KBH.

Turning to FIG. 12, it will be observed from the foregoing operations that break contacts KBH1, 69P18, and 69P19 and make contacts MFC8, MFC10 and TES10 all are closed. Consequently, the high zone stepping switch FSH first scans for the highest available extension floor car in the high zone (fourth, fifth and sixth floors), and, if no such car is located in the high zone, the low zone stepping switch FSL then scans for the highest available extension floor car in the low zone (first, second and third floors). It will be understood that whether or not the stepping switch FSL is required to scan in this instance depends upon the location of the elevator car A, which, it will be recalled, is assumed to be available for assignment at a floor above the first floor, the car C being assumed to be available for assignment at the first floor. In any event, the car A, which is the highest available extension floor car, will be selected to answer the down floor call which is assumed to be registered for the seventh floor, as indicated by energization of the demand response relay FCR for the car A., Pickup of the relay FCR is accompanied by closure of its make contacts FCR1 (FIG. 4) to establish the following energizing circuit for the car A down call assigned relay FA:

L1, FR5, MFC14, TES2, KR1 and Z0–21, 7DR4, 6UR3, FCR1, H2, 38R3, FA, L2

Pickup on the relay FA effects movement of the car A to the seventh floor to answer the registered down floor call therefor.

Assume in the preceding example that not only is a down floor call registered for the seventh floor but also an up floor call is registered for the sixth floor (the down floor call registering relay 7DR and the up floor call registering relay 6UR, FIG. 2, both are picked up). In such instance, the sequence of operations is the same as that set forth above, except that upon pickup of the car A demand response relay FCR (FIG. 12) to close its make contacts FCR1 (FIG. 4), the open break contacts 6UR3 prevent pickup of the down call assigned relay FA. On the other hand, closure of make contacts FCR3 (FIG. 6) results in pickup of the up call assigned relay FU through make contacts FR11, MFC15, TES4 and 6UR4 and break contacts ZR3. Consequently, the car A first will answer the up floor call for the sixth floor before proceeding to answer the down floor call for the seventh floor. (It is assumed that the passenger who registered the up floor call for the sixth floor and who enters the car A when it answers such call, will register a car call for the seventh floor by actuating the car call push button 7c, FIG. 3, to pick up the car call registering relay 7CR. In any case, break contacts 7DR2 are open to prevent pickup of the up call above relay 78U, and make contacts 78U3, FIG. 4, in the energizing circuit of the car A available car relay FR thus are open to prevent the car A from becoming available for assignment at the sixth floor. Consequently, upon expiration of the car A non-interference time at the sixth floor, break contacts 70T1 close to pick up the second auxiliary running relay 80 through break contacts 981–1, FR4 and FA5, as a result of which the car A travels from the sixth to the seventh floor, thereby answering the down floor call for the latter floor.)

Assume once again that the up floor call registering relay 6UR (FIG. 2) is picked up to indicate the registration of an up floor call for the sixth floor. Assume also that the down floor call registering relay 7DR is picked up to signify that a down floor call is registered for the seventh floor and/or that the lower terminal extension demand relay KR (FIG. 13) is picked up to indicate that there is a demand for service from the first to the seventh floor, as aforesaid. It also will be assumed that the car A now is available for assignment at the seventh floor and that consequently the seventh-floor zone position relay ZR (FIG. 3) and the zone position relay Z3 both are picked up. Again, the car A will be selected to provide extension floor service by the sequence of operations discussed above. Note that now, however, upon pickup of the car A demand response relay FCR (FIG. 12), the up call assigned relay FU (FIG. 6) cannot pick up, inasmuch as break contacts ZR3 and 7DRD6 and/or KR4 are open. On the other hand, make contacts ZR2 (FIG. 4) now are closed to shun t the open break contacts 6UR3, as are make contacts 7DR4 and/or KR2, thus picking up the down call assigned relay FA. As a result, make contacts FA15 close to energize and pick up the auxiliary door control relay 42 through make contacts ZR4, 7DR8 and FR6. It will be understood from the preceding discussion that such pickup effects opening of the doors of the car A at the seventh floor, permitting entry thereinto of the passenger who registered the down floor call for such floor.

Upon expiration of its non-interference time, the car A leaves the seventh floor in the down direction to answer the car call which the aforesaid passenger registers, and, unless such car call is for the sixth floor, the car bypasses the latter floor, since no energizing circuit is completed for the floor call stopping relay S (FIG. 2) as a result of the registration of the aforesaid up floor call for such floor. When the car A reaches the first floor, it is conditioned to respond to the demand for service therefrom to the seventh floor, if such a demand is registered, and on its way to the latter floor it will answer the up floor call for the sixth floor, provided, of course, that the other extension floor car, the car C, previously had not been conditioned to provide such service.

From the preceding discussion and by inspection of the drawings, it will be observed that if an extension floor elevator car becomes available for assignment, it may be selected to answer an extension floor service demand in accordance with its location. Thus, if an extension floor car is available for assignment at the first floor, it will be selected to answer a demand for service from the first to the seventh floor, but if there is no such demand, then an up floor call for the sixth floor, and if none, a down floor call for the seventh floor; if an extension floor car is available for assignment at a floor intermediate the first and seventh floors, it will be selected to answer an up floor call for the sixth floor, but if there is no such call then a down floor call for the seventh floor, and if none, a demand for service from the first to the seventh floor; and, finally, if an extnesion floor car is available for assignment at the seventh floor, it wil be selected to answer a down floor call for the seventh floor, but if there is no such call then a demand for service from the first to the seventh floor, and if none then an up floor call for the sixth floor.

Again let it be assumed that the up floor call registering relay 6UR (FIG. 2) and the down floor call registering relay 7DR are picked up to indicate the registration of an up floor call for the sixth floor and a down floor call for the seventh floor, respectively. Also assume that at least one of the extension floor cars A and C is conditioned to provide up service. As will be understood from the preceding discussion of FIG. 13, such conditioning results in pickup of the extension car up relay TEU, signifying that at least one of the extension floor cars is conditioned to answer without undue delay the aforesaid calls. Thus, break contacts TEU1 are open to prevent pickup of the extension floor demand relay RD, and make contacts RD3, therefore, are open to prevent energization therethrough of the extension car scanning relay TES. Consequently, there is no demand for an available extension floor car, if in fact one of such cars is available for assignment, since the extension floor car which is assumed to be conditioned to provide up service will answer the aforesaid calls. (Assuming that the car A is so conditioned, it will be observed by inspection of FIG. 3 that break contacts 6UR2 in the car A up floor call above circuit 25 remain open until the up floor call for the sixth floor is answered, and break contacts 7DR2 remain open until the down floor call for the seventh floor is answered. As a result, the up call above relay 78U cannot pick up until the car A answers the down floor call for the seventh floor. As pointed out above, this insures that make contacts 78U3 in the energizing circuit of the car A available car relay FR, FIG. 4, remain open to prevent the car A from becoming available for assignment prematurely, and the car thus continues traveling up until it reaches the seventh floor.)

(C) CONVENTION FLOOR SERVICE

It will be recalled that the fifth floor in the present up elevator system is assumed to be a convention floor and that under certain conditions, special service may be provided for such floor. Let it now be assumed that the manually-operable switch KFS (FIG. 13) is closed to permit energization of the master convention floor loading relay MKF. Turning to FIG. 3, also assume that the elevator car A is stopped at the fifth floor (the brush $jj$ is in engagement with the contact segment $j5$), that its non-interference time has expired (break contacts 70T6 are closed) and that it is conditioned for down travel (make contacts X15 are closed). As a result, the convention floor zone position relay ZC is energized and picked up.

Assume in addition that a convention session has just terminated and that, therefore, the car A has been loaded to capacity at the fifth floor. Consequently, its load switch LS closes to pick up the load relay LW. Closure of make contacts LW5 (FIG. 10) effects pickup of the down bypass relay 77D through make contacts X11 of the car A down preference relay, and the relay 77D thus closes its make contacts 77D1 to energize the instant dispatch relay PD. By reference to the aforesaid Savino et al. application, it will be understood that pickup of the relay PD conditions the elevator system for instant dispatch operation, during which successive "next" elevator cars are conditioned to be dispatched from the lower terminal or first floor in rapid succession to answer car calls and floor calls.

The car A load relay also closes its make contacts LW6 (FIG. 13) to energize the car A convention floor loading relay KF through now closed make contacts ZC1, and this relay picks up to close its make contacts KF1, thus establishing a self-holding circuit around the contacts ZC1 and LW6 through break contacts KFT1. In addition, break contacts KF2 open and make contacts KF3 close to initiate a timing operation of the convention floor timing relay KFT for the car A. It will be recalled that the relay KFT is assumed to have a time delay in pickup of ten seconds. Make contacts KF4 close to pick up the master convention floor loading relay MKF through the now closed switch KFS.

Referring to FIG. 8, it will be observed that the relay MKF, in picking up, closes its make contacts MKF2 to prepare the down zone timing relay K2T for subsequent energization therethrough.

Assume that at this stage the elevator car A leaves the fifth floor and that consequently the zone position relay ZC (FIG. 3) is deenergized as a result of disengagement of the brush jj from the contact segment j5. Dropout of the relay ZC is accompanied by opening of make contacts ZC1 (FIG. 13), but the car A convention floor loading relay KF nevertheless remains picked up through its aforesaid holding circuit, and thus the timing operation of the convention floor timing relay KFT continues and the master convention floor loading relay MKF remains picked up through make contacts KF4.

Let it be assumed that after the car A departs the fifth floor, a prospective passenger thereat presses the push button 5D (FIG. 2) to pick up the down floor call registering relay 5DR, thus registering a down floor call for the fifth floor. Closure of make contacts 5DR4 (FIG. 8) results in pickup of the down zone demand registering relay K2 through break contacts P5–8. Such pickup is accompanied by closure of make contacts K2–3, which are associated with the down zone timing relay K2T. Normally, the relay K2T has a time delay in pickup of forty seconds. Under the assumed conditions, however, closure of the contacts K2–3 results in immediate pickup of the relay K2T through break contacts F2C5 and through make contacts MKF2 and 5DR5, the latter of which closed upon the aforesaid registration of the down floor call for the fifth floor. Thus, the registration of such call has resulted in the establishment of an artificial timed-out or priority demand for down service for the second down zone (fourth and fifth floors).

As is explained in the aforesaid Savino et al. application, pickup of the relay K2T results in the provision of preferential or priority elevator service for the second down zone (in this instance, for the fifth floor), i.e., the first available elevator car located at any other floor, or the nearest available car to the fifth floor if there is more than one such car, is assigned to serve such floor regardless of the existence of other demands for service, and the selected car proceeds directly thereto without answering on its way any floor call which may be registered for another floor. Thus, as long as an elevator car leaves the convention floor loaded to capacity in the down direction and for at least a predetermined time thereafter (ten seconds in the present embodiment, as determined by the time delay in pickup of the convention floor timing relay KFT, FIG. 13), successive available elevator cars are dispatched directly to such floor upon the registration of a down floor call therefor. If desired, the manually-operable switch KS (FIG. 2) may be closed for re-registering automatically a down floor call for the fifth floor, upon departure of each elevator car from such floor in the down direction, as long as make contacts MKF1 remain closed. Such operation further increases the frequency with which available cars are dispatched directly to the convention floor. It will be appreciated that the provision of convention floor special service substantially expedites traffic flow from such floor under the stated conditions.

Assume now that down traffic at the fifth floor has diminished to the extent that no fully loaded elevator car leaves such floor in the down direction within a ten-second interval of time. For example, assume that the car A was the last fully loaded car to depart the fifth floor in the down direction. At the expiration of ten seconds from such departure, the capacitor C14 (FIG. 13) has charged sufficiently to fire the tube TU16, and the car A convention floor timing relay KFT thus picks up through the tube and through make contacts KF3. Such pickup is accompanied by closure of make contacts KFT2 to establish a holding circuit around the tube, and since these contacts shunt the plate and cathode electrodes of the tube, the discharge therebetween is terminated. In addition, break contacts KFT1 open to interrupt the holding circuit of the convention floor loading relay KF, which consequently drops out to open its holding contacts KF1, to close its break contacts KF2 for discharging the capacitor C14 through the resistor R61, to open its make contacts KF3 to drop out the relay KFT and to open its make contacts KF4 for dropping out the master convention floor loading relay MKF, thereby terminating special elevator service for the fifth or convention floor.

(D) DOWN PEAK OPERATION

Next, let it be assumed that the switch KFS is operated to its open condition to prevent pickup of the relay MKF. Assume also that the down floor call registering relay 4DR (FIG. 2) is picked up to indicate the registration of a down floor call for the fourth floor, that one of the elevator cars in the system, for example the car A, during a down peak traffic condition becomes loaded to capacity at the fifth floor when conditioned for down travel and that the manually-operable switch SBP (FIG. 9) associated with the passing relays 5BP and 3BP has been placed in its closed condition. Under these conditions, the relay 5BP picks up through make contacts 4DR5, the car A floor selector contact segment w5 and its associated brush ww, break contacts M20 of the car A running relay, which is dropped out when the car is stopped, make contacts LW8 of the car A load relay, make contacts X21 of the car A down preference relay and the switch SBP. Such pickup is accompanied by closure of make contacts 5BP4 to establish a self-holding circuit for the relay 5BP through make contacts 4DR5 and the switch SBP. Consequently, when the car A departs the fifth floor, the relay 5BP is maintained picked up through its holding circuit.

It will be understood from the aforesaid Savino et al. application that the car A, as it travels down from the fifth floor, cannot stop at the fourth floor to answer the registered down floor call therefor, that is, it by-passes the fourth floor, inasmuch as it was loaded to capacity at the fifth floor.

Pickup of the relay 5BP also is accompanied by opening of its break contacts 5BP1 (FIG. 2) to render the contact segments d5, Bd, and the similar contact segment for the car C inoperative for stopping the respective associated cars at the fifth floor should a down floor call subsequently be registered therefor. Furthermore, make contacts 5BP2 (FIG. 5), 5BP3 and similar contacts for the car C in the respective down floor call above circuits 32, B32 and and C32 close to shunt break contacts 5DR2, 5DR3 and similar contacts for the car C.

From the preceding discussion, it will be understood that the next elevator car which serves the second down zone is conditioned to ignore a down floor call that may be registered for the fifth or upper floor of such zone and to stop for passengers at only the fourth or lower floor of the zone in response to the down floor call which is registered therefor, i.e., such car, whether approaching the zone in the up or the down direction of travel, cannot "see" a down floor call which may be registered for the fifth floor and may stop at only the fourth floor. Such stopping effects dropout of the down floor call registering relay 4DR (FIG. 2) to cancel the down floor call for the fourth floor, and the resulting opening of make contacts 4DR5 (FIG. 9) interrupts the holding circuit of the passing relay 5BP, thereby dropping out such relay. Consequently, the fifth or upper floor of the second down zone once again may receive down service.

It will be understood that the foregoing sequence of operations is repeated as often as the conditions occur which initiated such sequence. It also will be observed by inspection of the drawings and from the preceding discussion that the passing relay 3BP is effective for producing under similar conditions a like sequence of operations with respect to the first down zone, which comprises the second and third floors. Thus, the relays 5BP and 3BP under a down peak traffic condition provide means for furnishing substantially uniform elevator service for each of the floors of their respective associated down zones. In the absence of such relays, however, prospective passengers desiring down service from the lower floor of each of the zones may be required to await such service for an undue length of time, until traffic diminishes sufficiently at the upper floor of the zone to enable a car serving the zone to stop at the lower floor thereof.

Assume now that the switch SBP is operated to its open condition to prevent pickup of the relays 5BP and 3BP. Referring to the zone transfer relay TZ (FIG. 13) assume additionally that the manually-operable switch TZS has been placed in its closed condition and that program clock contacts PC8 and/or make contacts PD11 of the instant dispatch relay are closed, closure of the latter contacts indicating the existence of a down peak traffic condition. Consequently, the relay TZ is picked up.

Turning to the zone position relays of FIG. 3, such pickup is accompanied by opening of break contacts TZ1 and TZ3 and closure of make contacts TZ2 and TZ4, all of which are associated with the car A; by opening of break contacts TZ5 and TZ7 and closure of make contacts TZ6 and TZ8, all associated with the car B; and by like operations of ssimilar contacts associated with the zone position relay circuits for the car C. As will be understood by inspection of FIG. 3 and from the preceding discussion thereof herein, the aforesaid contact operations result in rendering effective a separate zone position relay for each of the second through fifth floors for each of the elevator cars. For example, the zone position relay Z1A is energized through make contacts TZ4 when the car A is located at the second floor and its floor selector carriage brush *jj* is in engagement with its associated contact segment *j*2, the open break contacts TZ3 preventing pickup of the relay Z1; the relay Z1 is picked through the brush *jj* and the contact segment *j*3 only when the Car A is located at the third floor, break contacts TZ3 preventing pickup of the relay Z1A at such time; and similarly for the zone position relays Z2A and Z2 when the car A is located at the fourth and fifth floors, respectively.

Referring now to FIG. 5, and the *b* level of the assigned zone stepping switch KA, it will be noted that pickup of the relay TZ also results in opening of break contacts TZ9 and TZ10, thereby rendering effective the car A floor selector switches *p*5 and *p*3, which are operated by the floor selector carriage cam *pp* to open when the car A is located at the fifth and third floors, respectively. It will be observed that corresponding contacts and switches are provided for the car B, and likewise for the car C.

In FIG. 8, the relay TZ opens its break contacts TZ13 and TZ15 and closes its make contacts TZ14 and TZ16 associated with the down zone demand registering relays K2, K2A, K1 and K1A, and these relays thus are now associated with a separate one of the fifth, fourth, third and second floors, respectively.

From the above discussion, it will be understood that as a result of pickup of the relay TZ, the number of down zones into which the floors served by the present elevator system are divided is increased from three to five, each floor intermediate the first and seventh floors constituting a separate down zone, whereas prior to pickup of the relay TZ, the second and third floors comprised the first down zone and the fourth and fifth floors comprised the second down zone. (The sixth floor is a separate down zone under all conditions of operation.) Consequently, it will be clear by inspection of the drawings that when the relay TZ is picked up, successive available elevator cars may be assigned to serve down zones more frequently, since each assigned car is required to serve a fewer number of floors upon receiving a down zone assignment, and service in the down direction, therefore, is expedited. With the foregoing exceptions, the present elevator system, upon pickup of the relay TZ, operates precisely in the same manner as the system described in the aforesaid Savino et al. application, aside from the modifications in operation introduced by other components described herein which have been added to the control system of such application. In view of this, it appears unnecessary to discuss in further detail the operation of the present system as influenced by operation of the relay TZ.

It will be appreciated that, conversely, when the relay TZ is dropped out, successive available elevator cars are assigned to serve down zones less frequently and that as a result there is less wear and tear of the elevator cars and of control system components under such conditions, since only one available car is assigned to serve the first or the second down zone, as the case may be when two down floor calls simultaneously are registered for the two floors in such down zone.

(E) SPOTTING OPERATION

It now will be assumed that make contacts PD11 and/or the program clock contacts PC8 (FIG. 13), as the case may be, open to drop out the zone transfer relay TZ, but that the switch TZS remains closed. It also will be assumed that it is 5:00 p.m. and that consequently the business day has come to a close. As a result, those who occupy the office building which is assumed to be served by the present elevator system desire down service to the lower terminal floor.

Referring to the spotting transfer relay SP, and assuming that the manually-operable switch SPS in series therewith is closed, it will be recalled that the program clock contacts PC1 close at this time to pick up the relay SP. Such pickup is accompanied by closure of make contacts SP1 to pick up the floor spotting relay P6 for the sixth floor through the program clock contacts PC6, which also close at 5:00 p.m. Make contacts SP2 close to initiate a timing operation of the spotting interrupting timing relay YT, which is assumed to have a maximum time delay in pickup of sixty seconds. Make contacts SP3 close to energize through break contacts YT2 the spotting interrupting relay PM, which will be discussed in greater detail below. The relay SP also closes its make contacts SP4 to energize the zone transfer relay TZ through the closed switch TZS. From the precedeing discussion, it will be understood that as a result of pickup of the relay TZ, each of the second through sixth floors constitutes a separate down zone. Finally, the relay SP opens its break contacts SP5 (FIG. 8) to prevent energization therethrough of the master down call above relay MCA. However, it will be noted that make contacts PM9 in parallel with the contacts SP5 now are closed.

In picking up as aforesaid, the floor spotting relay P6 closes its make contacts P6–1 (FIG. 2) to energize the down floor call registering relay 6DR, thus establishing an artificial down floor call for the sixth floor. Break contacts P6–2 open to prevent energization of the cancelling coil 6DRN, and break contacts P6–3 also open to prevent pickup therethrough of the car A floor call stopping relay S. It will be understood that contacts similar to the contacts P6–3 are provided for the elevator car C, which, with the car A is assumed to be capable of serving the seventh floor, while such contacts are not required for the car B, since it cannot serve such floor.

Turning to FIG. 5, it will be noted that break contacts P6–4 open to prevent energization therethrough of the car A down call above relay DCA, while make contacts P6–5 close to permit such energization when either the brushes of a level assigned zone stepping switch KA is in engagement with its associated stepping contacts numbered 4, and similarly for the car C. In addition, make contacts P6–6 close to shunt through closed break contacts SH13 now open break contacts 6DR2 of the down floor call registering relay for the sixth floor, while closure of make contacts P6–7 has a like effect with respect to the car B, and similarly for the car C. Break contacts P6–8 (FIG. 8) open to prevent pickup of the down zone demand registering relay K3. Make contacts P6–9 and P6–11 (FIG. 13) close to prepare the spotting loading relays PX and BPX for the cars A and B, respectively, for subsequent energization, and similarly for the spotting loading relay CTX (not shown) for the car C. Finally, the relay P6 closes its make contacts P6–10 to pick up the spotting resetting relay PR, and this relay closes its make contacts PR1 to prepare the coil of the spotting stepping switch PRS for subsequent energization and opens its break contacts PR2 to prevent energization therethrough of the stepping switch coil.

Returning to pickup of the spotting interrupting relay PM, break contacts PM1 (FIG. 5) thereof associated with the $d$ level of the assigned zone stepping switch KA and break contacts PM2 associated with the corresponding level for the car B open to prevent energization therethrough of the assigned zone relays associated with such levels, and similarly for the car C. Turning to FIG. 7, break contacts PM3, PM4, PM5, PM6 and PM7 open to prevent pickup therethrough of the firing relay SCT, which is associated with the $c$ level of the down demand mid-point stepping switch SZ. Finally, the relay PM closes its make contacts PM8 (FIG. 8) to energize and pick up the down zone priority relay KMT, thus establishing an artificial priority demand for down service.

Assume that at this stage the elevator car A becomes available for assignment. As a result of the preceding sequence of operations, therefore, the car A is assigned to provide down service for the sixth floor by operation of the down demand mid-point stepping switch SZ (FIG. 7) and of the car A assigned zone stepping switch KA (FIG. 5), as will be understood from the detailed description in the aforesaid Savino et al. application of the assignment of an available car to serve a priority down zone.

As long as the spotting interrupting relay PM (FIG. 13) remains picked up, an artificial priority demand for down service for the sixth floor is maintained and thus successive available cars are dispatched directly to such floor to provide down service therefor. (It will be noted that the brushes of the down demand point stepping switch SZ, FIG. 7, are reset to their homing position each time a car is assigned to serve the sixth floor.) As a practical matter, when a car has received an assignment to serve the spotted floor it may become available for assignment, after leaving such floor in the down direction, at only the lower terminal or first floor since it then must travel to the latter floor.

Normally, when a car is assigned to serve a specific down zone, another car cannot be assigned to serve the same zone. For example, if a car is assigned to serve the third down zone (sixth floor), the assigned zone relay F3C (FIG. 5) remains picked up sufficiently long to prevent assignment of another car to serve such zone until the assigned car leaves the sixth floor in the down direction and another demand for down service is registered for the third down zone. It will be observed that during spotting operation, however, the presence of break contacts PM1, PM2 (FIG. 5) and similar contacts for the car C in the respective $d$ levels of the assigned zone stepping switches permit the assignment of more than one elevator car at a time to serve the sixth floor during its spotting period. If the car A, for example, is so assigned, its second auxiliary running relay 80 (FIG. 4) picks up to initiate movement of the car to the sixth floor. Such pickup is accompanied by closure of make contacts 80–1 (FIG. 1) to pick up the car A running relay M. Consequently, make contacts 80–3 (FIG. 5) and then break contacts M18 open to drop out the assigned zone relay F3C associated with the sixth floor, since break contacts PM1 in parallel therewith are open, and consequently another available car may be assigned immediately to serve such floor.

Assume now that the sixty-second time delay in pickup of the spotting interrupting timing relay YT (FIG. 3) has expired, i.e., that the capacitor C15 has charged sufficiently to fire the tube TU17 and thus to pick up the relay YT. Closure of make contacts YT1 establishes a self-holding circuit for the relay around the tube TU17 through make contacts SP2 and break contacts RY2, and the tube discharge is terminated. Opening of break contact YT2 deenergizes the spotting interrupting relay PM, which drops out to terminate spotting operation temporarily. It will be understood by inspection of the drawings and from the preceding discussion that as a result of such dropout the elevator system reverts to normal operation, that is, the first elevator car to become available for assignment is assigned to answer a service demand for a floor other than the sixth floor. (It will be noted that the zone transfer relay TZ remains picked up and that each of the second through fifth floors, therefore, constitutes a separate down zone, as explained heretofore.) The open break contacts P6–8 (FIG. 8) prevent energization of the down zone demand registering relay K3 as aforesaid, thereby preventing assignment of the last-named car to serve the sixth floor.

By inspection of FIG. 5, it will be apparent that if the car A, for example, has been assigned or spotted to serve the sixth floor, the down floor call for the sixth floor "appears" in the circuit of the car A down call above relay DCA, since the brushes of the assigned zone stepping switch KA will be in their position numbered 4, and the car A down zone assigned relay SH will be picked up to open its break contacts SH13 in series with the closed make contacts P6–6 across the open break contacts 6DR2. If the car A is located below the sixth floor, therefore, the relay DCA is dropped out, as it should be. On the other hand, if the car A has been assigned to serve the highest floor for which a down floor call is registered, as a result of the aforesaid dropout of the spotting interrupting relay PM, it will not "see" the down floor call for the sixth floor, since make contacts P6–6 and break contacts SH13 both are closed to shunt the open break contacts 6DR2. Finally, if the car A, when the relay PM drops out, is assigned to serve a specific floor in response to registration of a priority demand for down service for such floor, once again the car will not "see" the down floor call for the sixth floor, as a result of operation of the assigned zone stepping switch KA to effect such assignment. Such operation is discussed in detail in the aforesaid Savino et al. application.

It also will be noted by inspection of FIG. 2 that only an elevator car assigned or spotted to serve the sixth floor will stop at such floor in response to registration of the aforesaid artificial down floor call therefor. For example, break contacts P6–3 are open to prevent energization therethrough of the car A floor call stopping relay S, as pointed out above. If the car A is spotted to serve the sixth floor, it will stop at the sixth floor when its assigned zone stopping relay picks up to close its make contacts ST5 as the car approaches such floor. If the car is not so assigned, however, it will by-pass the sixth floor (assuming in this case that it previously had been assigned to answer a down floor call for the seventh floor when the spotting interrupting relay PM dropped out and that it is on its way down therefrom to answer a car call), since its assigned zone stopping relay remains dropped out to maintain the contacts ST5 open as it approaches the sixth floor.

As soon as an available car is selected to answer a service demand for a floor other than the sixth floor, the spotting resumption relay RY (FIG. 13) picks up through make contacts YT3, as will be clear from the preceding discussion of FIG. 13. Closure of make contacts RY1 establishes a discharge path for the capacitor C15 through the resistor R63, while opening of break contacts RY2 drops out the spotting interrupting timing relay YT. Closure of break contacts YT2 reenergizes the spotting interrupting relay PM, and thus the spotting of cars to serve the sixth floor resumes. Opening of make contacts YT3 effects dropout of the spotting resumption relay RY, which opens its make contacts RY1 to interrupt the discharge path for the capacitor C15 and closes its break contacts RY2 to initiate a new timing operation of the relay YT.

It will be noted that if, when the relay YT picks up to close its make contacts YT3 there is no demand for service for a floor other than the sixth or spotted floor, break contacts ZD10 of the down zone demand relay and break contacts DU10 of the up zone demand relay both are closed to energize immediately the spotting resumption relay RY, and pickup of this relay results in the immediate resumption of the spotting of cars to serve the sixth floor, as will be understood from the above discussion.

Referring now to the spotting loading relay PX it will be observed that make contacts P6–9 of the floor spotting relay for the sixth floor are closed. Assume that the car A has been spotted to serve the sixth floor and, therefore, is located at such floor (the car A floor selector carriage brush $xx$ is in engagement with its associated contact segment $x6$) and is conditioned for down travel (make contacts X16 of the car A down preference relay are closed), and that its non-interference time has expired (break contacts 70T8 of its non-interference relay are closed) to effect closure of its doors (make contacts DS4 of its door relay are closed) before the car is loaded to capacity (break contacts LW7 of its load relay are closed). As a result, the relay PX is picked up. It will be recalled that the spotting resetting relay PR also is picked up through make contacts P6–10. Consequently, make contacts PX1 and PR1 both are closed to energize the coil of the spotting stepping switch PRS.

As departure of the car A is initiated from the sixth floor, the brush $xx$ disengages the contact segment $x6$ and break contacts 70T8 open to drop out the relay PX, which opens its make contacts PX1 to deenergize the coil of the stepping switch PRS. Such deenergization is accompanied by the stepping of the brushes of the level PRS$a$ to their first position, thereby shorting out the section R64$a$ of the charging resistor R64 for the capacitor C15. Thus, the time delay in pickup of the spotting interrupting relay YT is decreased to fifty seconds from a maximum of sixty seconds, thereby increasing the frequency with which available elevator cars may be assigned to serve floors other than the sixth or spotted floor, as will be understood from the preceding discussion.

It also will be apparent that each time any of the cars A, B and C subsequently leaves the sixth floor in the down direction without a capacity load, i.e., as traffic at the sixth floor continues to diminish or taper off, the brushes of the stepping switch PRS advance an additional step decreasing the time delay in pickup of the relay YT by an additional ten seconds per step and further increasing the frequency with which cars may be assigned to serve floors other than the sixth floor. As has been pointed out in the discussion of FIG. 13, this sequence of operations may continue until the brushes reach their fifth position and the time delay in pickup of the relay YT becomes a minimum of ten seconds, since, when the brushes arrive at such position, the cam-operated contacts PRS3 close to energize the stepping switch coil continuously through make contacts PR1.

From the foregoing description of operation, it will be clear that during the spotting of elevator cars to serve the sixth floor, down traffic is expedited therefrom without unduly penalizing traffic which may exist at the remaining unspotted floors.

At 5:05 p.m., the program clock contacts PC6 open to drop out the floor spotting relay P6, and the program clock contacts PC5 close to pick up the floor spotting relay P5. As a result, the spotting of elevator cars to serve the sixth floor is terminated, while for the next five minutes until 5:10, cars are spotted to serve the fifth floor in a like manner, as will be understood by inspection of the drawings and from the preceding discussion. It will be noted that dropout of the relay P6 is accompanied by opening of its make contacts P6–10 to dropout the spotting resetting relay PR, while pickup of the relay P5 results in closure of its make contacts P5–10 to reenergize the relay PR. However, it will be recalled that the relay PR has a slight time delay in pickup. During such time delay, its make contacts PR1 are open and its break contacts PR2 are closed sufficiently long to effect the resetting of the brushes of the spotting stepping switch PRS to their homing position by means of its homing contacts PRS1 and its self stepping contacts PRS2. Consequently, the time delay in pickup of the spotting interrupting timing relay YT once again becomes sixty seconds and may be decreased in increments of ten seconds each (to a minimum of ten seconds) for each elevator car spotted to serve the fifth floor and which departs such floor without a capacity load, as will be understood from the preceding discussion.

At 5:10 p.m., the program clock contacts PC5 open to drop out the floor spotting relay P5, and the contacts PC4 close to pick up the corresponding relay P4 for the fourth floor; at 5:15, the contacts PS4 open to drop out the relay P4 and the contacts PC3 close to pick up the floor spotting relay P3 for the third floor; and at 5:20 the contacts PC3 open, dropping out the relay P3, and the contacts PC2 close, picking up the relay P2 for the second floor. Finally, at 5:25, the contacts PC2 open to dropout the relay P2 and the contacts PC1 also open to dropout the spotting transfer relay SP, terminating floor spotting operation of the elevator system. Thus, it will be clear by inspection of the drawings and from the preceding discussion that elevator cars are spotted to serve the sixth fifth, fourth, third and second floors for consecutive respective five-minute intervals, after which the elevator system is transferred to its normal mode of operation. (It will be noted that dropout of the relay SP is accompanied by opening of its make contacts SP2 to prevent pickup of the spotting interrupting timing relay YT, opening of its make contacts SP3 to drop out the spotting interrupting relay PM and opening of its make contacts SP4 to drop out the one transfer relay TZ.)

Although the invention has been described with reference to certain specific embodiments thereof, numerous modifications falling within the spirit and scope of the invention are possible.

We claim as our invention:

1. In an elevator system for a structure having a plurality of vertically-spaced floors, a plurality of elevator cars, means mounting each of the elevator cars for movement relative to the structure to serve the floors, floor call registering means operable for registering a call for elevator service from each of said floors, control means operating the elevator cars to answer calls registered by the floor call registering means, said floors being divided into a first plurality of zones each including at least one of the floors, means responsive to a predetermined condition for redividing said floors into a second plurality of zones, and assigning means responsive to call registration by said floor call registering means for one of said zones provided that none of the elevator cars is located in such zone for operating from a first condition to a second condition to assign an available one of the elevator cars to such zone to answer such call registration.

2. In an elevator system for a structure having a plurality of vertically-spaced floors, a plurality of elevator cars, means mounting each of the elevator cars for movement relative to the structure to serve the floors, floor call registering means operable for registering a call for elevator service from each of said floors, control means operating the elevator cars to answer calls registered by the floor call registering means, said floors being divided into a first plurality of zones each including at least one of the floors, means responsive to occurrence of a predetermined traffic condition for redividing said floors into a second plurality of zones, and assigning means responsive to call registration by said floor call registering means for one of said zones provided that none of the elevator cars is located in such zone for operation from a first condition to a second condition to assign an available one of the elevator cars to such zone to answer such call registration.

3. In an elevator system for a structure having a plurality of vertically-spaced floors, a plurality of elevator cars, means mounting each of the elevator cars for movement relative to the structure to serve the floors, floor call registering means operable for registering a call for elevator service from each of said floors, control means operating the elevator cars to answer calls registered by the floor call registering means, said floors being divided into a plurality of zones each including at least one of said floors, means responsive to a predetermined condition for rearranging the zones into which said floors are divided, and assigning means responsive to call registration by said floor call registering means for one of said zones provided that none of the elevator cars is located in such zone for operation from a first condition to a second condition to assign an available one of the elevator cars to such zone to answer such call registration.

4. In an elevator system for a structure having a plurality of vertically-spaced floors, a plurality of elevator cars, means mounting each of the elevator cars for movement relative to the structure to serve the floors, floor call registering means operable for registering a call for elevator service from each of said floors, control means operating the elevator cars to answer calls registered by the floor call registering means, said floors being divided into a first plurality of zones each including at least one of the floors, by-pass means for each of the elevator cars operable from a first condition to a second condition for causing such car to by-pass a floor for which a call is registered by said floor call registering means, means responsive to operation of the by-pass means of one of the elevator cars to said second condition for redividing said floors into a second plurality of zones, and assigning means responsive to call registration by said floor call registering means for one of said zones provided that none of the elevator cars is located in such zone for operation from a first condition to a second condition to assign an available one of the elevator cars to such zone to answer such call registration.

5. In an elevator system for a structure having a plurality of vertically-spaced floors including a primary floor and a plurality of additional floors, a plurality of elevator cars for transporting load, means mounting each of the elevator cars for movement relative to the structure to serve the floors, floor call registering means operable for registering a call for elevator service in a first direction from each of said additional floors, control means operating the elevator cars to answer calls registered by the floor call registering means, said floors being divided into a first plurality of zones each including at least one of the floors and at least one of said zones comprising a plurality of floors, means for expediting the transport of load from said additional floors in said first direction comprising means for redividing said floors into a second plurality of zones greater than said first plurality, demand means for each of said zones in said first plurality and for each of said zones in said second plurality for indicating demand for service in said first direction for the associated one of said zones in response to registration of a call by the floor call registering means for at least one of the floors of the associated zone with no car located in such associated zone and set for travel in said first direction, and assigning means responsive to operation of the demand means for each of said zones for assigning an available one of the elevator cars to answer floor call registration for the zone corresponding to the operated demand means.

6. In an elevator system for a structure having a plurality of vertically-spaced floors including a primary floor and a plurality of additional floors, a plurality of elevator cars for transporting load, means mounting each of the elevator cars for movement relative to the structure to serve the floors, floor call registering means operable for registering a call for elevator service toward said primary floor from each of said additional floors, control means operating the elevator cars to answer calls registered by the floor call registering means, said floors being divided into a first plurality of zones each including at least one of the floors and at least one of said zones comprising a plurality of floors, means responsive to occurrence of a predetermined traffic condition for expediting the transport of load from said additional floors toward said primary floor comprising means for redividing said floors into a second plurality of zones greater than said first plurality, demand means for each of said zones in said first plurality and for each of said zones in said second plurality for indicating demand for service toward said primary floor for the associated one of said zones in response to registration of a call by the floor call registering means for at least one of the floors of the associated zone with no car located in such associated zone and set for travel toward said primary floor, and assigning means responsive to operation of the demand means for each of said zones for assigning an available one of the elevator cars tot answer floor call regisration for the zone corresponding to the operated demand means.

7. In an elevator system for a structure having a plurality of vertically-spaced floors including a primary floor and a plurality of additional floors, a plurality of elevator cars for transporting load, means mounting each of the elevator cars for movement relative to the structure to serve the floors, floor call registering means operable for registering a call for elevator service toward said primary floor from each of said additional floors, control means operating the elevator cars to answer calls registered by the floor call registering means, said floors being divided into a first plurality of zones each including at least one of the floors and at least one of said zones comprising a plurality of floors, means responsive to a predominant demand for elevator service toward said primary floor for expediting the transport of load from said additional floors toward said primary floor comprising means for redividing said floors into a second plurality of zones greater than said first plurality, demand means for each of said zones in said first plurality and for each of said zones in said second plurality for indicating demand for service toward said primary floor for the associated one of said zones in response to registration of a call by the floor call registering means for at least one of the floors of the associated zone with no car located in such associated zone and set for travel toward said primary floor, and assigning means responsive to operation of the demand means for each of said zones for assigning an available one of the elevator cars to answer floor call registration for the zone corresponding to the operated demand means.

8. In an elevator system for a structure having a plurality of vertically-spaced floors including a primary floor and a plurality of additional floors, a plurality of elevator cars for transporting load, means mounting each of the elevator cars for movement relative to the structure to serve the floors, floor call registering means operable for registering a call for elevator service toward said primary floor from each of said additional floors, control means operating the elevator cars to answer calls registered by the floor call registering means, said floors being divided into a first plurality of zones each including at least one of the floors and at least one of said zones comprising a plurality of floors, by-pass means for each of the elevator cars operable from a first to a second condition for causing the associated car to by-pass a floor, means responsive to operation of the by-pass means of one of the elevator cars when set for travel toward said primary floor for expediting the transport of load from said additional floors toward said primary floor comprising means for redividing said floors into a second plurality of zones greater than said first plurality, demand means for each of said zones in said first plurality and for each of said zones in said second plurality for indicating demand for service toward said primary floor for the associated one of said zones in response to registration of a call by the floor call registering means for at least one of the floors of the associated zone with no car located in such associated zone and set for travel toward said primary floor, and assigning means responsive to operation of the demand means for each of said zones for assigning an available one of the elevator cars to answer floor call registration for the zone corresponding to the operated demand means.

9. In a load-transporting system, a structure having a first landing, a second landing spaced in a first direction from the first landing and a third landing between the first and second landings between which load is to be transported, a load-transporting unit mounted for travel in said first direction and in the reverse direction between said landings, separate call means for registering calls for transport service from each of said second and third landings toward said first landing, motive means for moving the load-transporting unit between said landings, and control means cooperating with the motive means and the call means for controlling the movement of the unit, said control means comprising means for first assigning the load-transporting unit to stop at the second landing to receive load for transport to the first landing, means for subsequently assigning the load transporting unit when available to stop at the second landing to transport load to the first landing when a call for service is registered by the call means at one of the second and third landings, and means responsive to a predetermined loading of the load-transporting unit at said second landing during said first assignment and to registration of a call for service from the third landing by the call means for cancelling said subsequent assignment and assigning the load transporting unit when available to proceed to the third landing for the purpose of transporting load to the first landing even though a call for service is registered by the call means for the second landing.

10. In a load-transporting system, a structure having a plurality of landings spaced in a first direction from a first landing, said plurality of landings being divided into zones each including a plurality of said landings, said zones including a first zone and a second zone, a plurality of load-transporting units each mounted for travel relative to the structure in said first direction and in the reverse direction between said landings, separate call means operable from each of said plurality of landings for registering calls for transport service towards said first landing, separate motive means for moving each of the load-transporting units in said directions, said load-transporting units being available for assignment under predetermined conditions, and control means cooperating with the call means and the motive means for controlling movement of each of the load-transporting units, said control means comprising means effective in response to a first service demand by the call means from the first zone for assigning an available one of the load-transporting units to proceed to the landing in the first zone farthest from the first landing for which a call is registered by the call means to transport load from the first zone to the first landing, means responsive to a second service demand by the call means from a landing in the first zone between the first landing and said farthest landing while said last-named load-transporting unit has received a load in excess of a predetermined value at said farthest landing for assigning one of said load-transporting units when available to proceed to an intermediate one of said landings in said first zone between said first landing and said farthest landing for answering the call at such intermediate landing and transporting load from such intermediate landing toward the first landing while a call is registered by the call means for said farthest landing.

11. In a load-transporting system, a structure having a plurality of landings spaced in a first direction from a first landing, said plurality of landings being divided into zones each including a plurality of said landings, said zones including a first zone and a second zone, a plurality of load-transporting units each mounted for travel relative to the structure in said first direction and in the reverse direction between said landings, separate call means operable from each of said plurality of landings for registering calls for transport service towards said first landing, separate motive means for moving each of the load-transporting units in said directions, said load-transporting units being available for assignment under predetermined conditions, and control means cooperating with the call means and the motive means for controlling movement of each of the load-transporting units, said control means comprising means effective in response to a first service demand by the call means from the first zone for assigning an available one of the load-transporting units to proceed to the landing in the first zone farthest from the first landing for which a call is registered by the call means to transport load from the first zone to the first landing, means responsive to a second service demand by the call means from a landing in the first zone between the first landing and said farthest landing while said last-named load-transporting unit has received a load in excess of a predetermined value at said farthest landing for assigning one of said load-transporting units when available to proceed to an intermediate one of said landings in said first zone between said first landing and said farthest landing for answering the call at such intermediate landing and transporting load from such intermediate landing toward the first landing while a call is registered by the call means for said farthest landing, and means responsive to said answering of the call at the intermediate landing for enabling a succeeding assignment of one of the load-transporting units when available to said farthest landing in response to registration of a call by the call means for such farthest landing.

12. In an elevator system, a structure having a plurality of vertically spaced landings, said landings being divided into a plurality of vertically spaced zones each including a plurality of said landings, a plurality of elevator cars each mounted for up and down travel relative to the structure for serving said landings, separate call means operable from each of the landings in a first one of said zones to establish a demand for down service from the associated landing, separate motive means for moving each of the elevator cars in up and down directions relative to said structure, each of said elevator cars being available for assignment to one of said zones under predetermined conditions, and control means cooperating with the call means and the motive means for controlling the movement of each of the elevator cars, said control means comprising means effective in response to a predetermined first demand from said first zone assigning an available one of said elevator cars to proceed to the highest landing in the first zone for which a call is registered by said call means, means responsive to a second call registered by the call means for a landing in said first zone below said highest landing while said last-named car has received a load in excess of a predetermined value at said highest landing for assigning one of said elevator cars when available at a lower landing below said first zone to travel up, stop and be set for down travel at a landing for which a call is registered by the call means below said highest landing in the presence of a call registered by said call means for said highest landing, and means responsive to the answering of said registered call at said lower landing by the last-named elevator car for enabling a succeeding assignment of one of the elevator cars when available to answer a call registered by the call means for said highest landing.

13. In an elevator system for a structure having a plurality of vertically-spaced floors, a plurality of elevator cars, means mounting each of the elevator cars for movement relative to the structure to serve the floors, floor call registering means operable for registering a call for elevator service from each of said floors, control means operating the elevator cars to answer calls registered by the floor call registering means, said floors being divided into a first plurality of zones each including at least one of the floors, altering means responsive to a predetermined condition for altering the number of said floors effectively in at least one of said zones, and assigning means responsive to call registration by said floor call registering means for a floor effectively in any one of said zones for operating from a first condition to a second condition to assign any of said elevator cars when available to such zone to answer call registration for a floor effectively in such zone.

14. An elevator system as claimed in claim 13 wherein said assigning means is effective for making said assignment provided that none of the elevator cars is located in the zone to which the assignment is made.

15. An elevator system as claimed in claim 13 wherein one of said zones is a plural-floor zone, said means for redividing comprises means responsive to a predetermined loading of one of the elevator cars at an upper one of the floors in the plural-floor zone and to call registration in such zone below said upper one of the floors for effectively removing said upper one of the floors from the plural-floor zone, said assigning means operating after said effective removal to assign an available one of the elevator cars to a floor in said plural-floor zone below said upper one of the floors.

16. An elevator system as claimed in claim 13 wherein said means responsive to a predetermined condition redistributes said floors to alter the number of floors included in each of a plurality of said zones in response to occurrence of a predetermined traffic demand.

17. An elevator system as claimed in claim 13 wherein said means responsive to a predetermined condition redistributes said floors to alter the number of floors included in each of a plurality of said zones in response to occurrence of a predetermined time.

18. An elevator system as claimed in claim 13 wherein said control means includes a separate set of zone position relays for each of said elevator cars, each of said sets comprising, a separate zone position relay for each of said zones, means for sequentially scanning said zone position relays of the set to establish an energizing circuit for the zone position relay corresponding to the zone in which the associated elevator car is located, said altering means comprising relay means responsive to said predetermined condition for connecting a plurality of said zone position relays for simultaneous operation in response to a predetermined location of the associated elevator car to define a resultant zone of such connected zone position relays, said control means including separate demand means for each of said zones for responding to a call in the associated zone, means responsive to operation of the altering means for rendering only one of the demand means effective for indicating a call registered at any of the floors in one of said resultant zones, and means responsive to operation of one of the demand means for assigning an available one of the elevator cars to the zone represented by such one of the demand means.

19. An elevator system as claimed in claim 13 wherein said floor call registering means registers calls for down service, at least one of said zones, termed a plural-floor zone contains a plurality of floors, said altering means comprising by-pass means responsive to loading of one of the elevator cars at an upper one of the floors in said plural-floor zone when set for travel to a lower floor for causing the car to by-pass a call registered at a lower floor in said plural-floor zone, means responsive to operation of said by-pass means while a call is registered for said lower floor by the floor call registering means for preventing a call registered by the floor call registering means for said upper one of the floors from stopping one of said elevator cars, said control means including separate demand means for each of said zones operable for indicating registration of a call by any of the floor call registering means for floors in the associated one of said zones, and means responsive to operation of any of said demand means for assigning one of the elevator cars when available to the associated zone.

References Cited

UNITED STATES PATENTS

| | | | |
|---|---|---|---|
| 2,447,935 | 8/1948 | Eames | 187—29 |
| 3,256,958 | 6/1966 | Savino et al. | 187—29 |
| 3,292,736 | 12/1966 | Savino et al. | 187—29 |

THOMAS E. LYNCH, Primary Examiner